(12) United States Patent
Saka et al.

(10) Patent No.: US 10,277,592 B2
(45) Date of Patent: Apr. 30, 2019

(54) APPARATUS MANAGEMENT SYSTEM, INFORMATION TERMINAL, APPARATUS MANAGEMENT APPARATUS, AND APPARATUS MANAGEMENT METHOD

(71) Applicants: Takao Saka, Kanagawa (JP); Yasuyuki Nakamura, Tochigi (JP)

(72) Inventors: Takao Saka, Kanagawa (JP); Yasuyuki Nakamura, Tochigi (JP)

(73) Assignee: Ricoh Company, Ltd., Tokyo (JP)

( * ) Notice: Subject to any disclaimer, the term of this patent is extended or adjusted under 35 U.S.C. 154(b) by 305 days.

(21) Appl. No.: 15/046,520

(22) Filed: Feb. 18, 2016

(65) Prior Publication Data

US 2016/0173496 A1 Jun. 16, 2016

Related U.S. Application Data

(63) Continuation of application No. PCT/JP2014/071610, filed on Aug. 19, 2014.

(30) Foreign Application Priority Data

Aug. 19, 2013 (JP) ................................. 2013-169972
Jun. 27, 2014 (JP) ................................. 2014-132165

(51) Int. Cl.
*H04L 29/06* (2006.01)
*G06F 21/44* (2013.01)
(Continued)

(52) U.S. Cl.
CPC ........ *H04L 63/0876* (2013.01); *G06F 21/305* (2013.01); *G06F 21/44* (2013.01);
(Continued)

(58) Field of Classification Search
CPC ..... H04L 63/08; H04L 63/0876; H04L 63/10; H04W 12/06; H04W 12/08; G06F 21/30; G06F 21/305; G06F 21/44; G06F 21/445
See application file for complete search history.

(56) References Cited

U.S. PATENT DOCUMENTS

| 5,917,407 A | * | 6/1999 | Squire | ...................... B62H 3/00 194/205 |
| 6,292,473 B1 | * | 9/2001 | Duske, Jr. | .......... H04B 7/18567 370/316 |

(Continued)

FOREIGN PATENT DOCUMENTS

| JP | 2002-330468 | 11/2002 |
| JP | 2003-090156 | 3/2003 |

(Continued)

OTHER PUBLICATIONS

International Search Report dated Nov. 25, 2014 in PCT/JP2014/071610 filed on Aug. 19, 2014.

*Primary Examiner* — Khang Do
(74) *Attorney, Agent, or Firm* — IPUSA, PLLC

(57) ABSTRACT

An apparatus management system managing an apparatus through an information terminal includes a transmission part configured to transmit terminal information identifying the information terminal and apparatus information identifying the apparatus, a reception part configured to receive the terminal information and the apparatus information, an authentication part configured to determine whether the received terminal information and apparatus information match one of registered combinations of terminal information and apparatus information, and a notification part configured to transmit apparatus management information to the information terminal when the authentication part determines that the received terminal information and apparatus (Continued)

information match one of the registered combinations of terminal information and apparatus information.

18 Claims, 53 Drawing Sheets

(51) Int. Cl.
    *G06F 21/30*     (2013.01)
    *H04W 12/06*     (2009.01)
    *H04W 12/08*     (2009.01)

(52) U.S. Cl.
    CPC .......... *G06F 21/445* (2013.01); *H04L 63/108* (2013.01); *H04W 12/06* (2013.01); *H04W 12/08* (2013.01); *G06F 2221/2147* (2013.01)

(56) References Cited

U.S. PATENT DOCUMENTS

| | | | |
|---|---|---|---|
| 7,533,809 B1* | 5/2009 | Robinson | G06Q 20/40145 235/382 |
| 2002/0174077 A1* | 11/2002 | Yui | G06Q 20/127 705/400 |
| 2004/0212485 A1 | 10/2004 | Tajima et al. | |
| 2005/0096836 A1* | 5/2005 | Minami | G07C 5/008 701/123 |
| 2006/0109505 A1* | 5/2006 | Ha | H04N 1/00244 358/1.15 |
| 2007/0239606 A1* | 10/2007 | Eisen | G06Q 20/3674 705/51 |
| 2009/0085725 A1* | 4/2009 | Brookner | G06Q 10/10 340/10.41 |
| 2009/0240575 A1* | 9/2009 | Bettez | B62H 3/00 705/13 |
| 2013/0317693 A1* | 11/2013 | Jefferies | G07B 15/00 701/31.5 |
| 2014/0094965 A1* | 4/2014 | Silverbrook | G06Q 10/087 700/237 |
| 2014/0278599 A1* | 9/2014 | Reh | B60R 25/24 705/5 |
| 2015/0162646 A1 | 6/2015 | Kawase et al. | |

FOREIGN PATENT DOCUMENTS

| | | |
|---|---|---|
| JP | 2003-138816 | 5/2003 |
| JP | 2004-289818 | 10/2004 |
| JP | 2005-323070 | 11/2005 |
| JP | 2009-251649 | 10/2009 |
| JP | 2009-288911 | 12/2009 |
| JP | 2012-079109 | 4/2012 |
| JP | 2013-255965 | 12/2013 |

* cited by examiner

FIG.8A

| APPARATUS CODE | APPARATUS NUMBER | MASTER KEY | MANAGER INFORMATION TERMINAL NUMBER | MANAGER REGISTRATION DATE | USER INFORMATION TERMINAL NUMBER | USAGE TIME LIMIT | REGISTRATION DATE |
|---|---|---|---|---|---|---|---|
| 61 | 62 | 63 | 64 | 65 | 66 | 67 | 68 |
|  | A03582X2 | XOP5643 |  |  |  |  |  |

FIG.8B

| APPARATUS CODE /61 | APPARATUS NUMBER /62 | MASTER KEY /63 | MANAGER INFORMATION TERMINAL NUMBER /64 | MANAGER REGISTRATION DATE /65 | USER INFORMATION TERMINAL NUMBER /66 | USAGE TIME LIMIT /67 | REGISTRATION DATE /68 |
|---|---|---|---|---|---|---|---|
| PJ001 | A03582X2 | XOP5643 | 12323486732 | 20120320 | | | |

FIG.8C

| APPARATUS CODE | APPARATUS NUMBER | MASTER KEY | MANAGER INFORMATION TERMINAL NUMBER | MANAGER REGISTRATION DATE | USER INFORMATION TERMINAL NUMBER | USAGE TIME LIMIT | REGISTRATION DATE | |
|---|---|---|---|---|---|---|---|---|
| PJ001 | A03582X2 | XOP5643 | 12323486732 | 20120320 | 12334894532 | 20140622 | 20130521 | |

FIG.8D

| APPARATUS CODE ~61 | APPARATUS NUMBER ~62 | MASTER KEY ~63 | MANAGER INFORMATION TERMINAL NUMBER ~64 | MANAGER REGISTRATION DATE ~65 | USER INFORMATION TERMINAL NUMBER ~66 | USAGE TIME LIMIT ~67 | REGISTRATION DATE ~68 | |
|---|---|---|---|---|---|---|---|---|
| PJ001 | A03582X2 | XOP5643 | 12323486732 | 20120320 | 12334894532 | 20140622 | 20130521 | ⋮ |
| PJ001 | A03582X2 | XOP5643 | 12323486732 | 20120120 | 12373485621 | 20130922 | 20130212 | ⋮ |
| PJ001 | A03397U7 | XOP3498 | 12343784645 | 20120110 | 12373297556 | 20141022 | 20130212 | ⋮ |
| MP001 | M03878T4 | POY6423 | 12323486732 | 20121110 | 12334894532 | 20140622 | 20130521 | ⋮ |

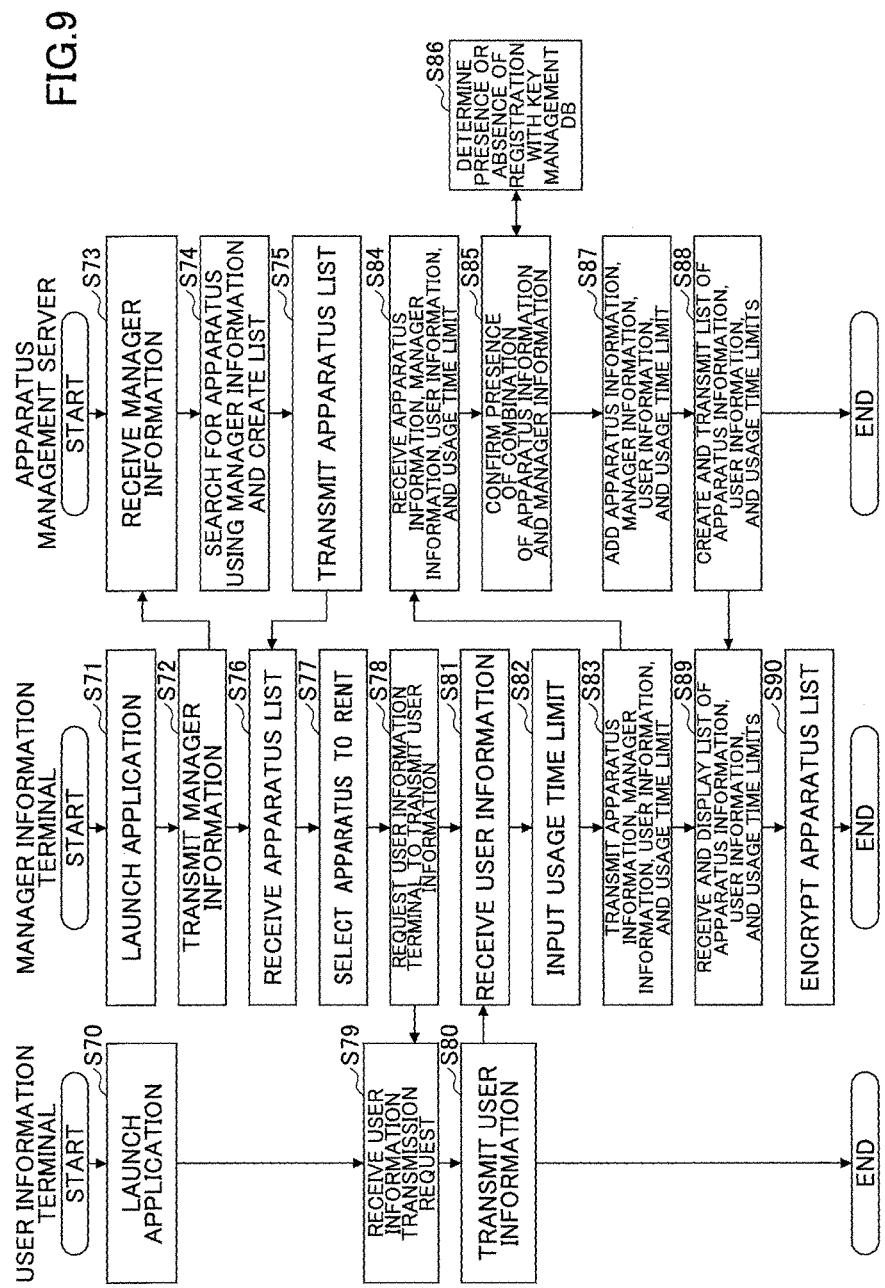

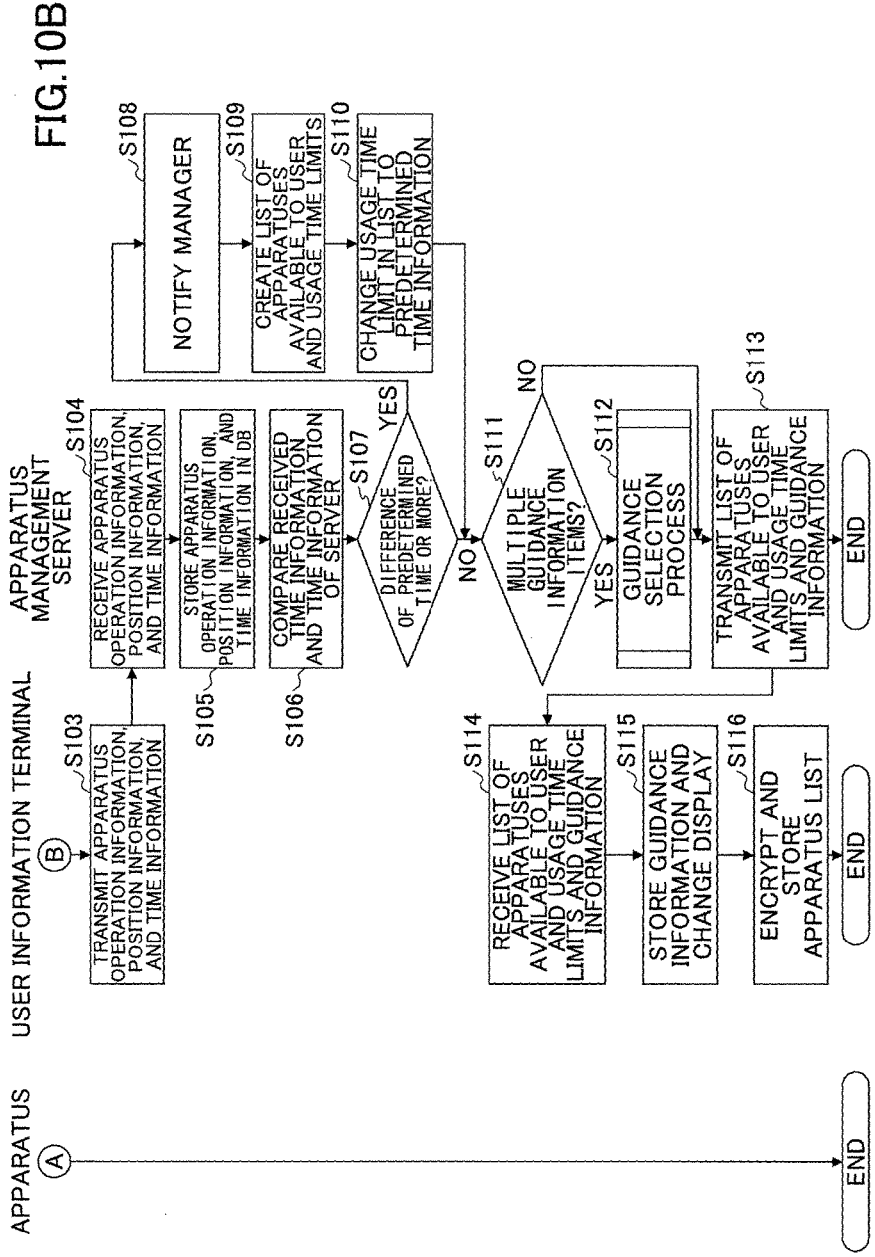

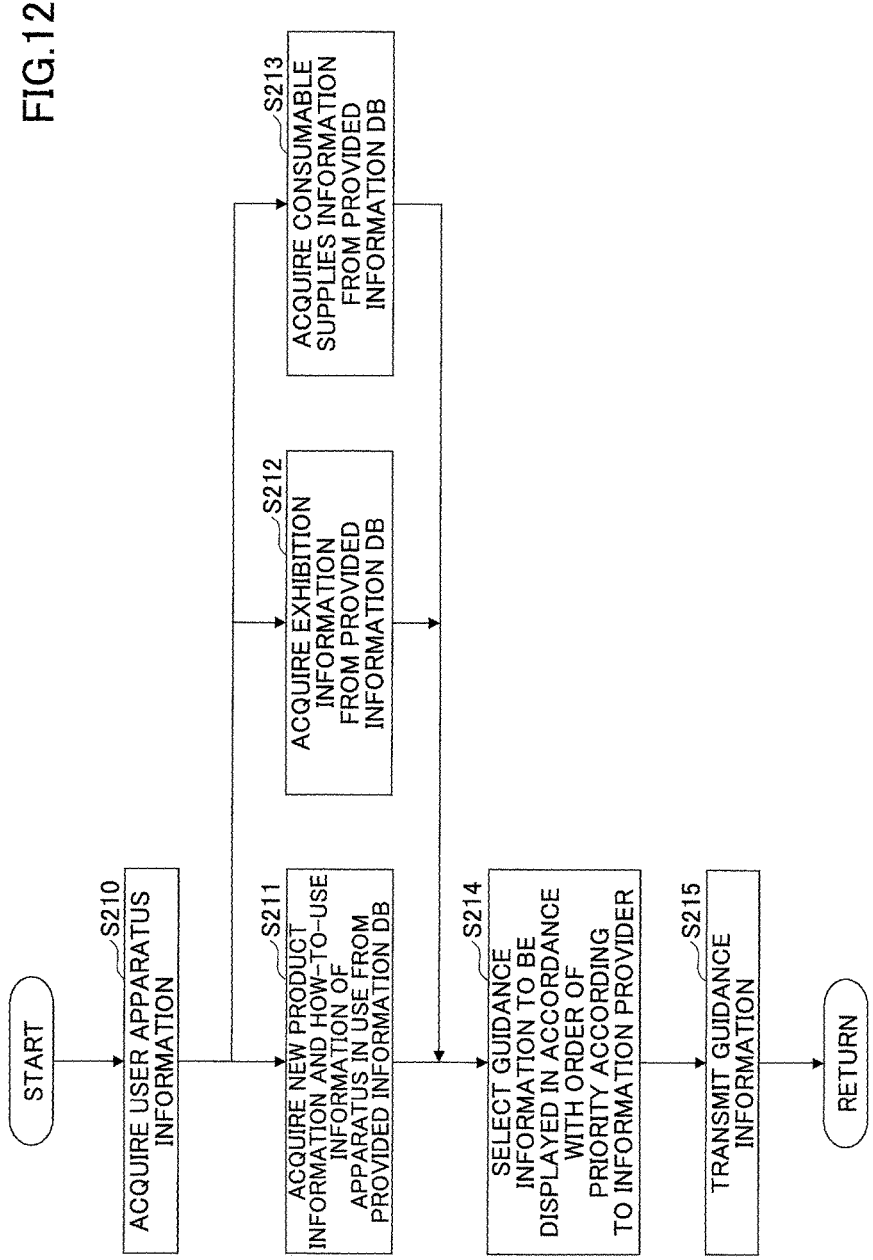

FIG.14

| /71 APPARATUS CODE | /72 APPARATUS NUMBER | /73 USER INFORMATION TERMINAL NUMBER | /74 OPERATION DATE AND TIME | /75a APPARATUS OPERATION INFORMATION 1 | /75b APPARATUS OPERATION INFORMATION 2 | /75c APPARATUS OPERATION INFORMATION 3 | /75d APPARATUS OPERATION INFORMATION 4 | /75e APPARATUS OPERATION INFORMATION 5 | /76 POSITION INFORMATION |
|---|---|---|---|---|---|---|---|---|---|
| PJ001 | A03582X2 | 12334894532 | 20130621 | 100 | 20 | 600 | 64 | 0 | LATITUDE ××<br>LONGITUDE ×× |
| PJ001 | A03397U7 | 12373297556 | 20130511 | 230 | 130 | 620 | 65 | 0 | LATITUDE ○○<br>LONGITUDE ○○ |
| | | | | | | | | | |

FIG.15

| APPARATUS CODE 91 | APPARATUS NAME 92 | APPARATUS OPERATION INFORMATION 1 (93a) | APPARATUS OPERATION INFORMATION 2 (93b) | APPARATUS OPERATION INFORMATION 3 (93c) | APPARATUS OPERATION INFORMATION 4 (93d) | APPARATUS OPERATION INFORMATION 5 (93e) | ... |
|---|---|---|---|---|---|---|---|
| PJ001 | PROJECTOR | TOTAL OPERATION TIME | LAMP LIGHTING TIME | FAN ROTATION SPEED | TEMPERATURE | SENSOR ABNORMALITY CODE | ... |
| MP001 | MFP | TOTAL OPERATION TIME | NUMBER OF COPIES | REMAINING TONER AMOUNT | NUMBER OF FAXED SHEETS | NUMBER OF SCANS | ... |
| IP023 | INFUSION PUMP | TOTAL OPERATION TIME | BATTERY VOLTAGE | TOTAL INFUSION AMOUNT | LATEST INFUSION AMOUNT | SENSOR ABNORMALITY CODE | ... |
| CA916 | VEHICLE | TRAVEL DISTANCE | BATTERY VOLTAGE | AIR PRESSURE | AVERAGE FUEL EFFICIENCY | BRAKE PAD THICKNESS | ... |

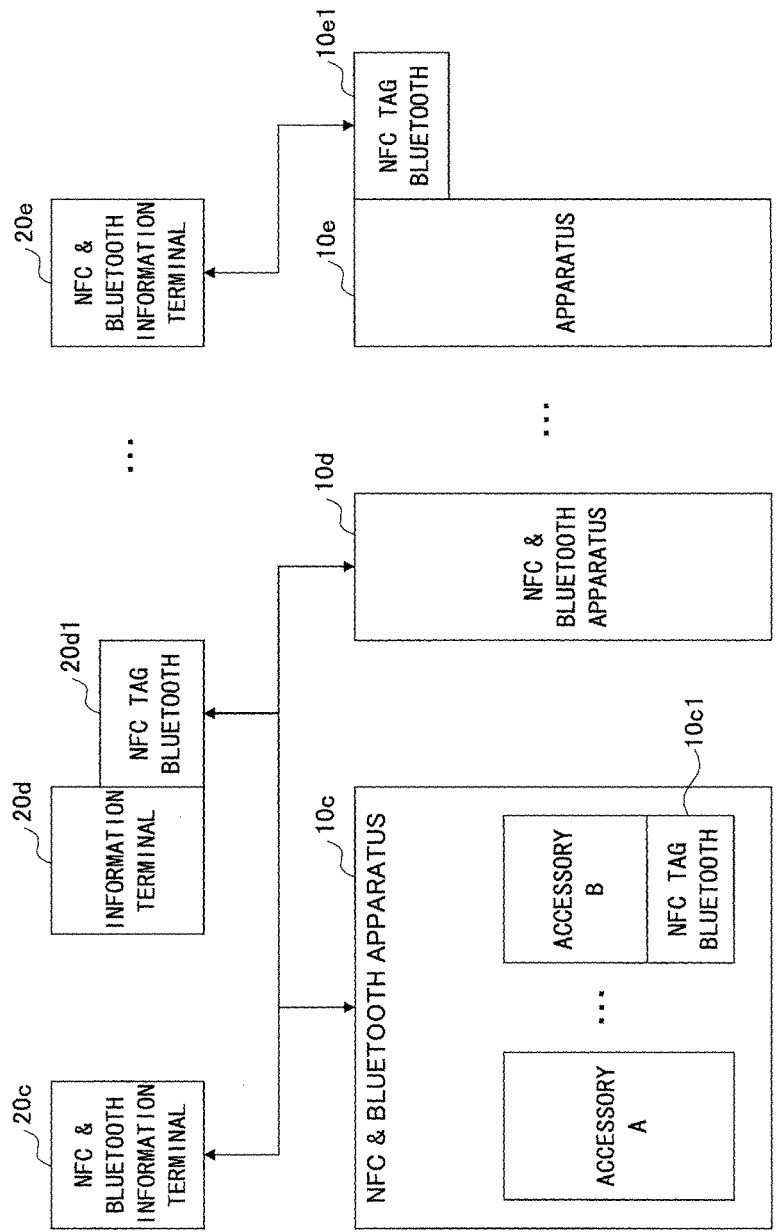

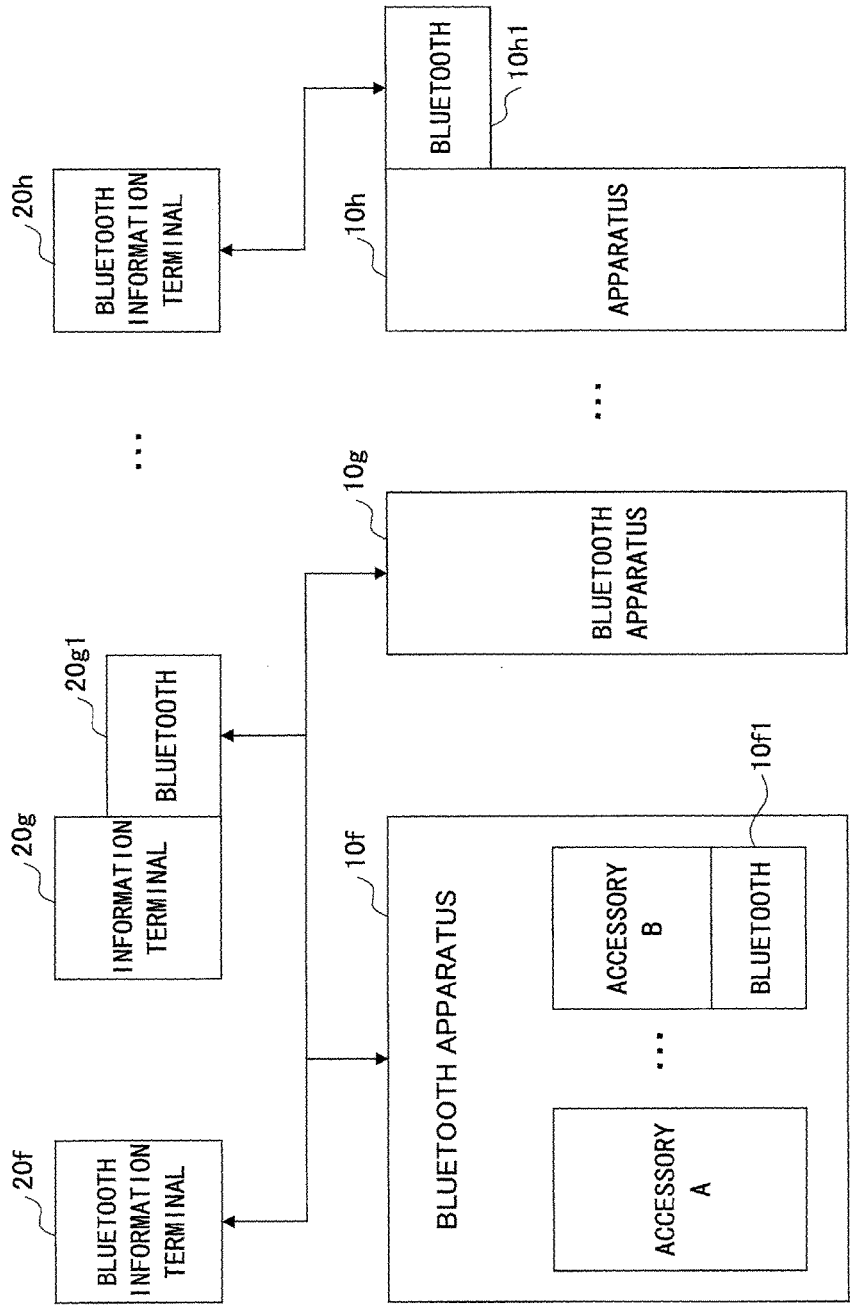

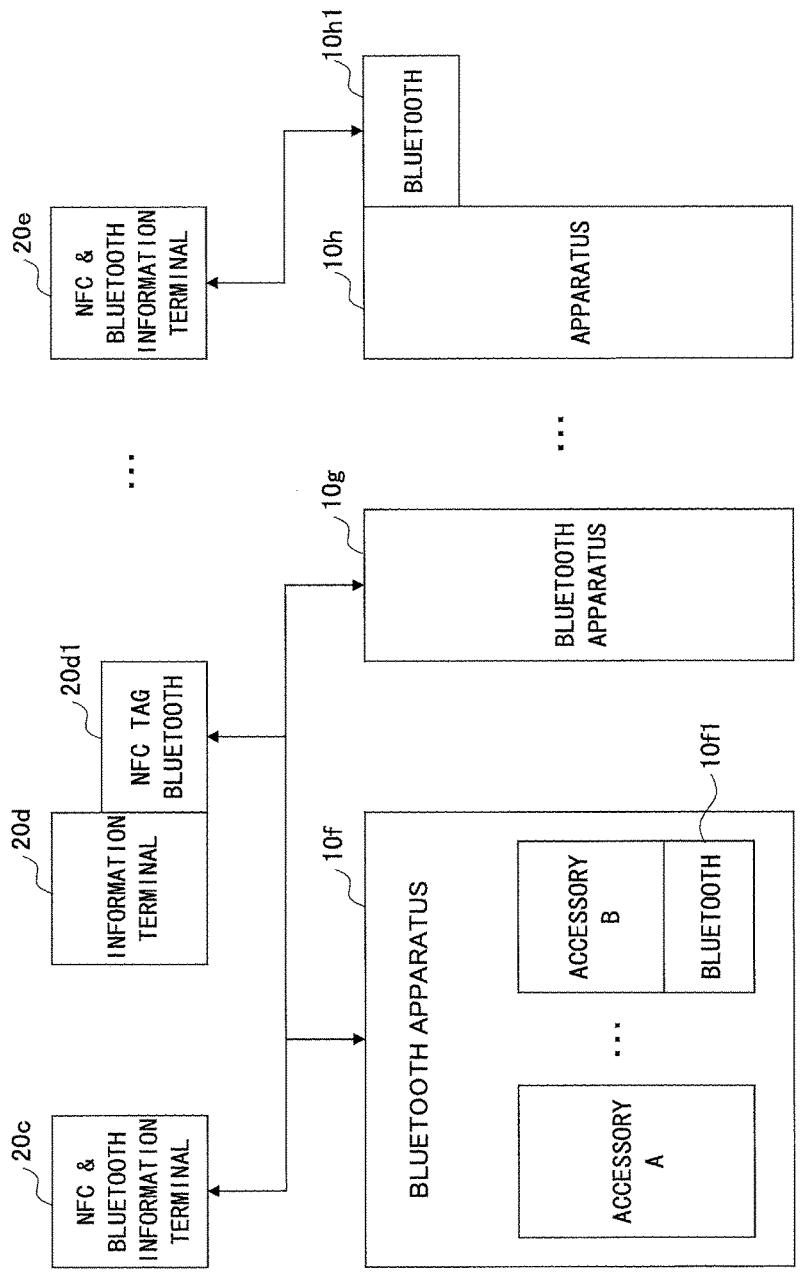

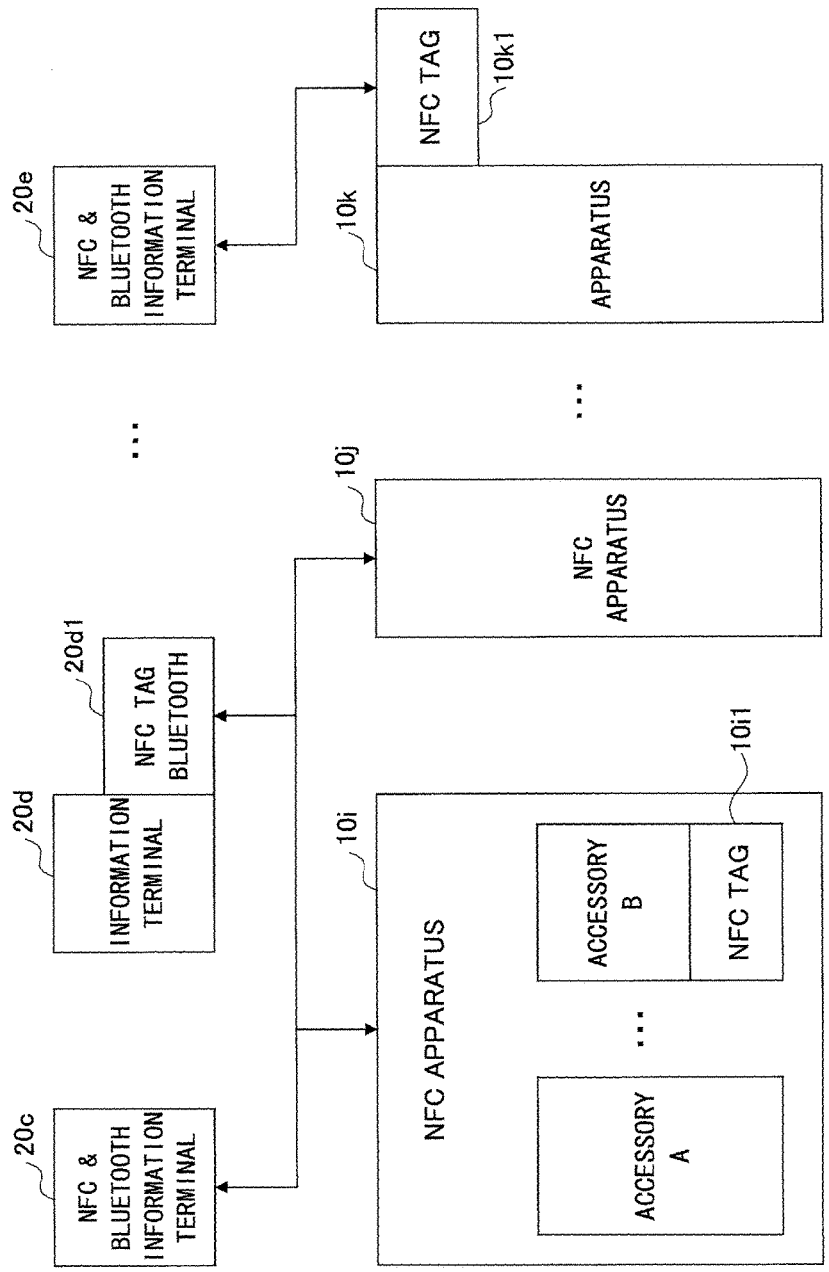

FIG.25A

| APPARATUS CODE | APPARATUS NUMBER | APPARATUS FIRMWARE INFORMATION |
|---|---|---|
| PJ001 | A03397U7 | PJ050 |

FIG.25B

| APPARATUS CODE | APPARATUS NUMBER | APPARATUS FIRMWARE INFORMATION | USER INFORMATION TERMINAL NUMBER |
|---|---|---|---|
| PJ001 | A03397U7 | PJ050 | 12373297556 |

FIG.25C

| APPARATUS CODE | SET FIRMWARE INFORMATION |
|---|---|
| PJ001 | PJ051 |

FIG.25D

| SET FIRMWARE INFORMATION | APPARATUS FIRMWARE INFORMATION |
|---|---|
| PJ051 | PJ050 |

FIG.26A

| APPARATUS CODE | APPARATUS NUMBER | APPARATUS FIRMWARE INFORMATION | REGISTRATION DATE |
|---|---|---|---|
| PJ001 | A03582X2 | PJ051 | 20130521 |
| PJ001 | A03397U7 | PJ050 | 20130212 |
| MP001 | M03878T4 | MP020 | 20130521 |

| APPARATUS CODE | APPARATUS NUMBER | APPARATUS FIRMWARE INFORMATION | REGISTRATION DATE |
|---|---|---|---|
| PJ001 | A03582X2 | PJ051 | 20130521 |
| PJ001 | A03397U7 | PJ051 | 20130602 |
| MP001 | M03878T4 | MP020 | 20130521 |

| APPARATUS CODE | SET FIRMWARE INFORMATION | FIRMWARE SIZE | REGISTRATION DATE |
| --- | --- | --- | --- |
| PJ001 | PJ051 | 1200 | 20130425 |
| MP001 | MP020 | 2000 | 20130331 |
| IP023 | IP003 | 50 | 20130509 |
| CA916 | CA065 | 5000 | 20130201 |

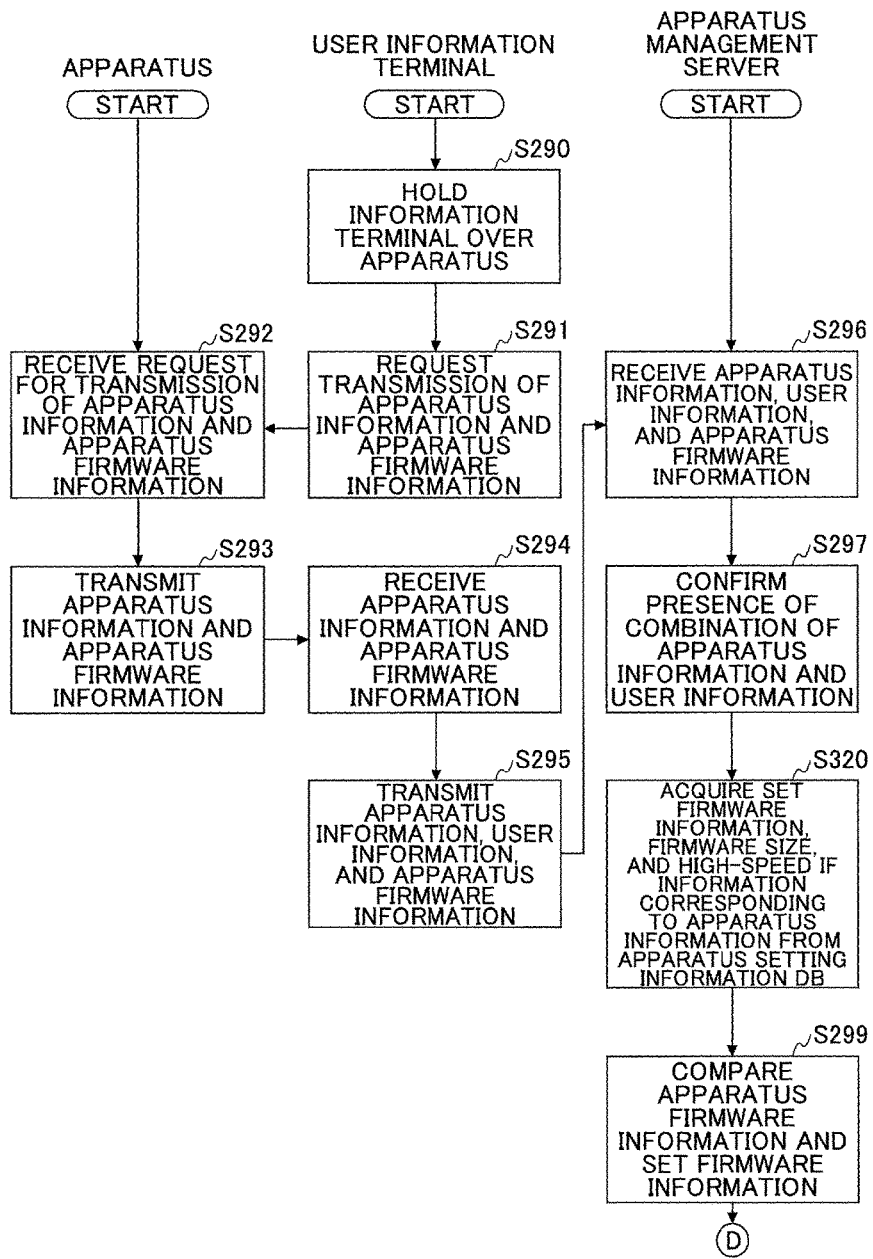

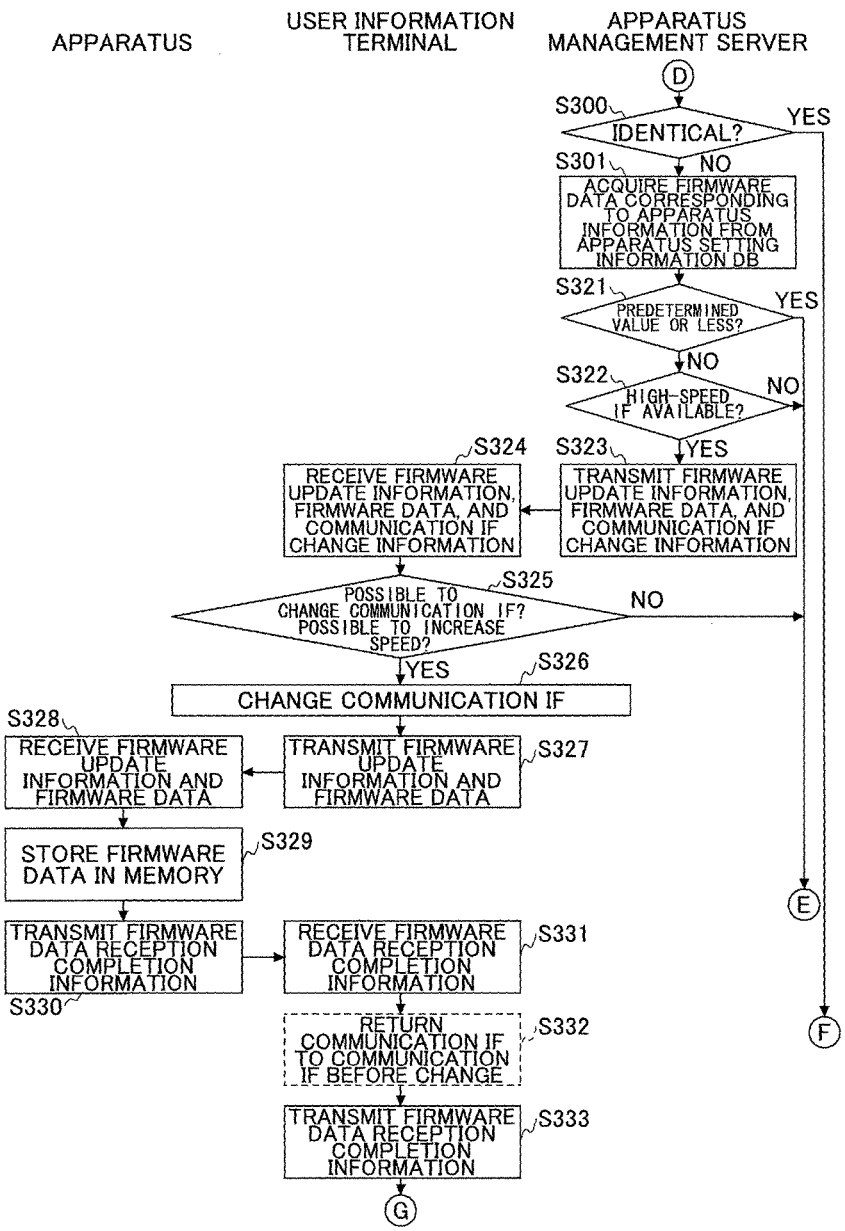

FIG.28A

| APPARATUS CODE | APPARATUS NUMBER | APPARATUS FIRMWARE INFORMATION |
|---|---|---|
| PJ001 | A03397U7 | PJ050 |

FIG.28B

| APPARATUS CODE | APPARATUS NUMBER | APPARATUS FIRMWARE INFORMATION | USER INFORMATION TERMINAL NUMBER |
|---|---|---|---|
| PJ001 | A03397U7 | PJ050 | 12373297556 |

FIG.28C

| APPARATUS CODE | SET FIRMWARE INFORMATION | FIRMWARE SIZE | HIGH-SPEED IF |
|---|---|---|---|
| PJ001 | PJ051 | 1200 | YES |

FIG.28D

| SET FIRMWARE INFORMATION | APPARATUS FIRMWARE INFORMATION |
|---|---|
| PJ051 | PJ050 |

FIG.28E

| APPARATUS CODE | NUMBER OF RADIO IFs | HIGH-SPEED IF | NFC | BLUETOOTH | Wi-Fi |
|---|---|---|---|---|---|
| PJ001 | 2 | YES | A/B/F | V4.0 | |
| MP001 | 2 | YES | A/B/F | V4.0 | |
| IP023 | 1 | NO | A/B/F | | |
| CA916 | 2 | YES | A/B/F | | a/b/g/n |

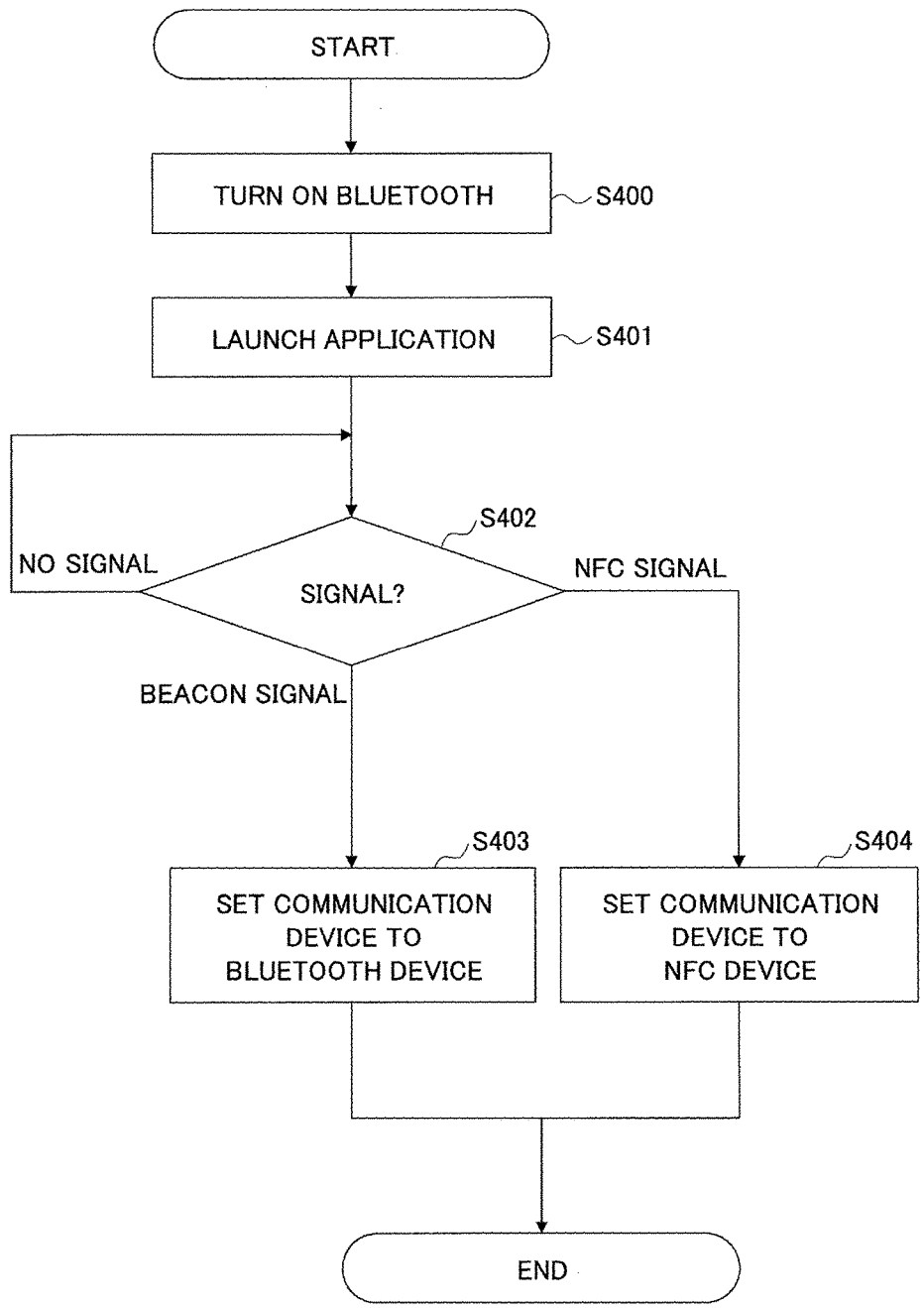

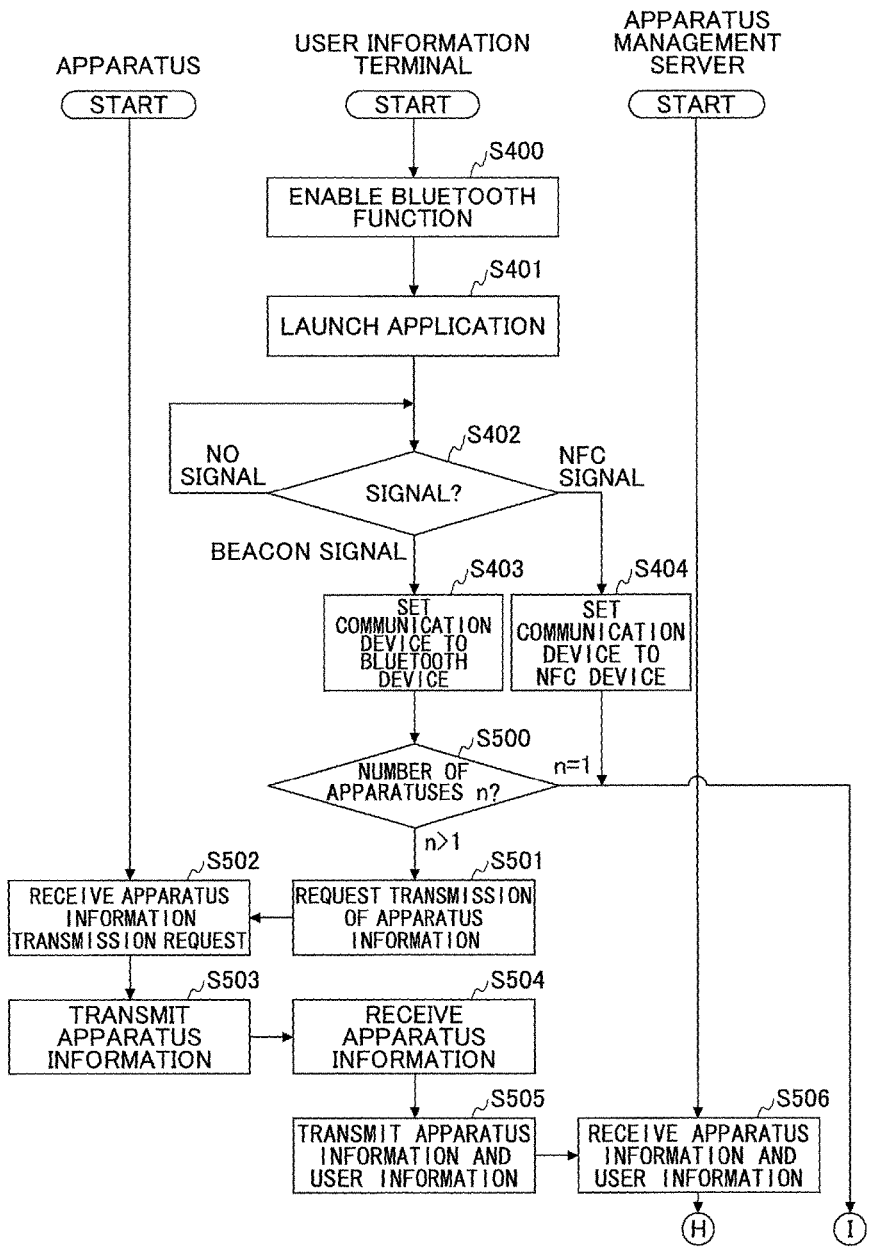

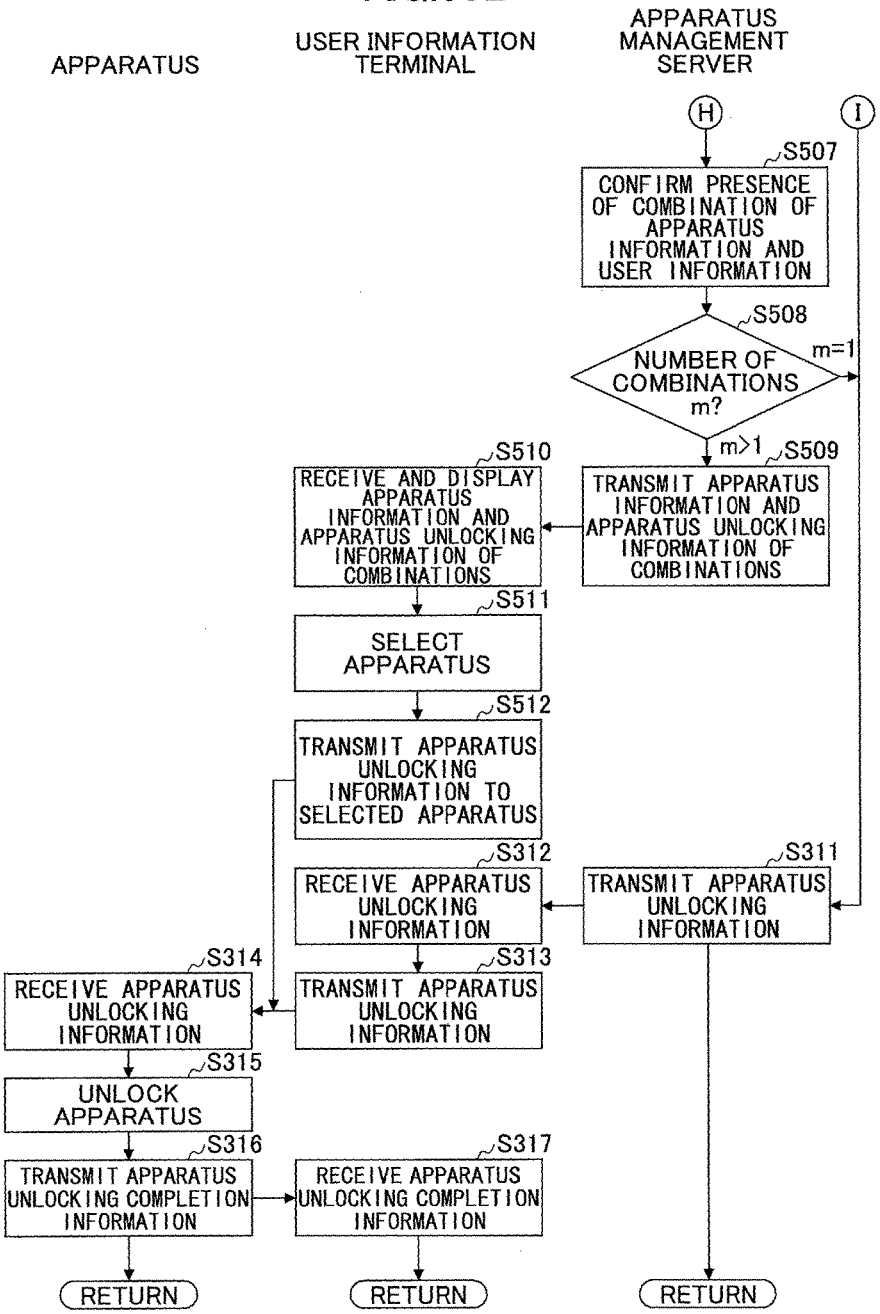

FIG.31A

| BEACON SIGNAL |
| --- |
| 11111111 |
| 22222222 |
| 33333333 |

FIG.31B

| APPARATUS CODE | APPARATUS NUMBER |
| --- | --- |
| PJ001 | A03582X2 |
| MP001 | M03878T4 |
| PJ001 | A03397U7 |

FIG.31C

| APPARATUS CODE | APPARATUS NUMBER | USER INFORMATION TERMINAL NUMBER |
| --- | --- | --- |
| PJ001 | A03582X2 | 12334894532 |
| MP001 | M03878T4 | 12334894532 |
| PJ001 | A03397U7 | 12334894532 |

FIG.31D

| APPARATUS CODE | APPARATUS NUMBER | USER INFORMATION TERMINAL NUMBER |
|---|---|---|
| PJ001 | A03582X2 | 12334894532 |
| MP001 | M03878T4 | 12334894532 |

FIG.31E

| APPARATUS CODE | APPARATUS NUMBER | USER INFORMATION TERMINAL NUMBER |
|---|---|---|
| PJ001 | A03582X2 | 12334894532 |

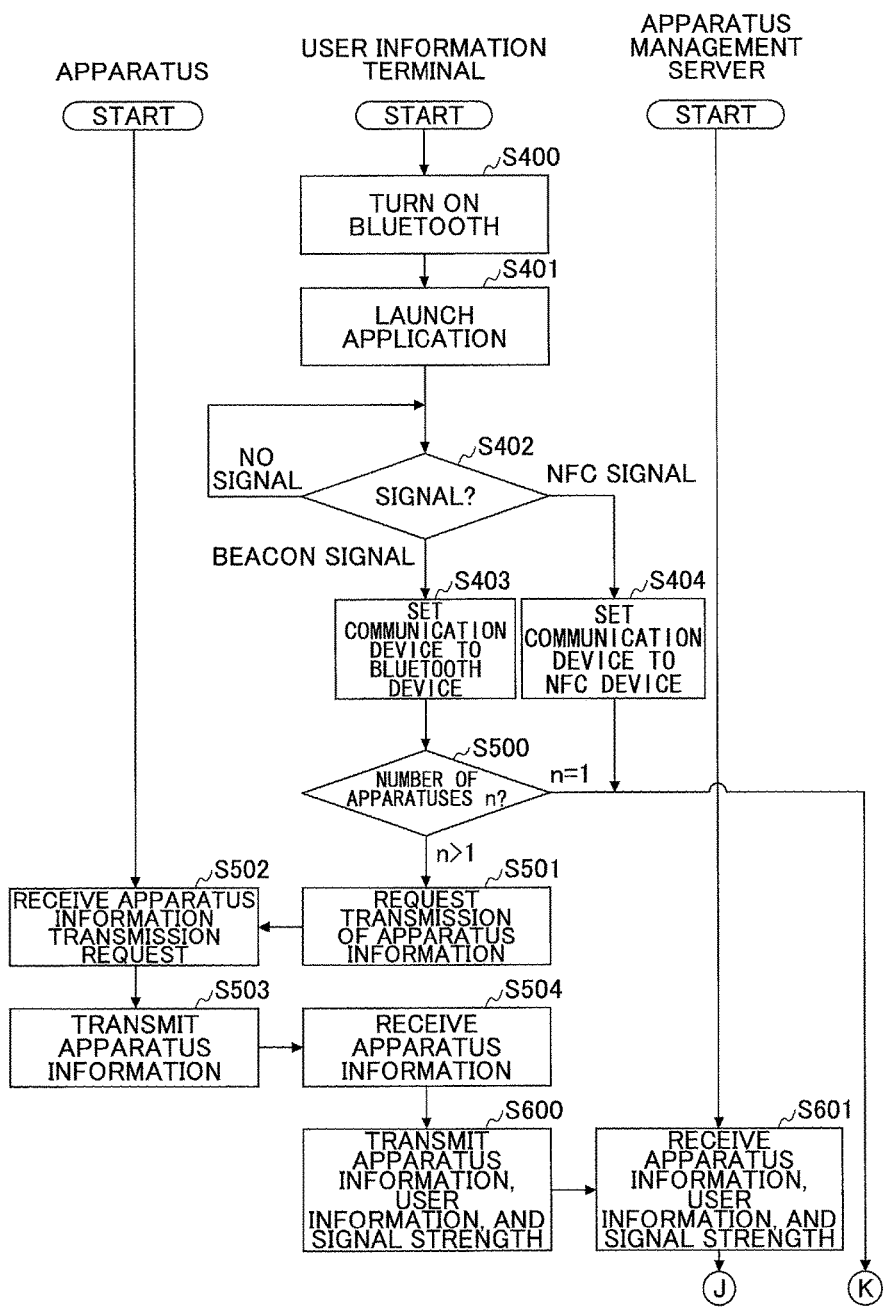

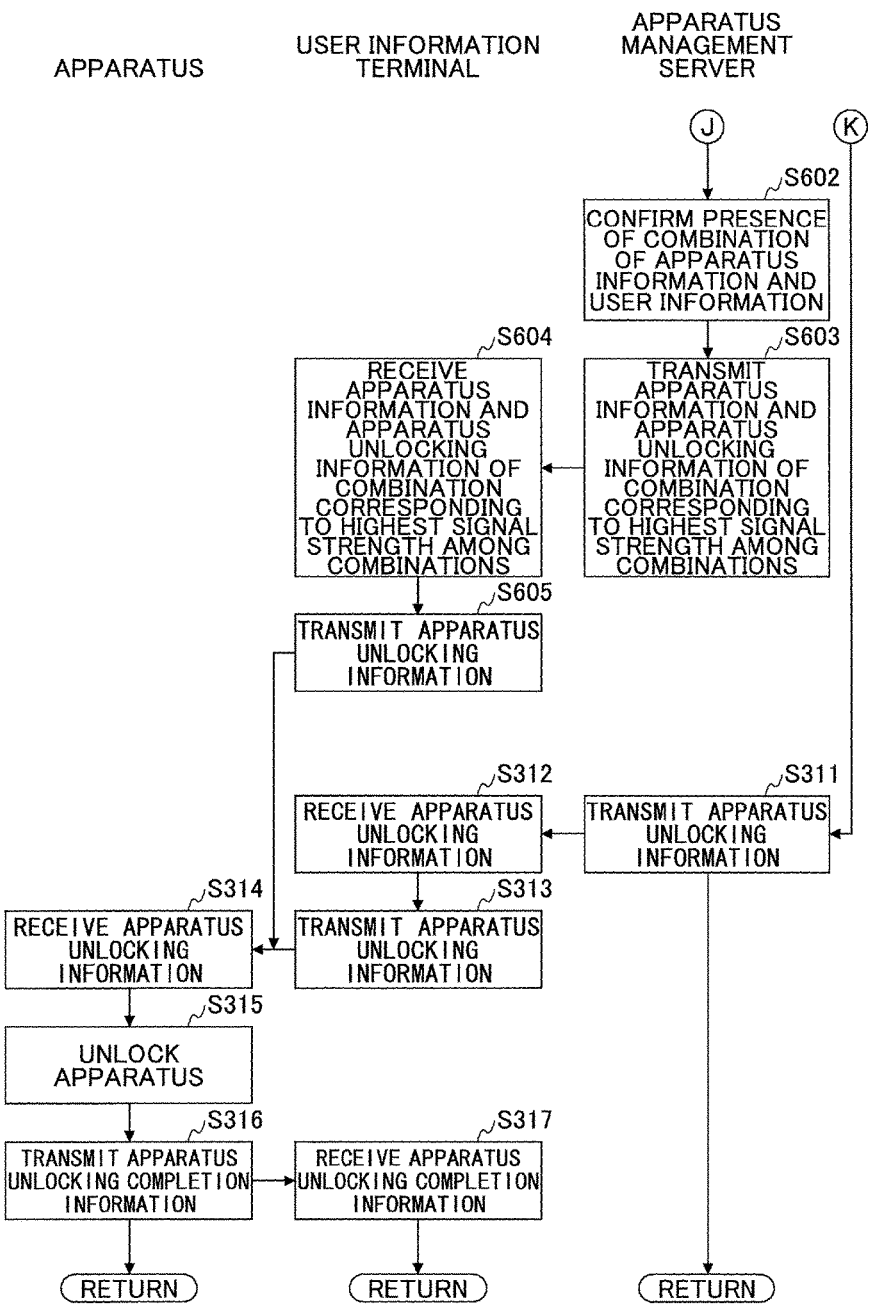

FIG.33A

| BEACON SIGNAL | SIGNAL STRENGTH |
|---|---|
| 11111111 | 65 |
| 22222222 | 23 |
| 33333333 | 45 |

FIG.33B

| APPARATUS CODE | APPARATUS NUMBER |
|---|---|
| PJ001 | A03582X2 |
| MP001 | M03878T4 |
| PJ001 | A03397U7 |

FIG.33C

| APPARATUS CODE | APPARATUS NUMBER | USER INFORMATION TERMINAL NUMBER | SIGNAL STRENGTH |
|---|---|---|---|
| PJ001 | A03582X2 | 12334894532 | 65 |
| MP001 | M03878T4 | 12334894532 | 23 |
| PJ001 | A03397U7 | 12334894532 | 45 |

FIG.33D

| APPARATUS CODE | APPARATUS NUMBER | USER INFORMATION TERMINAL NUMBER | SIGNAL STRENGTH |
|---|---|---|---|
| PJ001 | A03582X2 | 12334894532 | 65 |
| MP001 | M03878T4 | 12334894532 | 23 |

FIG.33E

| APPARATUS CODE | APPARATUS NUMBER | USER INFORMATION TERMINAL NUMBER | SIGNAL STRENGTH |
|---|---|---|---|
| PJ001 | A03582X2 | 12334894532 | 65 |

APPARATUS MANAGEMENT SYSTEM, INFORMATION TERMINAL, APPARATUS MANAGEMENT APPARATUS, AND APPARATUS MANAGEMENT METHOD

CROSS-REFERENCE TO RELATED APPLICATIONS

This application is a continuation application filed under 35 U.S.C. 111(a) claiming benefit under 35 U.S.C. 120 and 365(c) of PCT International Application No. PCT/JP2014/071610, filed on Aug. 19, 2014 and designating the U.S., which claims priority to Japanese Patent Application No. 2013-169972, filed on Aug. 19, 2013 and Japanese Patent Application No. 2014-132165, filed on Jun. 27, 2014. The entire contents of the foregoing applications are incorporated herein by reference.

BACKGROUND OF THE INVENTION

1. Field of the Invention

The present invention relates to apparatus management systems, information terminals, apparatus management apparatuses, and apparatus management methods.

2. Description of the Related Art

In recent years, electronic keys using an IC card have been used for car leasing and hotel keys in lieu of mechanical keys. Furthermore, portable information terminals such as NFC (Near Field Communication)-enabled smartphones have been commercialized and a study has been made of applications using such smartphones. For example, in lieu of conventional IC cards, smartphones incorporating their function have been used at ticket gates of stations. Furthermore, it has been known that electronic payment services using smartphones have been provided.

For example, Japanese Laid-Open Patent Application No. 2009-251649 discloses a system including an electronic apparatus, an information terminal, and a server, where the server authenticates the information terminal and the electronic apparatus. Japanese Laid-Open Patent Application No. 2009-251649 discloses a configuration where for simplification of apparatus authentication, authentication is performed by registering local identification information provided in the electronic apparatus and the user authentication information of the information terminal with the server in advance and collating their information with the information registered with the server.

SUMMARY OF THE INVENTION

According to an aspect of the present invention, an apparatus management system managing an apparatus through an information terminal, includes a transmission part configured to transmit terminal information identifying the information terminal and apparatus information identifying the apparatus, a reception part configured to receive the terminal information and the apparatus information, an authentication part configured to determine whether the received terminal information and apparatus information match one of a plurality of registered combinations of terminal information and apparatus information, and a notification part configured to transmit apparatus management information to the information terminal when the authentication part determines that the received terminal information and apparatus information match the one of the plurality of registered combinations of terminal information and apparatus information.

According to an aspect of the present invention, an apparatus management apparatus managing an apparatus through an information terminal, the apparatus management apparatus including a reception part configured to receive terminal information identifying the information terminal and apparatus information identifying the apparatus, an authentication part configured to perform first authentication that determines whether the received terminal information and apparatus information match one of a plurality of registered combinations of terminal information and apparatus information, and a notification part configured to transmit apparatus management information to the information terminal when the authentication part determines that the received terminal information and apparatus information match the one of the plurality of registered combinations of terminal information and apparatus information.

According to an aspect of the present invention, an apparatus management method for managing an apparatus through an information terminal includes transmitting, by the information terminal, terminal information identifying the information terminal and apparatus information identifying the apparatus, receiving, by an apparatus management apparatus, the terminal information and the apparatus information, determining, by the apparatus management apparatus, whether the received terminal information and apparatus information match one of a plurality of registered combinations of terminal information and apparatus information, and transmitting, by the apparatus management apparatus, apparatus management information to the information terminal in response to determining that the received terminal information and apparatus information match the one of the plurality of registered combinations of terminal information and apparatus information.

The object and advantages of the invention will be realized and attained by means of the elements and combinations particularly pointed out in the claims.

It is to be understood that both the foregoing general description and the following detailed description are exemplary and explanatory and not restrictive of the invention.

BRIEF DESCRIPTION OF THE DRAWINGS

Other objects, features and advantages of the present invention will become more apparent from the following detailed description when read in conjunction with the accompanying drawings, in which:

FIG. 8A is a diagram illustrating an example of a key management DB according to an embodiment;

FIG. 8B is a diagram illustrating an example of the key management DB according to an embodiment;

FIG. 8C is a diagram illustrating an example of the key management DB according to an embodiment;

FIG. 8D is a diagram illustrating an example of the key management DB according to an embodiment;

FIG. 9 is a flowchart illustrating a user information registration process according to an embodiment;

FIGS. 10A and 10B are flowcharts illustrating an unlocking and guidance display process according to an embodiment;

FIG. 12 is a flowchart illustrating a guidance selection process according to an embodiment;

FIG. 14 is a diagram illustrating an example of an apparatus operation information DB according to an embodiment;

FIG. 15 is a diagram illustrating an apparatus operation information correspondence table according to an embodiment;

FIG. 20A is a diagram illustrating an example of apparatuses and information terminals according to the second embodiment;

FIG. 20B is a diagram illustrating another example of apparatuses and information terminals according to the second embodiment;

FIG. 20C is a diagram illustrating another example of apparatuses and information terminals according to the second embodiment;

FIG. 20D is a diagram illustrating another example of apparatuses and information terminals according to the second embodiment;

FIGS. 25A through 25D are diagrams illustrating examples of information transmitted and received in the key unlocking process of FIGS. 24A and 24B;

FIGS. 26A through 26C are diagrams illustrating examples of information transmitted and received in the key unlocking process of FIGS. 24A and 24B;

FIGS. 27A through 27C are flowcharts illustrating a key unlocking process according to a variation of the second embodiment;

FIGS. 28A through 28E are diagrams illustrating examples of information transmitted and received in the key unlocking process of FIGS. 27A through 27C;

FIG. 29 is a flowchart illustrating a communication device switching process according to a third embodiment;

FIGS. 30A and 30B are flowcharts illustrating a communication device switching process according to a first variation of the third embodiment;

FIGS. 31A through 31E are diagrams illustrating examples of information transmitted and received in the communication device switching process of FIGS. 30A and 30B;

FIGS. 32A and 32B are flowcharts illustrating a communication device switching process according to a second variation of the third embodiment; and FIGS. 33A through 33E are diagrams illustrating examples of information transmitted and received in the communication device switching process of FIGS. 32A and 32B.

DETAILED DESCRIPTION OF THE PREFERRED EMBODIMENTS

Figure 1:
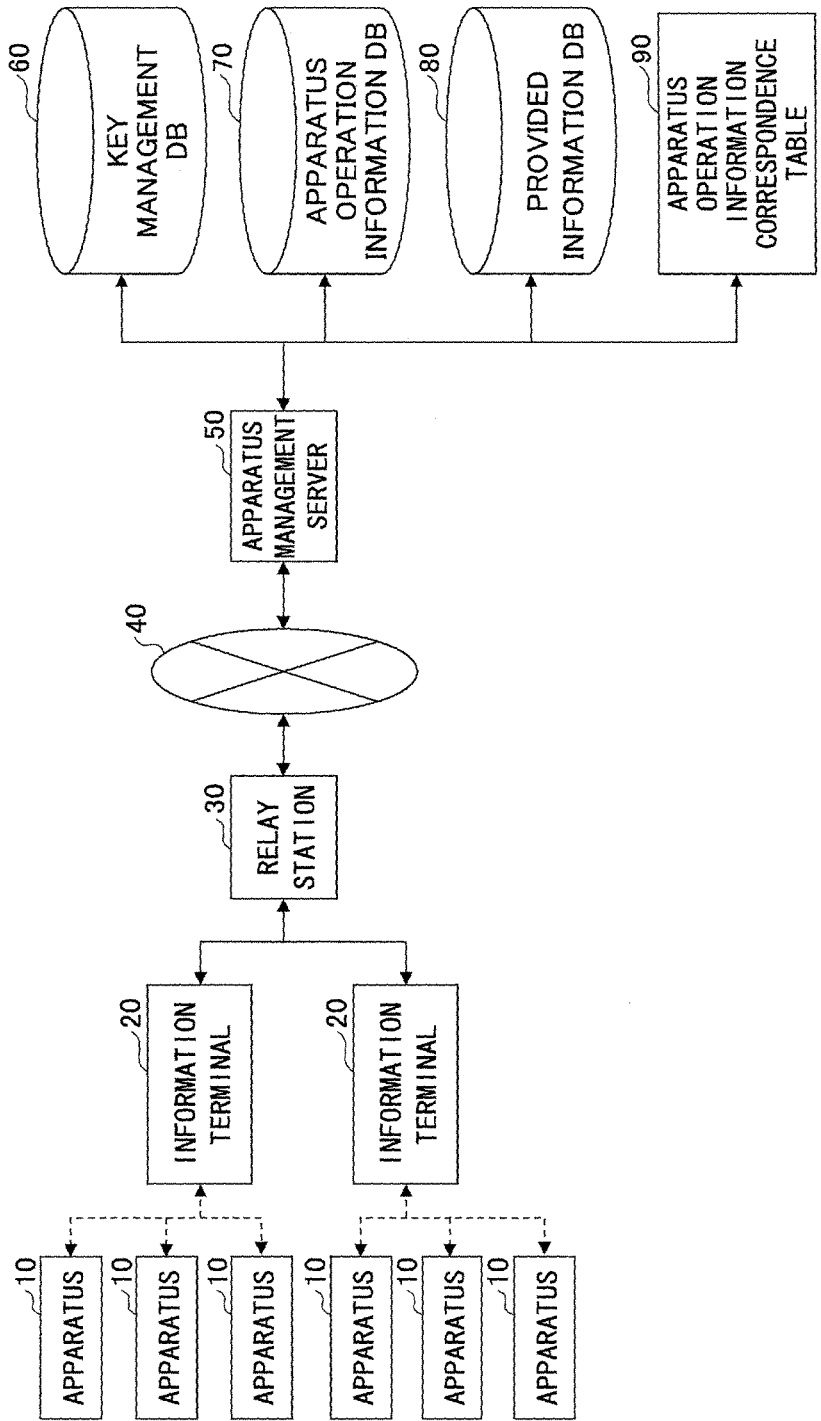
FIG. 1 is a diagram illustrating a configuration of an apparatus management system according to a first embodiment.

Electronic authentication that has been proposed authenticates an individual electronic apparatus and information terminal, and does not support authenticating multiple electronic apparatuses and multiple information terminals managing the electronic apparatuses. On the other hand, when the number of system-managed electronic apparatuses increases, it becomes necessary to manage the electronic apparatuses using multiple manager terminals.

According to an aspect of the present invention, it is possible to provide an apparatus management system capable of managing multiple apparatuses and multiple information terminals.

A description is given, with reference to the accompanying drawings, of embodiments of the present invention. In the specification and drawings, constituent elements having substantially the same functional configuration are referred to by the same reference numeral, and are not repeatedly described.

The conventional electronic authentication has a problem in that electronic authentication techniques that have been proposed authenticate an individual electronic apparatus and information terminal, and are prevented from supporting multiple information terminals that manage multiple electronic apparatuses. In systems that manage a large number of apparatuses, however, the apparatuses need to be managed by multiple managers. Furthermore, it is impossible for the current systems to handle setting users of the apparatuses.

The conventional electronic authentication has another problem in that it is impossible to execute an authentication process when an electronic apparatus, an information terminal or a server goes offline. Normally, authentication information is registered with a server, and the success of authentication is determined when the registered authentication information matches the authentication information of an electronic apparatus or an information terminal. In this case, however, when the electronic apparatus, the information terminal or the server goes offline, the electronic apparatus or the information terminal is prevented from connecting to the server, thus making it impossible to perform authentication.

The conventional electronic authentication has another problem in that an information terminal is prevented from going online when performing proximity communications with an electronic apparatus because an application of the information terminal is stopped by a customer. According to conventional information terminals, it is difficult to stop applications that are running in the background. Recent smartphones, however, allow users to stop applications running in the background. This is for preventing reduction in the operable time of smartphones due to battery power consumption caused by the operation of applications in the background. Accordingly, for example, when a user has an application that connects to a phone line stopped on purpose, it is possible to obtain information from an electronic apparatus through NFC by holding the smartphone over the electronic apparatus, but the application, which is not online, does not operate. Accordingly, the user may mistake it for a malfunction and make a complaint against a service provider.

A description is given below of embodiments of an apparatus management system capable of managing multiple apparatuses and multiple information terminals to solve one or more of the above-described problems.

First Embodiment

First, a description is given, with reference to FIG. 1, of a configuration of an apparatus management system according to a first embodiment of the present invention. FIG. 1 is a diagram illustrating a configuration of an apparatus management system according to the first embodiment. The apparatus management system of FIG. 1 includes multiple apparatuses 10, multiple information terminals 20, a relay station 30, a network 40 such as the Internet, an apparatus management server 50, a key management database (DB) 60, an apparatus operation information DB 70, a provided information DB 80, and an apparatus operation information correspondence table 90. The apparatuses 10 are electronic apparatuses that are objects of management. The information terminals 20 have a function as an electronic key. The relay station 30 has a relay function, and is, for example, a cellular phone base station, a Wi-Fi (registered trademark) station or the like. The apparatus management server 50 performs management of the apparatuses 10 including issuance of an electronic key. The key management DB 60 stores information for managing the unlocking keys of the apparatuses 10. The apparatus operation information DB 70 stores the operation information of the unlocked apparatuses 10. The provided information DB 80 stores guidance information provided to users, etc. The apparatus operation information correspondence table 90 stores apparatus operation information preset for each apparatus 10. In the following description, in the case of describing a common configuration, the apparatuses 10 may be collectively referred to as "apparatus 10" and the information terminals 20 may be collectively referred to as "information terminal 20."

The apparatus 10 contains a radio chip. Any apparatuses such as projectors, office machines, home appliances, electric bicycles, automobiles, and power tools may be objects of management. Furthermore, not only the body of the apparatus 10 but also the apparatus 10 including accessories such as a battery may be an object of management of the system.

Figure 2:
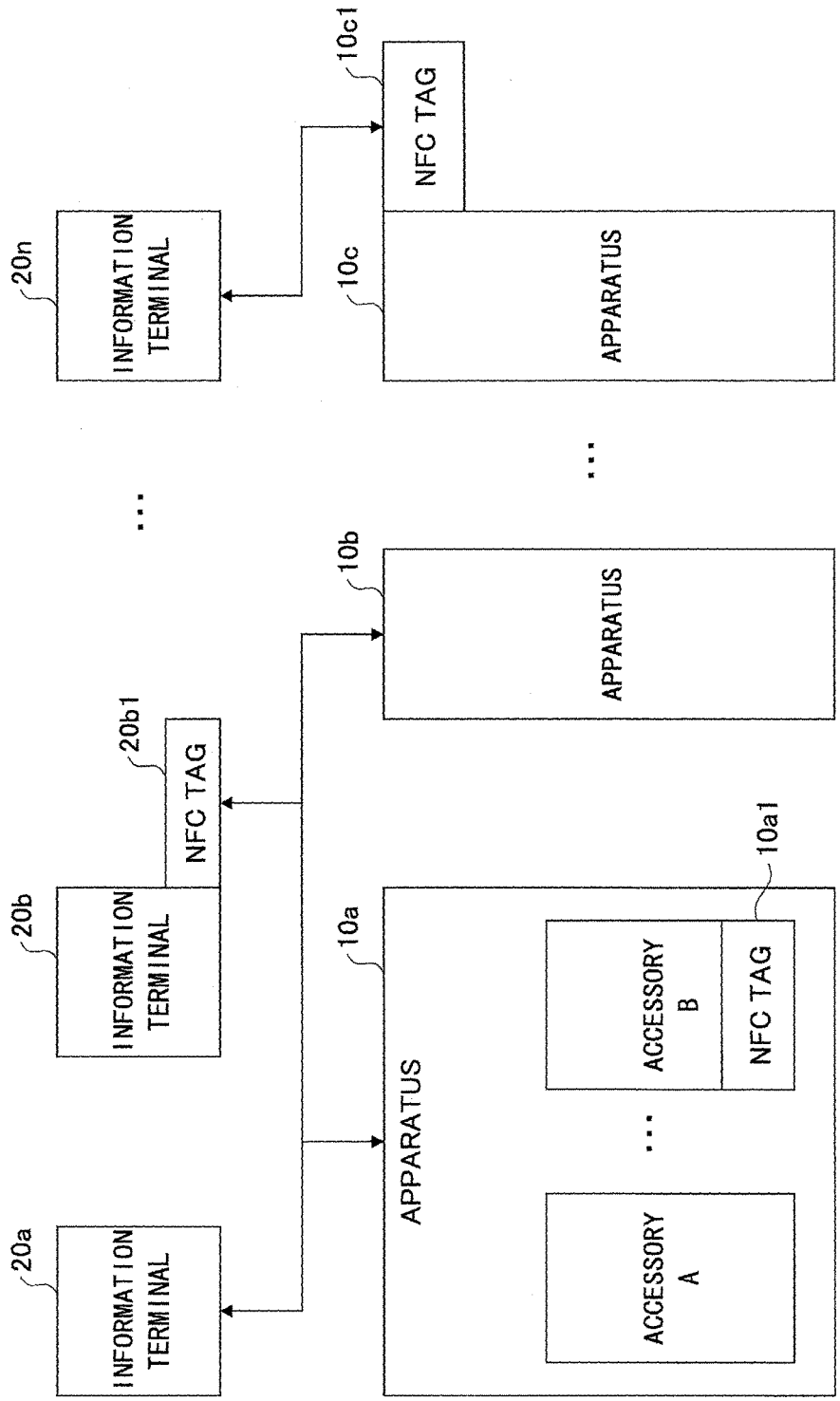
FIG. 2 is a diagram illustrating apparatuses and information terminals according to the first embodiment.

The information terminal 20 contains a radio chip, and may be a small portable information terminal such as a smartphone or a cellular phone. The information terminal 20 is not limited to an electronic apparatus incorporating a radio chip from the time of manufacture, and includes an electronic apparatus into which a memory card or a dongle incorporating a radio chip is inserted at a later stage. In FIG. 2, an information terminal 20a, an information terminal 20n, an accessory A of an apparatus 10a, and an apparatus 10b are electronic apparatuses incorporating a radio chip, and an information terminal 20b, an accessory B of the apparatus 10a, and an apparatus 10c are electronic apparatuses to which an NFC tag 20b1, an NFC tag 10a1, and an NFC tag 10c1 are attached, respectively. This makes it possible for any of the electronic apparatuses illustrated in FIG. 2 to perform short-range communications.

The information terminal 20 functions as a manager information terminal that operates in a manager mode or a user information terminal that operates in a user mode. The information terminal 20 operates on the same application when functioning in either mode, and the same information terminal 20 operates by the authority of a user information terminal (user authority) in some cases and operates by the authority of a manager information terminal (manager authority) in other cases. When apparatus information possessed only by a person having manager authority is input to the information terminal 20, the information terminal 20 operates as a manager information terminal. When another information terminal 20 is held over the information terminal 20 functioning as a manager information terminal, the other information terminal 20 functions as a user information terminal. Furthermore, when the information terminal 20 functions as a user information terminal, the information terminal 20 is prevented from obtaining or displaying information on the rental of apparatuses because the user information terminal does not have authority to rent the apparatus 10.

The apparatus 10 transmits apparatus information to the nearby information terminal 20 via a radio chip contained in the information terminal 20, and starts to operate in response to receiving an electronic key cancellation instruction (an unlocking instruction) transmitted from the information terminal 20.

The information terminal 20 performs, by an application (program) that runs on the information terminal 20, collection of apparatus information and apparatus operation information from the apparatus 10, transmission of an unlocking instruction to the apparatus 10, transmission of apparatus information, apparatus operation information, and terminal information to the apparatus management server 50, acquisition of apparatus unlocking information from the apparatus management server 50, etc.

The apparatus management server 50 mainly performs registration of authentication information with the key management DB 60 and issuance of an electronic key if a combination of apparatus information and terminal information that match apparatus information and terminal information received from the information terminal 20 is registered with the key management DB 60, by referring to the key management DB 60 based on the received apparatus information and terminal information (first authentication). The apparatus management server 50 performs an unlocking process, etc., using data stored in each of the key management DB 60, the apparatus operation information DB 70, the provided information DB 80, and the apparatus operation information correspondence table 90. The apparatus management server 50 is an example of an apparatus management apparatus that manages an apparatus. According to this embodiment, in order not to store as much information (information related to apparatus management) as possible in the information terminal 20, main functions and data are retained in and managed by the apparatus management server 50.

The key management DB 60 stores the authentication information of the apparatus 10 and the information terminal 20, information on an electronic key, etc. The apparatus operation information DB 70 retains information such as the specifications and operation of the apparatus 10. The provided information DB 80 stores information such as information about the apparatus 10 that is available for a rental or lease, guidance information, and campaign information. The apparatus operation information correspondence table 90 is a correspondence table that defines apparatus operation information acquired for each type of the apparatus 10 and its layout (column numbers) (see FIG. 15).

Figure 3:
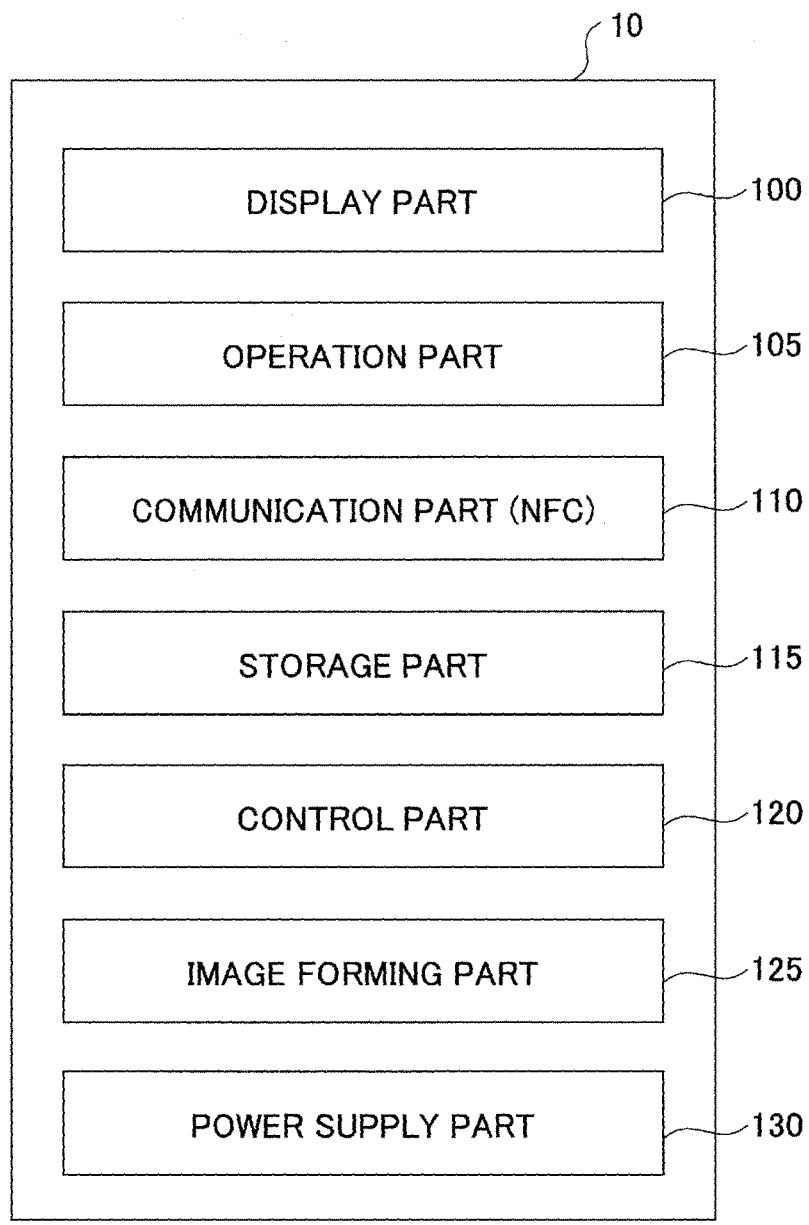
FIG. 3 is a diagram illustrating a configuration of an apparatus according to the first embodiment.
Figure 4:
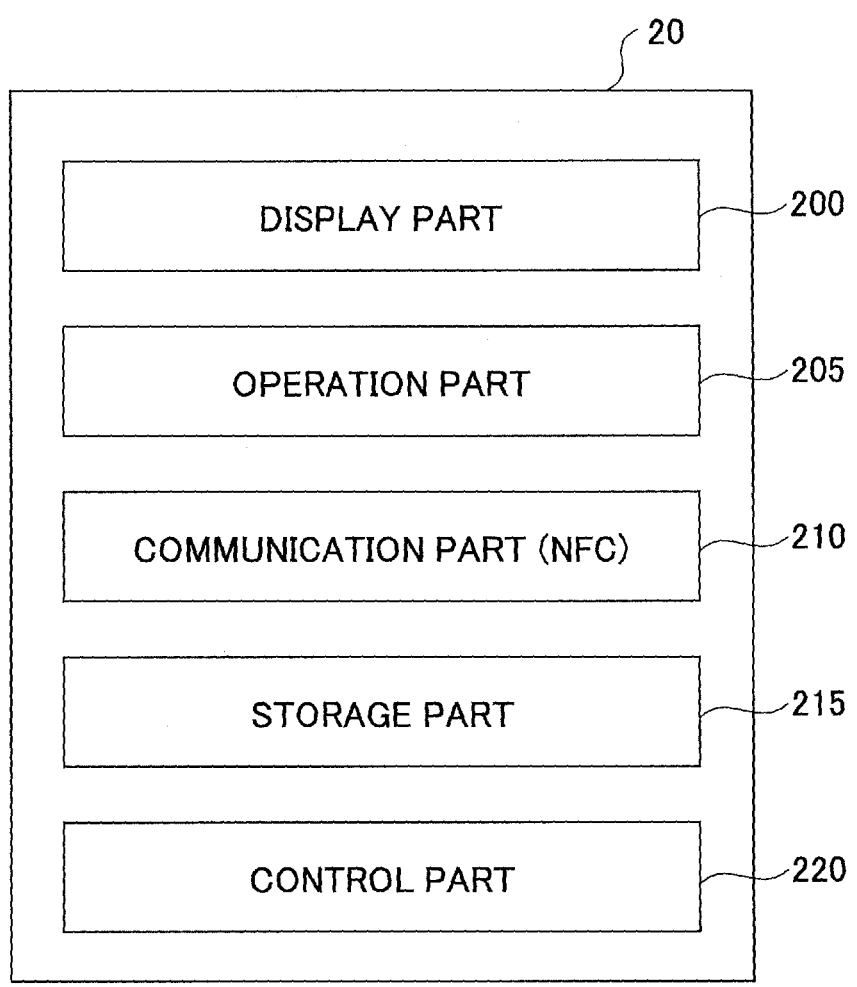
FIG. 4 is a diagram illustrating an information terminal according to the first embodiment.
Figure 5:
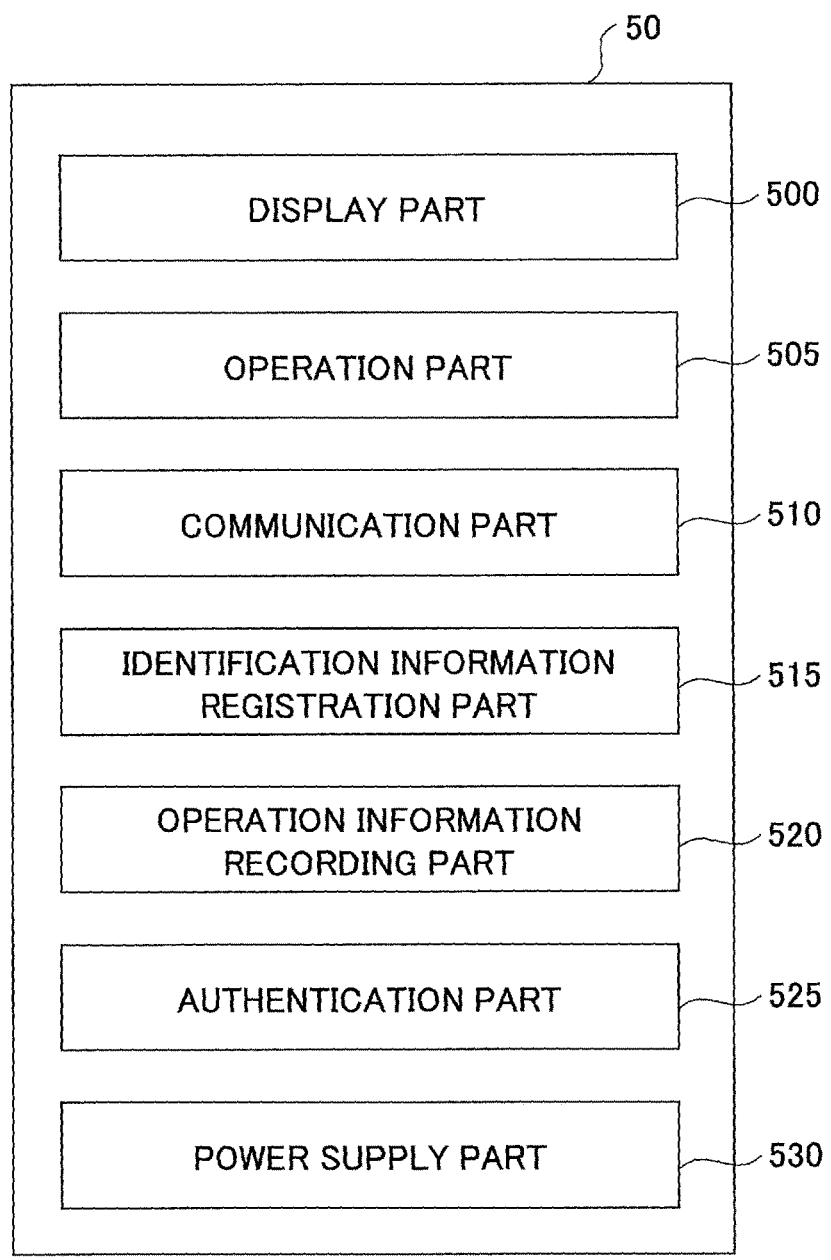
FIG. 5 is a diagram illustrating a configuration of an apparatus management server according to the first embodiment.

Next, a description is given, with reference to FIGS. 3, 4 and 5, of functional configurations of apparatuses of the apparatus management system according to the first embodiment. FIG. 3 illustrates a functional configuration of the apparatus 10. The apparatus 10 includes a display part 100, an operation part 105, a communication part 110, a storage part 115, a control part 120, an image forming part 125, and a power supply part 130. The display part 100 displays predetermined information. The operation part 105 operates the apparatus 105. The communication part 110 has a proximity radio communication function using an NFC-compliant radio chip. The storage part 115 retains the identification information (apparatus information) of the apparatus 10, etc. The control part 120 controls the entire apparatus 10. The image forming part 125 forms a desired image. The power supply part 130 turns on or off the apparatus 10.

FIG. 4 illustrates a configuration of the information terminal 20. The information terminal 20 includes a display part 200, an operation part 205, a communication part 210, a storage part 215, and a control part 220. The display part 200 displays predetermined information. The operation part 205 operates the information terminal 20. The communication part 210 has a proximity radio communication function using an NFC-compliant radio chip, in addition to the communication function and the Internet communication function of a common smartphone or cellular phone. The storage part 215 retains the identification information (terminal information) of the information terminal 20, etc. The control part 220 controls the entire information terminal 20.

FIG. 5 illustrates a configuration of the apparatus management server 50. The apparatus management server 50 includes a display part 500, an operation part 505, a communication part 510, an identification information registration part 515, an operation information recording part 520, an authentication part 525, and a power supply part 530. The display part 500 displays predetermined information. The operation part 505 operates the apparatus management server 50. The communication part 510 has an Internet communication function. The identification information registration part 515 registers or records multiple combinations of the identification information of the apparatus 10 (apparatus information identifying an apparatus) and the identification information of the information terminal 20 (terminal information identifying an information terminal) used for authentication. The operation information recording part 520 records operation information of the apparatus 10. The authentication part 525 executes an authentication process for authorizing a rental of the apparatus 10 based on the apparatus information and the terminal information. The power supply part 530 turns on or off the apparatus management server 50.

Examples of the identification information of the apparatus 10 used for authentication include apparatus information that identifies the apparatus 10, such as an apparatus code or an apparatus number. Examples of the identification information of the information terminal 20 used for authentication include identification information that identifies the information terminal 20 (manager information terminal or user information terminal).

Figure 6:
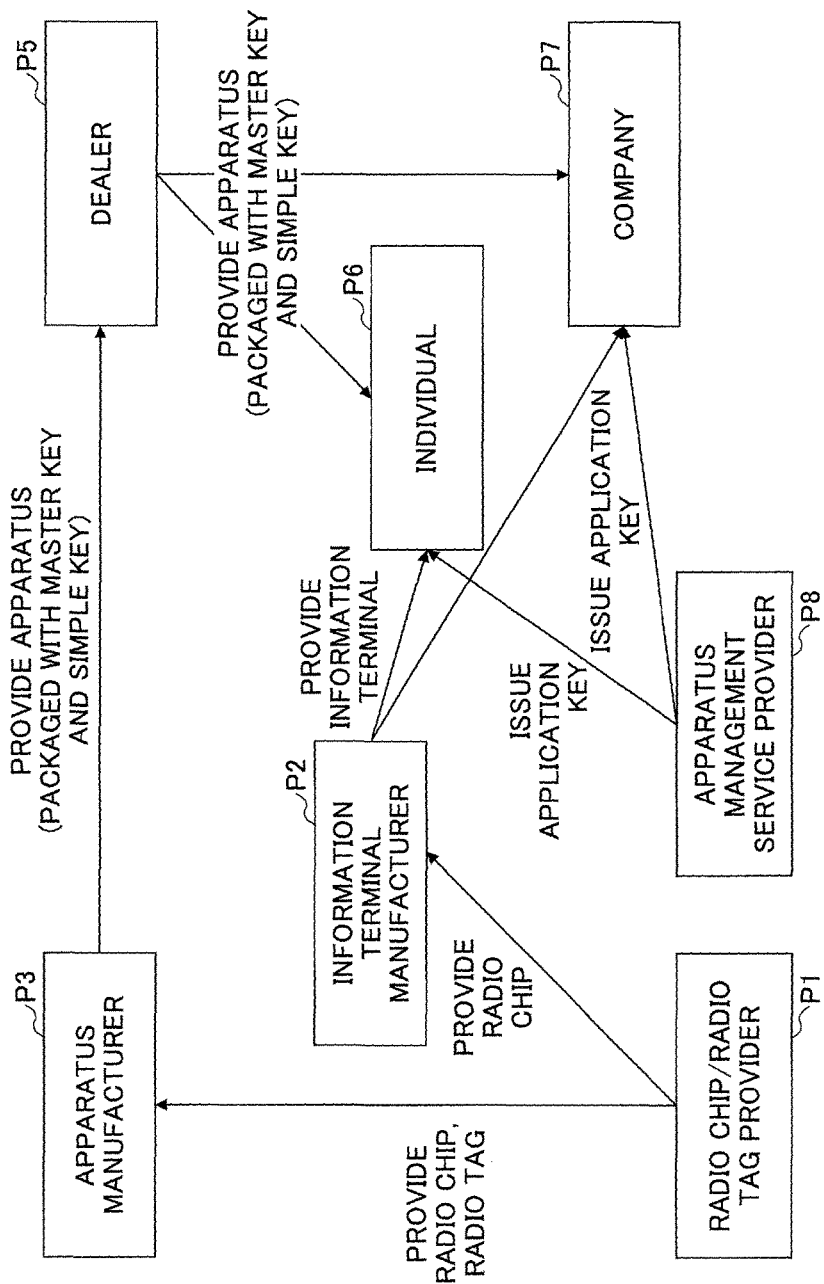
FIG. 6 is a diagram for illustrating the roles of parties involved in the apparatus management system according to the first embodiment.

Next, a brief description is given of the roles of parties involved in the apparatus management system. FIG. 6 is a diagram illustrating parties involved in the apparatus management system and their roles. In FIG. 6, a radio chip/radio tag provider P1 supplies an information terminal manufacturer P2 with a radio chip and provides an apparatus manufacturer with a radio chip and a radio tag.

The information terminal manufacturer P2 provides users such as an individual P6 and a company P7 with the information terminal 20 such as a smartphone or a cellular phone containing the radio chip. The apparatus manufacturer P3 manufactures the apparatus 10 containing the radio chip. At this point, information serving as a master key used for management of an electronic key (a registration destination address, an ID, and a password, or a barcode or the like) is provided together with the apparatus 10. The apparatus 10 provided by the apparatus manufacturer P3 is provided to the individual P6 or the company P7 through a dealer P5 (either a real shop or a virtual shop on a network).

An apparatus management service provider P8 includes an apparatus management server, and provides network services such as issuance of an electronic key in response to an operation of the information terminal 20 by the individual P6 or a manager of the company P7.

Figure 7:
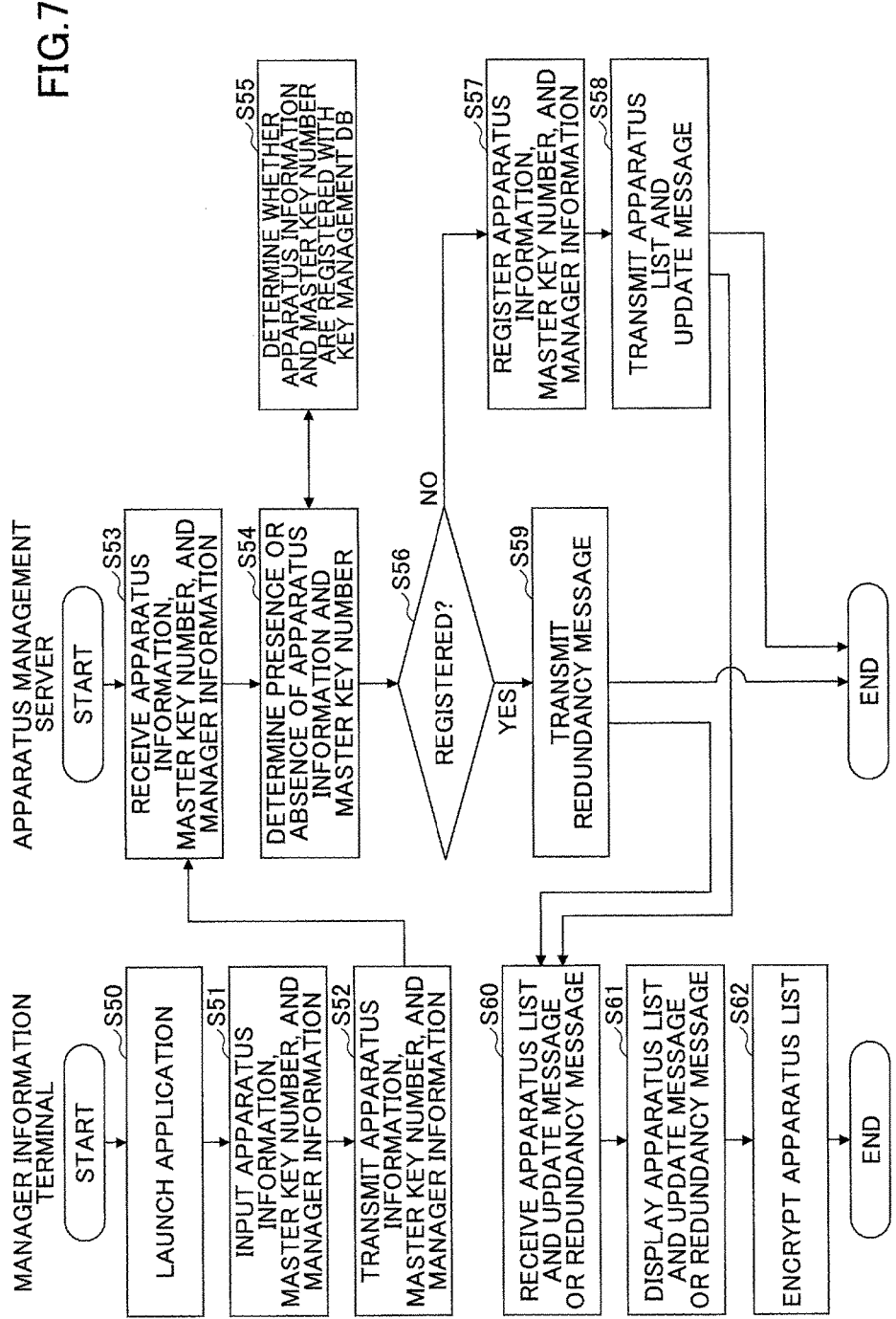
FIG. 7 is a flowchart illustrating a manager information registration process according to an embodiment.

Next, a description is given, with reference to FIG. 7, of a manager information registration process according to an embodiment. FIG. 7 is a flowchart illustrating a manager information registration process according to an embodiment. In FIG. 7, a flow on the left side illustrates an operation of a manager information terminal (the information terminal 20, for example, a smartphone) and a flow on the right side illustrates an operation of the apparatus management server 50.

A master key number and apparatus information used in the manager information registration process are registered with the key management DB 60 at the time of shipment of the apparatus 10 and are attached to the apparatus 10. FIG. 8A illustrates examples of an apparatus number 62 and a master key number 63 registered with the key management DB 60 at the time of shipment of the apparatus 10.

A description is given of an initial process (storage of information in the key management DB 60).

FIGS. 8A, 8B, 8C and 8D illustrate an example format of the key management DB 60. First, the apparatus manufacturer P3 (FIG. 6) packages apparatus information and master key information with the apparatus 10 at the time of shipment, and stores (records) the same apparatus information and master key information in the key management DB 60. The serial number of the apparatus 10 may be used as the apparatus information. It is possible to register the apparatus 10 with the key management DB 60 by inputting the apparatus information to the information terminal 20.

An apparatus code 61 indicates the type of the apparatus 10, and is input using information of the apparatus operation information correspondence table 90 illustrated in FIG. 15 to be stored in the key management DB 60. This inputting and storing process is preferably executed before registration of a manager. This inputting and storing process may be executed by the apparatus manufacturer P3. For example, the apparatus manufacturer P3 directly inputs information determined by the apparatus manufacturer P3 through a network and stores the input information in the key management DB 60. This inputting may be performed by a third party or performed based on a number determined by a dealer.

According to a manager information registration process of FIG. 7, first, a manager checks a master key number and apparatus information (for example, the apparatus number of the apparatus 10) attached to the apparatus 10. Next, the manager downloads an application from a predetermined site (described in an attachment to the apparatus 10), and installs the downloaded application in the information terminal 20 of the manager (manager information terminal). At step S50, the manager information terminal activates the application, and at step S51, a master key number and apparatus information (apparatus number) attached to the apparatus 10 and manager information such as the phone number of a smartphone are input. Once the inputting is completed, at step S52, the manager information terminal transmits the master key number, the apparatus information, and the manager information to the apparatus management server 50.

At step S53, the apparatus management server 50 receives the information transmitted by the manager information terminal, and, first, at step S54, determines whether a master key number and apparatus information are included in the received information. Then, at step S55, the apparatus management server 50 determines whether the combination of the master key number and the apparatus information is recorded in the key management DB 60.

In response to determining that the combination of the received master key number and apparatus information is recorded in the key management DB 60, at step S56, the apparatus management server 50 determines whether the manager information has been registered. In response to determining that the manager information has not been registered (NO at step S56), at step S57, the apparatus management server 50 registers the manager information in association with the matched combination of the master key number and the apparatus information in the key management DB 60. For example, the phone number of a smartphone may be used as the manager information. FIG. 8B illustrates a state of the key management DB 60 where a manager information terminal number 64 is registered as an example of the manager information. At this point, a manager registration date 65 may be stored.

After the registration of the manager information, at step S58, the apparatus management server 50 transmits a message of completion of updating and a list (apparatus list) of apparatuses 10 under control of the manager of the manager information terminal to the manager information terminal. The apparatus list may include, for example, an apparatus number, a manufacturer's serial number, and a registration date.

On the other hand, in response to determining at step S56 that the manager information has been registered with the key management DB 60, at step S59, the apparatus management server 50 informs a service provider or an apparatus provider that the manager information has been registered with the key management DB 60, and also transmits a message to the effect that the manager information has been registered with the key management DB 60 (a message of double registration) to the manager information terminal.

At step S60, the manager information terminal receives the list of managed apparatuses and the message of completion of updating or the massage of double registration, and at step S61, the manager information terminal displays the apparatus list and the message of completion of updating or the massage of double registration on a screen. In response to receiving the apparatus list, at step S62, the manager information terminal encrypts the information of the apparatus list and stores the encrypted information in the storage part 215. The manager may quit the application after confirming the apparatus list.

Next, a description is given, with reference to FIG. 9, of a user information registration process according to an embodiment. FIG. 9 is a flowchart illustrating a user information registration process according to an embodiment. In FIG. 9, a flow on the left side illustrates an operation of the information terminal 20 of a user (user information terminal), a flow at the center illustrates an operation of the information terminal 20 of a manager (manager information terminal), and a flow on the right side illustrates an operation of the apparatus management server 50.

At step S70, the user launches an apparatus management application using the user information terminal. At step S71, the manager launches an apparatus management application using the manager information terminal. At step S72, the manager information terminal transmits manager information to the apparatus management server 50. At step S73, the apparatus management server 50 receives the manager information, and at step S74, the apparatus management server 50 retrieves apparatus information using the manager information so as to create an apparatus list. For example, in FIG. 8B, the apparatus management server 50 retrieves apparatus information (the apparatus number 62) using the manager information (the manager information terminal number 64) so as to create an apparatus list. At step S75, the apparatus management server 50 transmits the created apparatus list.

At step S76, the manager information terminal receives the apparatus list. At step S77, the manager information terminal selects the apparatus 10 to rent in the apparatus list indicating the apparatuses 10 under the management of the manager of the manager information terminal based on a selecting operation by the manager.

At steps S78 through S81, the manager obtains user information (for example, a phone number of the user) through, for example, short-range radio communications using NFC by bringing the manager information terminal close to the user information terminal. Specifically, at step S78, the manager information terminal requests the user information terminal to transmit user information. In response to reception of the request for transmission of user information at step S79, at step S80, the user information terminal transmits user information to the manager information terminal. At step S81, the manager information terminal receives the user information. Thus, according to this embodiment, by using the NFC technology, it is possible to transmit and receive information without using a network.

Next, at step S82, the manager information terminal sets a usage time limit with respect to the user based on the manager's operation. The usage time limit indicates the temporal restriction of up to when the rented apparatus 10 may be used. For example, if the user takes part in a project and needs to use the apparatus 10 in the project, the end date of the project may be set as the usage time limit.

Next, at step S83, the manager information terminal transmits the apparatus information, the manager information, the user information, and the usage time limit information to the apparatus management server 50.

At step S84, the apparatus management server 50 receives the apparatus information, the manager information, the user information, and the usage time limit information. Next, at step S85, the apparatus management server 50 confirms that the received information includes a combination of apparatus information and manager information, and at step S86, the apparatus management server 50 determines whether the apparatus information and the manager information pertaining to the combination have been registered with the key management DB 60.

In response to determining that the apparatus information and the manager information have been registered, at step S87, the apparatus management server 50 registers the user information and the usage time limit information set by the manager with the key management DB 60 in association with the registered apparatus information and manager information. At this point, the apparatus management server 50 may register a registration date with the key management DB 60. FIG. 8C illustrates a case where user information (a user information terminal number 66), a registration date 68, and information on a usage time limit 67 are registered with the key management DB 60. Examples of the user information include the user information terminal number 66 and a SIM ID (a unique ID number for identifying a phone number). Use of both the user information terminal number 66 and a SIM ID as the user information makes it possible to determine whether a trouble is due to the effect of the type of the information terminal 20 when the trouble happens.

At step S88, the apparatus management server 50 notifies the manager information terminal and the user information terminal of completion of registration, and transmits a list of apparatus information, user information, and usage time limit information managed by the manager to the manager information terminal.

At step S89, the manager information terminal receives the list of apparatus information, user information, and usage time limit information managed by the manager, and displays the received list. At step S90, the manager information terminal encrypts the information of the received list, and stores the encrypted information in the storage part 215. The manager may quit the application after confirming the received list.

As an example of the result of the above-described process of registering manager information and user information, FIG. 8D illustrates a case where information regarding multiple apparatuses 10, multiple managers, and multiple users is registered.

With respect to one manager information terminal, one or more apparatuses 10 are registered as a set with the key management DB 60. Furthermore, a manager information terminal may unlock and lock multiple apparatuses 10. For example, a manager whose manager information (manager information terminal number 64) is "12323486732" manages two apparatuses 10 whose apparatus numbers 62 are "A03582X2" and "M03878T4." Furthermore, a user whose user information (user information terminal number 66) is "12334894532" has authority to use the two apparatuses 10.

Furthermore, one apparatus 10 may be used by multiple users. For example, in FIG. 8, a user whose user information (user information terminal number 66) is "12373485621" also has authority to use the apparatus 10 whose apparatus number 62 is "A03582X2."

On the other hand, there is only one manager for one apparatus 10. When one apparatus 10 is managed by a new manager, management by the preceding manager ends, and the manager of the apparatus 10 changes.

Figure 10A:
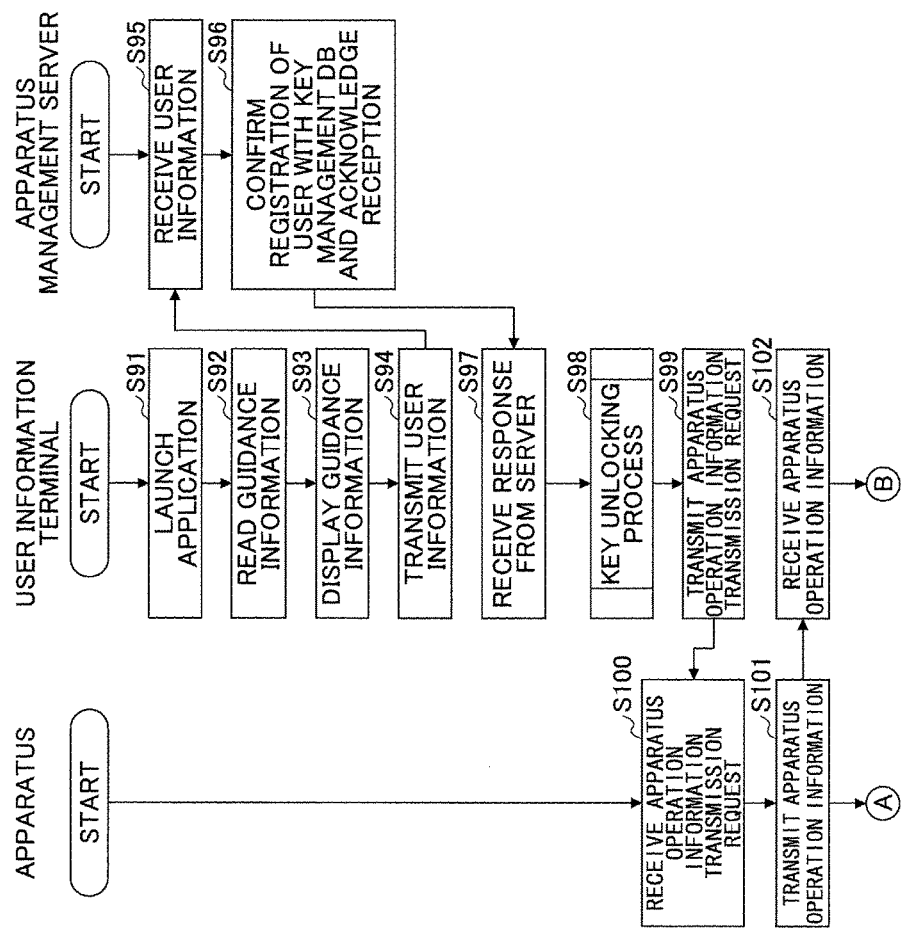

Next, a description is given, with reference to FIGS. 10A and 10B, of an unlocking process according to an embodiment. FIGS. 10A and 10B are flowcharts illustrating an unlocking process according to an embodiment. In FIGS. 10A and 10B, a flow on the left side illustrates an operation of the apparatus 10, a flow at the center illustrates an operation of the information terminal 20 of a user (user information terminal), and a flow on the right side illustrates an operation of the apparatus management server 50. In the following description, a user may be a manager. In this case, user information is manager information.

At step S91 of FIG. 10A, first, a user launches a communication application. That is, when a user launches an apparatus management application, the apparatus management application determines whether the communication application has been launched, and launches the communication application if the communication application has not been launched. Users nowadays may have unnecessary applications stopped in order to increase the operating time of the user information terminal. Accordingly, even applications that normally operate in the background do not necessarily operate. Thus, the user information terminal performs the operation of launching the communication application. Thereafter, before (or during) the user holding the user information terminal over the apparatus 10, at step S92, the user information terminal reads guidance information, and at step S93, the user information terminal displays the guidance information (in the form of superimposed text) on the screen of the user information terminal. The display of the guidance information may be started before the apparatus management server 50 performs authentication. The guidance information may be displayed during or after authentication by the apparatus management server 50. The guidance information may include predetermined specific information, information selected by the user, and previously used information.

Examples of the guidance information displayed by the user information terminal include information related to the apparatus 10 and the apparatus manufacturer P3 (FIG. 6). Specifically, the user information terminal may display, as the guidance information, information on a new product of the same type as the apparatus 10, information on how to use a model that the user uses and the information of a link to that information, information on consumable supplies, and information on exhibitions of the apparatus manufacturer P3 In this case, the guidance information is not only displayed after the user information terminal launches the application. For example, as described below, after receiving an apparatus list from the apparatus management server (step S114), the user information terminal may change the guidance information to be displayed to the guidance information selected by the apparatus management server 50 (step S115).

The user information terminal may display the guidance information and perform communications with the apparatus management server 50 in approximately a few seconds before the user information terminal is held over the apparatus 10. Specifically, after displaying the guidance information at step S93, at step S94, the user information terminal transmits user information to the apparatus management server 50. At step S95, the apparatus management server 50 receives the user information. At step S96, the apparatus management server 50 confirms that the received user information is registered with the key management DB 60, and notifies the user information terminal of the reception of the user information. At step S97, the user information terminal receives the response from the apparatus management server 50. As a result, the user is provided with useful information, and the communications with the apparatus management server 50 between the launch of the application and the holding of the information terminal 20 over the apparatus 10 are substantially transparent to the user. Once the application is launched, a key unlocking process is executed at step S98.

Figure 11:
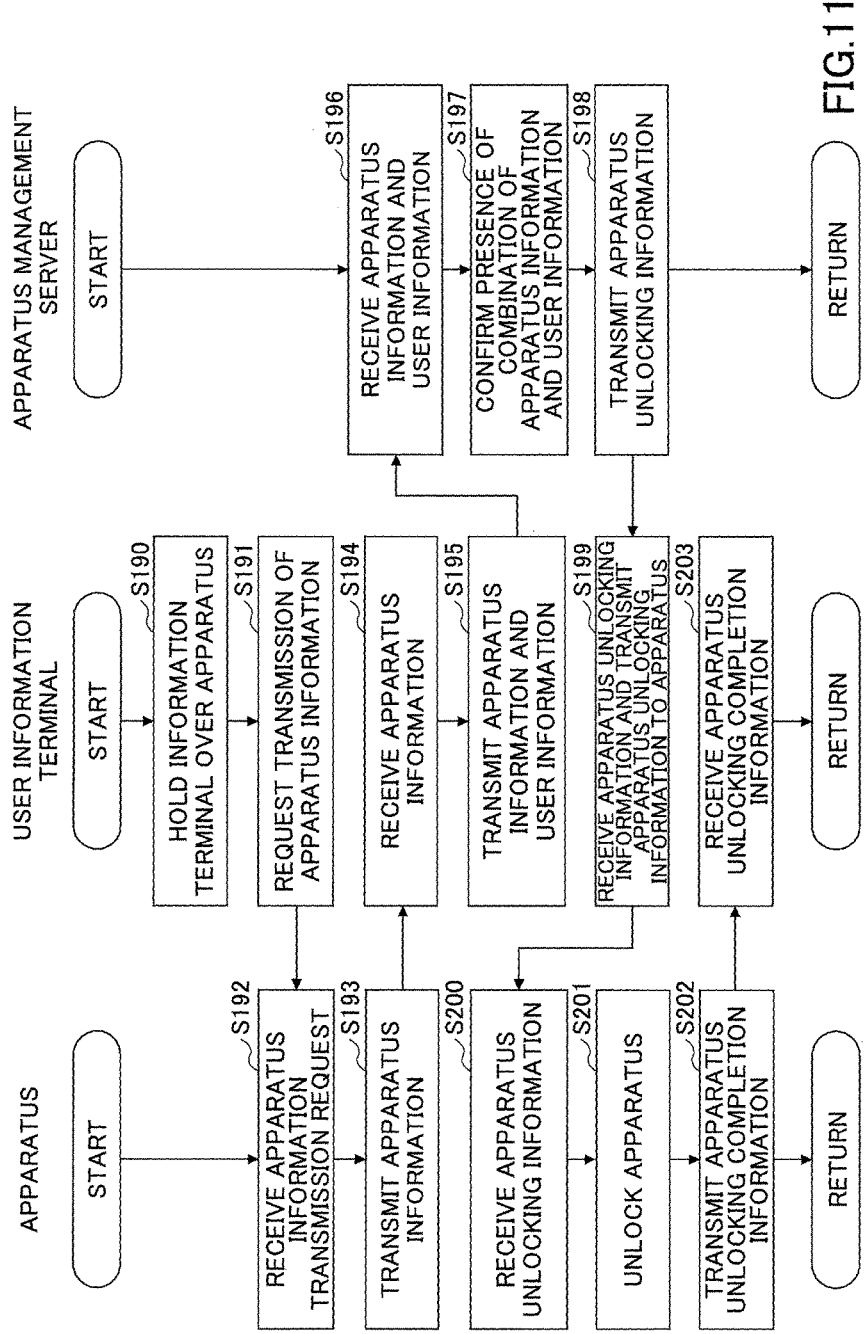
FIG. 11 is a flowchart illustrating a key unlocking process according to an embodiment.

Next, a description is given, with reference to FIG. 11, of the key unlocking process. At this point, an image of a "lock" is displayed on the screen of the user information terminal. When the user holds the user information terminal over the apparatus 10 so that the below-described key unlocking process is executed, the "lock" on the screen is opened. This makes it possible to present the open state and the closed state of the "lock" of the apparatus 10 to the user in an easily visible manner.

According to the key unlocking process, first, at step S190, the user holds the user information terminal over the apparatus 10. At steps S191 through S194, the user information terminal obtains apparatus information from the apparatus 10 using short-range radio communications. That is, at step S191, the user information terminal transmits a request for acquisition of apparatus information to the apparatus 10. At step S192, the apparatus 10 receives the request for acquisition of apparatus information, and at step S193, the apparatus 10 transmits apparatus information to the user information terminal. At step S194, the user information terminal receives the apparatus information.

At step S195, the user information terminal transmits the apparatus information and user information (for example, the user information terminal number 66) to the apparatus management server 50. At step S196, the apparatus management server 50 receives the apparatus information and the user information. Then, at step S197, the apparatus management server 50 searches the key management DB 60 so as to confirm that a pair of the received apparatus information and user information is registered with the key management DB 60. The user information is an example of terminal information for identifying the information terminal 20.

If the pair is registered, at step S198, the apparatus management server 50 confirms that a usage time limit is not passed, and then transmits apparatus unlocking information to the user information terminal. Furthermore, the apparatus management server 50 transmits a list of apparatuses 10 available to the user information terminal (apparatus list) to the user information terminal. When the user is a manager, no usage time limit is set for manager information. Accordingly, no confirmation of a usage time limit is performed.

At step S199, the user information terminal receives the apparatus unlocking information and the apparatus list, and transmits the apparatus unlocking information to the apparatus 10 using short-range radio communications. At step S200, the apparatus 10 receives the apparatus unlocking information, and at step S201, the apparatus 10 is unlocked to operate. At step S202, the apparatus 10 transmits apparatus unlocking completion information indicating completion of the unlocking of the apparatus 10.

At step S203, the user information terminal receives the apparatus unlocking completion information from the apparatus 10.

Referring back to FIG. 10A, the description continues from step S99. At steps S99 through S102, the user information terminal acquires apparatus operation information (such as an operating time, a lamp lighting time, and the rotation speed of a fan) from the apparatus 10. That is, at step S99, the user information terminal transmits a request for acquisition of apparatus operation information, and at step S100, the apparatus 10 receives the request for acquisition of apparatus operation information. At step S101, the apparatus 10 transmits apparatus operation information, and at step S102, the user information terminal receives the apparatus operation information.

At step S103 of FIG. 10B, the user information terminal notifies the apparatus management server 50 of the apparatus operation information, the position information of the user information terminal, time information, etc. In addition to the position information and the time information, acceleration information, atmospheric pressure information, temperature information, illuminance information, geomagnetism information, sound information, etc., may be acquired from the user information terminal. Furthermore, local weather information or the like may be acquired by way of the Internet. As an application of these information items, sound information at the time of turning on the apparatus 10 may be acquired to analyze the abnormality of the apparatus 10.

At step S104, the apparatus management server 50 receives the apparatus operation information, the position information, and the time information from the user information terminal, and at step S105, the apparatus management server 50 stores the apparatus operation information, the position information, and the time information in the apparatus operation information DB 70. FIG. 14 illustrates an example of information stored in the apparatus operation information DB 70. The apparatus operation information DB 70 contains time information (operation date and time 74), apparatus operation information 1 through apparatus operation information (apparatus operation information 75a through apparatus operation information 75d), and position information 76 with respect to each pair of an apparatus number 72 (an example of apparatus information) and a user information terminal number (an example of user information). What the apparatus operation information 1 through the apparatus operation information 5 represent is defined with respect to each apparatus 10 in the apparatus operation information correspondence table 90, of which an example is illustrated in FIG. 15.

Referring back to FIG. 10B, at step S106, the apparatus management server 50 compares the received time information and the time information of the apparatus management server 50, and at step S107, the apparatus management server 50 determines whether there is a difference of a predetermined time (for example, approximately 100 hours) or more between the received time information and the time information of the apparatus management server 50. In response to determining that there is a difference of a predetermined time or more (YES at step S107), at step S108, the apparatus management server 50 notifies a manager information terminal that there is a difference of a predetermined time or more, changes the usage time limit 67 of the user in the key management DB 60 to "today," and notifies the user information terminal of revocation of authority (suspension of use) to prevent the user information terminal from unlocking the apparatus 10 from the next day. The usage time limit 67 of the user after the change is not limited to "today" as described above. The usage time limit 67 may be set (changed) so that a time to be received when the apparatus 10 is used next time will go beyond the usage time limit 67.

Thus, when determining that there is a difference of a predetermined time or more between the received time information and the time information of the apparatus management server 50, the apparatus management server 50 changes the usage time limit 67 of the user to such a time limit as to prevent the apparatus 10 from being used next time. This makes it possible to prevent the user from using the apparatus 10 next time.

At step S109, the apparatus management server 50 creates a list of apparatuses 10 available to the user and usage time limits, and at step S110, the apparatus management server 50 changes the usage time limit in the created list to a predetermined time. In response to determining at step S107 that there is no difference of a predetermined time or more (NO at step S107), the apparatus management server 50 immediately executes the process of step S111.

At step S111, the apparatus management server 50 determines whether multiple items of guidance information are stored in the provided information DB 80. In response to determining that multiple items of guidance information are stored (YES at step S111), at step S112, the apparatus management server 50 executes a guidance selection process.

Next, a description is given, with reference to FIG. 12, of a guidance selection process according to this embodiment. Once the guidance selection process is started, at step S210, the apparatus management server 50 acquires user apparatus information from the user information terminal. Next, at steps S211 through S213, the apparatus management server 50 obtains multiple items of guidance information from the provided information DB 80. At step S211, the apparatus management server 50 acquires the new product information of the apparatus 10 in use and information on how to use the apparatus 10 from the provided information DB 80. At step S212, the apparatus management server 50 acquires exhibition information from the provided information DB 80. At step S213, the apparatus management server 50 acquires consumable supplies information from the provided information DB 80.

Next, at step S214, the apparatus management server 50 selects guidance information to be displayed in accordance with order of priority set by an information provider. When the guidance information is selected, at step S215, the apparatus management server 50 transmits the selected guidance information to the user information terminal.

For example, the order of priority may be set to a single uniform value or set to a value that differs from region to region or from individual to individual. Specifically, for example, the priority of information that can be provided at a sales office, assigned to a person close to the sales office, may be set to be higher than the priority of information that can be provided at another sales office. Thus, time information and location (position) information that may be obtained through the GPS may be referred to in setting the order of priority. For example, when it is determined that Mr. A who uses a user information terminal is close to an exhibition hall based on the position information of the user information terminal, the introduction of the exhibition may be displayed as the guidance information on the user information terminal. Furthermore, the introduction of the exhibition may be displayed as the guidance information in the form of superimposed text on all user information terminals three days prior to the opening date of the exhibition.

According to the above-described guidance selection process, the apparatus management server 50 selects guidance information to be displayed in accordance with order of priority set by an information provider, and transmits the selected guidance information to the user information terminal.

Alternatively, the above-described guidance selection process may be executed by the user information terminal. In this case, the user information terminal acquires guidance information from the apparatus management server 50, and selects particular guidance information using an application that incorporates the steps of order of priority for guidance selection. In this case, the guidance information is transmitted from the apparatus management server 50 at regular or irregular intervals, and is updated in the user information terminal.

Referring back to FIG. 10B, the description of the unlocking process is continued. At step S113, the apparatus management server 50 transmits a list of apparatuses 10 available to the user and usage time limits and the guidance information to the user information terminal. After completion of the above-described process, the apparatus management server 50 notifies the user information terminal of completion of a process.

At step S114, the user information terminal receives the list of apparatuses 10 available to the user (apparatus information) and usage time limits (usage time limit information) and the guidance information, and at step S115, the user information terminal stores the received guidance information and changes guidance information on the screen to the received guidance information. At this point, the user information terminal may display a message of completion of a process. At step S116, the user information terminal encrypts the information of the received list and stores the encrypted information in the storage part 215.

Figure 13A:
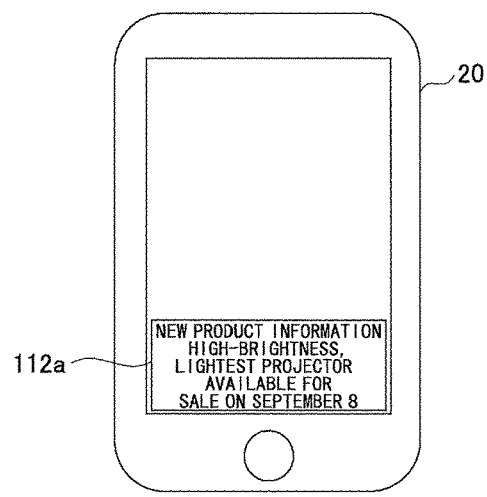
FIG. 13A is a diagram illustrating an example display of guidance information according to an embodiment.
Figure 13B:
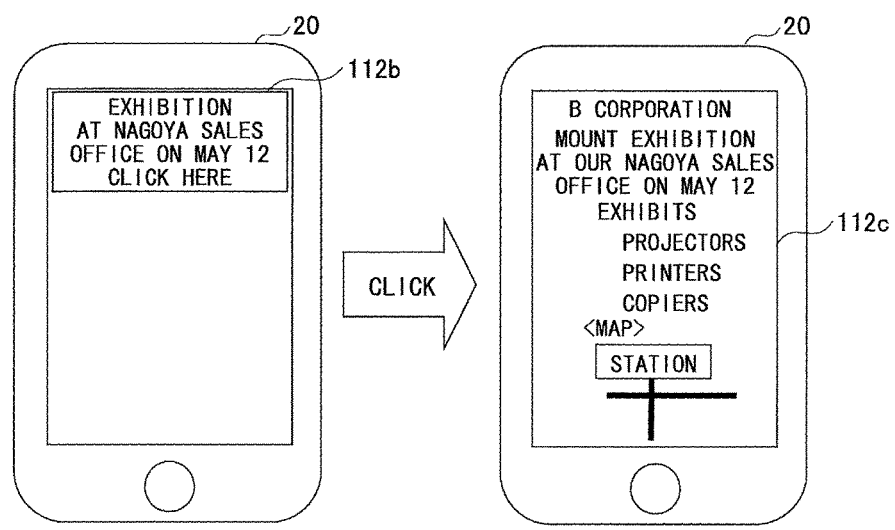
FIG. 13B is a diagram illustrating an example display of the guidance information according to an embodiment.

For example, FIGS. 13A, 13B, 13C and 13D illustrate examples of guidance information displayed on the screen of the information terminal 20 after the process of step S93 or step S115 according to this embodiment. Guidance information 112a illustrated in FIG. 13A is new product information, and is displayed as "NEW PRODUCT INFORMATION HIGH-BRIGHTNESS, LIGHTEST PROJECTOR AVAILABLE FOR SALE ON SEPTEMBER 8". The guidance information illustrated on the left side in FIG. 13B is exhibition announcement information, and is displayed as "EXHIBITION AT NAGOYA SALES OFFICE ON MAY 12." In this state, when the display on the screen is clicked (tapped), details 112c of the displayed exhibition announcement information are displayed as illustrated on the right side in FIG. 13B.

Figure 13C:
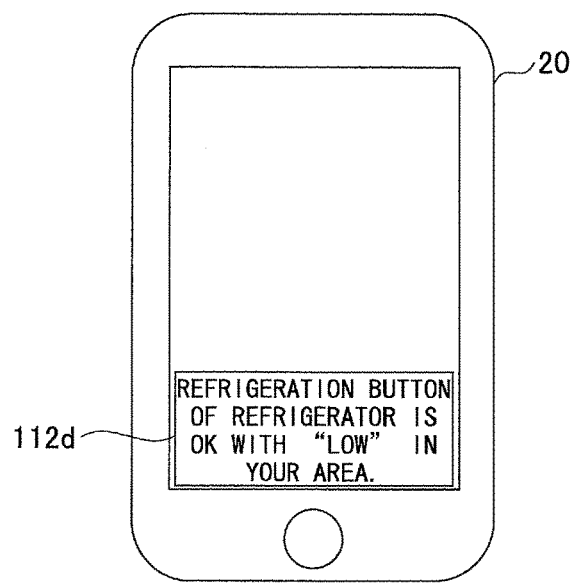
FIG. 13C is a diagram illustrating an example display of the guidance information according to an embodiment.
Figure 13D:
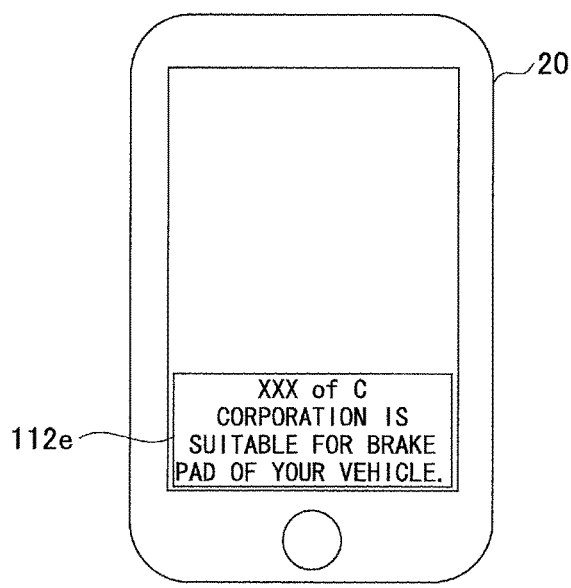
FIG. 13D is a diagram illustrating an example display of the guidance information according to an embodiment.

Guidance information 112d illustrated in FIG. 13C is how-to-use information, and is displayed as "REFRIGERATION BUTTON OF REFRIGERATOR IS OK WITH "LOW" IN YOUR AREA." Guidance information 112e illustrated in FIG. 13D is consumable supplies information, and is displayed as "XXX of C CORPORATION IS SUITABLE FOR BRAKE PAD OF YOUR VEHICLE."

According to this embodiment, in consideration of the case of going offline (being disconnected from the apparatus management server 50), the information terminal 20 retains authentication information for a certain period so as to make it possible to perform authentication using the authentication information up to a predetermined time (second authentication). When the predetermined time is passed, the information terminal 20 does not use the file of the authentication information. Here, apparatus information and user information are used as the authentication information. Therefore, the authentication information is retained in the user information terminal every time the user information terminal connects to the apparatus management server 50.

Furthermore, at step S106 of the above-described process, the time of the user information terminal and the time of the apparatus management server 50 are compared. Normally, there is little difference in time between the user information terminal and the apparatus management server 50.

However, if the user information terminal is referenced for this predetermined time, and if the user changes the time of the user information terminal, it is determined that the predetermined time is not exceeded in the user information terminal although the predetermined time is exceeded, so that it may be possible to use the apparatus 10.

Therefore, it is confirmed that there is no time difference between the user information terminal and the apparatus management server 50 by comparing the time kept by the user information terminal and the time kept by the apparatus management server 50, and if there is a difference of a predetermined time or more, the authority to use the apparatus 10 is revoked so as to prevent unauthorized use of the apparatus 10. The case where there is a difference between the time kept by the user information terminal and the time kept by the apparatus management server 50 is addressed by not only revocation of the authority to use the apparatus 10 but also various methods, and the method described in this embodiment is a mere example.

For example, in determining whether the user has changed the time of the user information terminal, the ON/OFF of the automatic setting of a date and time of the information terminal 20 is checked. For example, if the automatic setting of a date and time is "OFF" at the time of activation of the application, the information terminal 20 displays an error message and transitions to a setting screen. At this point, the activation of the application is suspended until the automatic setting of a date and time is switched to "ON." In the case where the automatic setting of a date and time is set to "OFF" after activation of the application, the information terminal 20 checks the automatic setting of a date and time when returning from the background or the like. At this point, if the automatic setting of a date and time is "OFF," the information terminal 20 displays an error message and transitions to a setting screen.

If the information terminal 20 has no mode of automatically setting a date and time, the following method may be used. That is, the difference between the time kept by the information terminal 20 and the time kept by the apparatus management server 50 is determined. If the difference is within a predetermined range, the above-described process is performed. If the difference goes beyond the predetermined range, the information terminal 20 displays an error message and transitions to a screen for correcting time. This makes it possible to prevent unauthorized extension of use time by the user.

A description is given of example use of position information stored in the apparatus operation information DB 70. The apparatus management server 50 acquires the position information of a user information terminal using the GPS or the like, and stores the acquired position information in the apparatus operation information DB 70. For example, the apparatus 10 fails or a particular component for using the apparatus 10 is required at the site where the apparatus 10 is in use. In this case, according to the apparatus management system of this embodiment, a user of the apparatus 10 selects "CONTACT DEALER" on the menu screen of the user information terminal instead of calling a dealer for procuring a component. In response to this selection, the apparatus management server 50 selects the dealer closest to the position information of the user information terminal based on the position information stored in the apparatus operation information DB 70, and transmits the dealer information to the user information terminal. The user information terminal displays the received dealer information (such as a phone number and a map of the dealer) on the screen. This enables the user to immediately access the dealer and procure a necessary apparatus or component.

Figure 16:
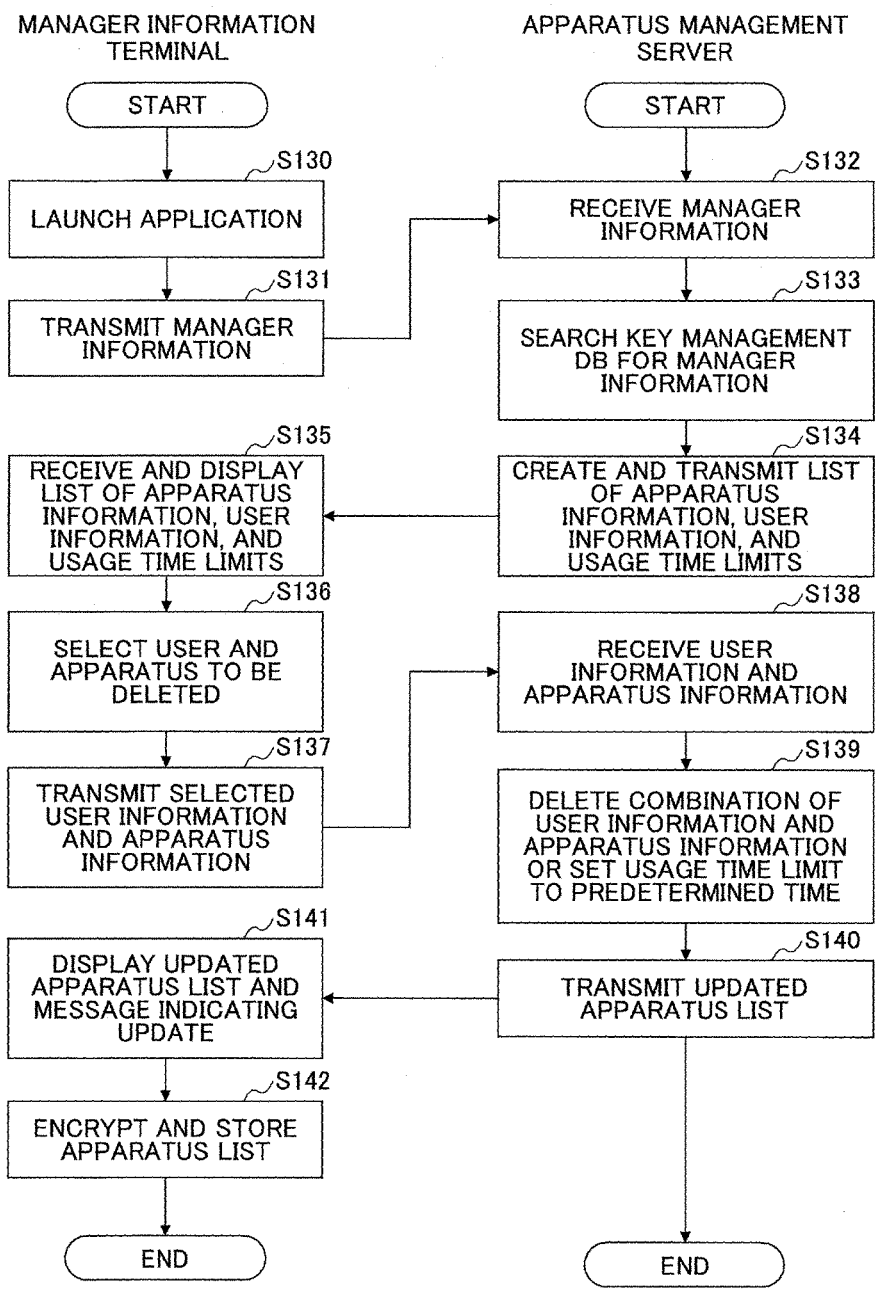
FIG. 16 is a flowchart illustrating a process of deleting or changing user registration information according to an embodiment.

Next, a description is given, with reference to FIG. 16, of a process of deleting or changing user registration information according to an embodiment. FIG. 16 is a flowchart illustrating a process of deleting or changing user registration information according to an embodiment. In FIG. 16, a flow on the left side illustrates an operation of the information terminal of a manager (manager information terminal) and a flow on the right side illustrates an operation of the apparatus management server 50.

At step S130, first, the manager (user) launches the application. At step S131, after getting online, the manager information terminal transmits manager information to the apparatus management server 50. At step S132, the apparatus management server 50 receives the manager information, and at step S133, the apparatus management server 50 searches the key management DB 60 for the manager information. At step S134, the apparatus management server 50 creates a list of apparatus information, user information, and usage time limits managed by the manager of the manager information terminal, and transmits the created list to the manager information terminal.

At step S135, the manager information terminal receives and displays the list of apparatus information, user information, and usage time limits. At step S136, the manager information terminal selects an apparatus 10 to be deleted from the displayed list, and selects a user to be deleted from the displayed user information. Alternatively, the manager information terminal may select an apparatus and a user with respect which a corresponding usage time limit is to be changed. At step S137, the manager information terminal transmits the selected apparatus information and user information (manager information) to the apparatus management server 50.

At step S138, the apparatus management server 50 receives the selected apparatus information (apparatus number) and user information (manager information). At step S139, the apparatus management server 50 searches the key management DB 60 for a combination of the apparatus number and the user information (manager information), and deletes the combination of the apparatus number and the user information (manager information) from the key management DB 60. Alternatively, the apparatus management server 50 may update a usage time limit corresponding to the combination to a time before a predetermined time.

At step S140, the apparatus management server 50 notifies the manager information terminal of completion of the deletion or updating process, and transmits the updated list of apparatus information, user information, and usage time limits managed by the manager of the manager information terminal.

At step S141, the manager information terminal receives and displays the updated list of apparatus information, user information, and usage time limits managed by the manager of the manager information terminal. At step S142, the manager information terminal encrypts and stores the information of the received list. The manager may quit the application after confirming the contents of the received list.

Figure 17:
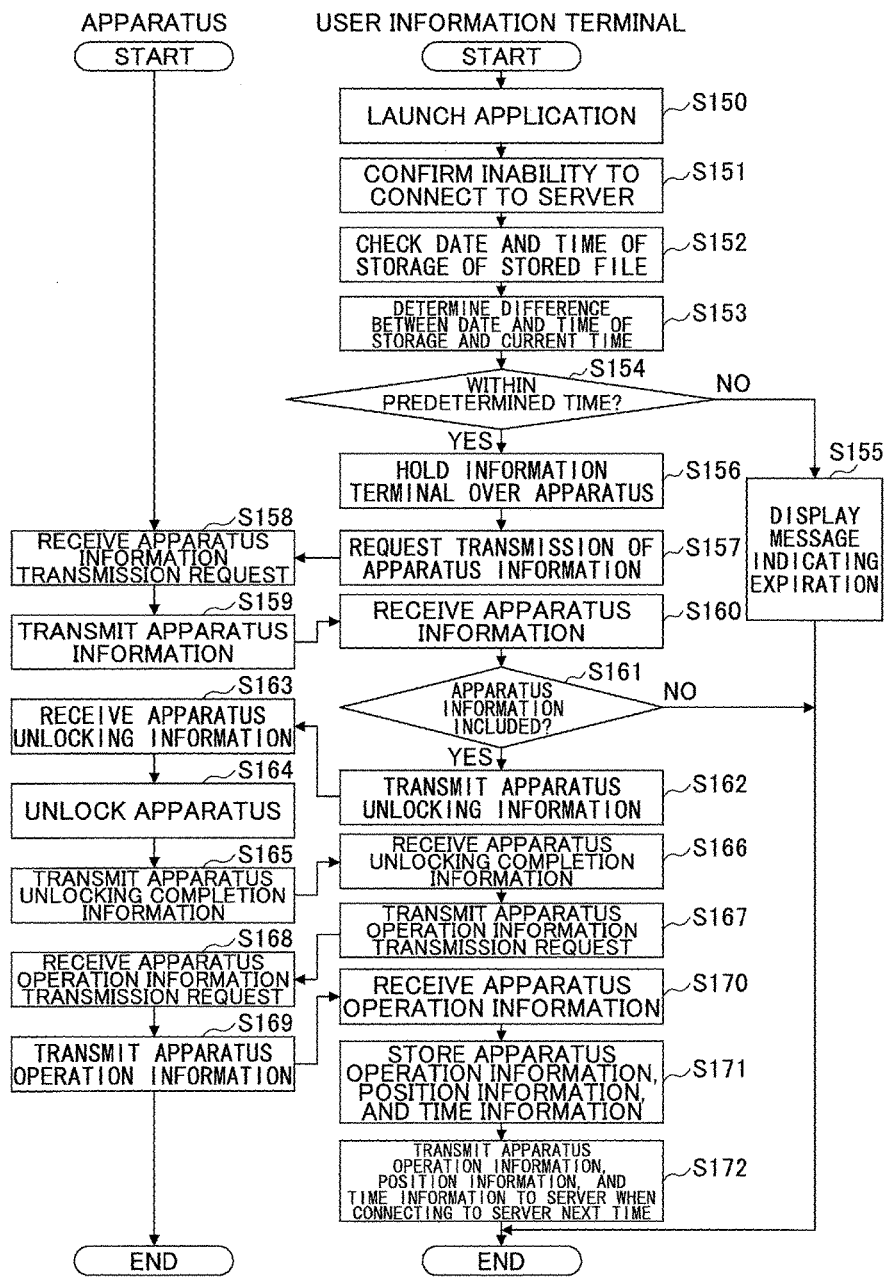
FIG. 17 is a flowchart illustrating an offline-time unlocking process according to an embodiment.

Next, a description is given, with reference to FIG. 17, of an offline-time unlocking process according to an embodiment. FIG. 17 is a flowchart illustrating an offline-time unlocking process according to an embodiment. In FIG. 17, a flow on the left side illustrates an operation of the apparatus 10, and a flow on the right side illustrates an operation of the information terminal 20 of a user (user information terminal).

At step S150, first, the user launches the application using the user information terminal. Next, at step S151, the user information terminal makes an attempt to communicate with the apparatus management server 50, but here confirms that it is impossible to connect to (communicate with) the apparatus management server 50. In response to determining that it is impossible to communicate with the apparatus management server 50, at step S152, the user information terminal checks the date and time of storage of the file of stored list information, and at step S153, the user information terminal determines the difference between the date and time of storage and a current time.

At step S154, the user information terminal determines whether the difference is within a predetermined time (range). In response to determining that the difference exceeds the predetermined time (NO at step S154), at step S155, the user information terminal displays a message to the effect that the difference exceeds the predetermined time, and ends this process.

In response to determining that the difference is within the predetermined time (YES at step S154), the user information terminal decrypts the encrypted and stored apparatus list file. At step S156, the user holds the user information terminal over the apparatus 10. At step S157, the user information terminal requests the apparatus 10 to transmit apparatus information, using short-range radio communications. At step S158, the apparatus 10 receives the apparatus information transmission request, and at step S159, the apparatus 10 transmits apparatus information to the user information terminal.

At step S160, the user information terminal receives the apparatus information, and at step S161, the user information terminal searches the decrypted apparatus list file so as to determine the presence or absence of the apparatus information. If the apparatus information is included in the apparatus list, the user information terminal determines that authentication has succeeded, and at step S162, the user information terminal transmits apparatus unlocking information to the apparatus 10 after confirming that a usage time limit is not passed. If the apparatus information in not included in the list, the user information terminal determines that authentication has failed, and ends this process. The user information terminal may end this process after displaying a message indicating authentication failure.

At step S163, the apparatus 10 receives the apparatus unlocking information, and at step S164, the apparatus 10 is unlocked by the apparatus unlocking information so as to start operating. At step S165, the apparatus 10 transmits apparatus unlocking completion information. At step S166, the user information terminal receives the apparatus unlocking completion information, and at step S167, transmits an apparatus operation information transmission request. At step S168, the apparatus 10 receives the apparatus operation information transmission request, and at step S169, the apparatus 10 transmits apparatus operation information. At step S170, the user information terminal receives the apparatus operation information, and at step S171, stores the apparatus operation information, position information, and time information in the storage part 215 such as a memory of the user information terminal. As a result, the apparatus operation information, the position information 76, and the time information (operation date and time 74) are stored in the apparatus operation information DB 70 illustrated in FIG. 14.

At step S172, the user information terminal transmits the apparatus operation information, the position information, and the time information to the apparatus management server 50 when the user information terminal connects to and becomes able to communicate with the apparatus management server 50 next time. The user information terminal discards the list information decrypted with the running application before ending this process. That is, the apparatus operation information, etc., acquired from the apparatus 10 are retained in the user information terminal while the user information terminal is not connected to the apparatus management server 50 (when being offline). Then, the apparatus operation information, etc., are transmitted from the user information terminal to the apparatus management server 50 when it becomes possible to perform communications between the apparatus management server 50 and the user information terminal, so as to be managed by the apparatus management server 50. The user information terminal erases the apparatus operation information, etc., that have been transmitted to the apparatus management server 50 from the storage part 215.

A description is given of example recording of apparatus operation information. FIG. 14 illustrates apparatus operation information stored in the apparatus operation information DB 70. Information collected as apparatus operation information is predetermined, and the table of FIG. 14 is an example of such information. In the apparatus operation information DB 70 illustrated in FIG. 14, apparatus operation information at the time when a user whose user information terminal number 73 is "12334894532" used the apparatus 10 whose apparatus number 72 is "A03582X2" on Jun. 21, 2013 is stored. According to the apparatus operation information at the time, a total operation time (Apparatus Operation Information 1) is "100" (hours), a lamp lighting time (Apparatus Operation Information 2) is "20" (hours), a fan rotation speed (Apparatus Operation Information 3) is "600" (rpm), temperature (Apparatus Operation Information 4) is "64" (° C.), and a sensor abnormality code (Apparatus Operation Information 5) is "0."

Furthermore, in the apparatus operation information DB 70 illustrated in FIG. 14, apparatus operation information at the time when a user whose user information terminal number 73 is "12373297556" used the apparatus 10 whose apparatus number 72 is "A03397U7" on May 11, 2013 is stored. According to the apparatus operation information at the time, a total operation time (Apparatus Operation Information 1) is "230" (hours), a lamp lighting time (Apparatus Operation Information 2) is "130" (hours), a fan rotation speed (Apparatus Operation Information 3) is "620" (rpm), temperature (Apparatus Operation Information 4) is "65" (° C.), and a sensor abnormality code (Apparatus Operation Information 5) is "0."

The number of items of apparatus operation information in the apparatus operation information DB 70, which is five in FIG. 14, may be six or more. Furthermore, the information stored in the apparatus operation information DB 70, which is numerical information in FIG. 14, may be text information. Furthermore, when analyzing the apparatus operation information, it is preferable to create a list by conducting a search using the same apparatus code and make an analysis using a statistical method.

As described above, according to the apparatus management system of this embodiment, in the apparatus 10 (electronic apparatus), the portable information terminal 20, and the apparatus management server 50, an apparatus authentication process is executed according to the following procedure. First, multiple apparatuses 10 each having a radio chip and multiple information terminals 20 each having a radio chip perform transmission and reception of apparatus information using short-range radio communications. The information terminal receives the apparatus information of the apparatus 10, and transmits terminal information and the apparatus information to the apparatus management server 50. The apparatus management server 50 searches the key management DB 60 to determine whether the received terminal information and apparatus information match authentication information (a combination of terminal information (for example, an information terminal number) and apparatus information) retained in the key management DB 60. If it is determined that the combination of the apparatus information and the terminal information is registered with the key management DB 60 and the time is within the period of use of the apparatus 10, the apparatus management server 50 determines that authentication has succeeded, and transmits apparatus unlocking information to the apparatus 10 via the information terminal 20. As a result, it is possible for a user to unlock and use the apparatus 10. Alternatively, the apparatus management server 50 may determine that authentication has succeeded in response to determining that the combination of the apparatus information and the terminal information is registered with the key management DB 60 regardless of whether the time is within the period of use of the apparatus 10 or not. The apparatus unlocking information is an example of apparatus management information for managing the apparatus 10. The information terminal 20 may manage the apparatus 10 based on the apparatus management information. The apparatus management information may be either received from the apparatus management server 50 or generated in the information terminal 20.

Furthermore, according to the apparatus management system of this embodiment, minimum authentication information is retained in the information terminal for a certain period in consideration of an offline time when it is impossible to connect to the apparatus management server 50, and when being offline, the information terminal 20 determines whether to authenticate apparatuses referring to the authentication information. Furthermore, by providing such a process as to prevent acquisition of apparatus information using NFC unless a communication application is started at the time of activation, it is possible to determine whether the connection is online by activating the communication application.

Figure 18:
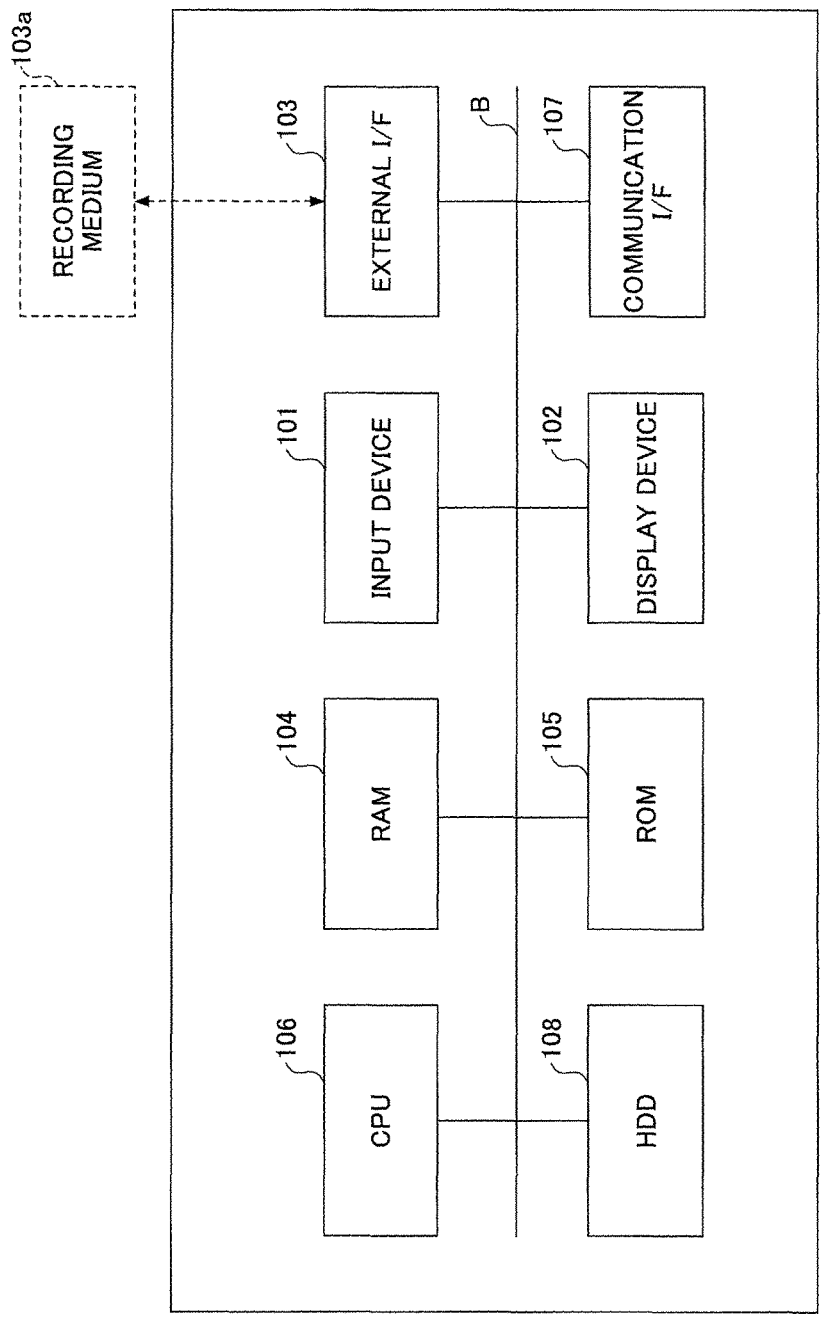
FIG. 18 is a diagram illustrating a hardware configuration of apparatuses according to an embodiment.

A description is given, with reference to FIG. 18, of a hardware configuration of apparatuses according to this embodiment. FIG. 18 is a diagram illustrating a hardware configuration of apparatuses (the information terminal 20 and the apparatus management server 50) according to this embodiment. In the following, a description is given, taking the apparatus management server 50 as an example.

As illustrated in FIG. 18, the apparatus management server 50 includes an input device 101, a display device 102, an external interface (I/F) 103, a random access memory (RAM) 104, a read-only memory (ROM) 105, a central processing unit (CPU) 106, a communication I/F 107, and a hard disk drive (HDD) 108, all of which are interconnected by a bus B.

The input device 101 includes a keyboard and a mouse, and is used to input operation signals to the apparatus management server 50. The display device 102 includes a signage part (display), and displays various process results.

The communication I/F 107 is an interface that connects the apparatus management server 50 to a network. As a result, it is possible for the apparatus management server 50 to perform data communications with other apparatuses (such as the information terminal 20) through the communication I/F 107.

The HDD 108 is a nonvolatile storage device that contains programs and data. The contained programs and data include basic software that controls the entire apparatus and application software. For example, the HDD 108 contains various kinds of DB information and programs.

The external I/F 103 is an interface with external apparatuses. Examples of external apparatuses include a recording medium 103a. As a result, it is possible for the apparatus management server 50 to read and/or write to the recording medium 103a through the external I/F 103. Examples of the recording medium 103a include a floppy (registered trademark) disk, a compact disk (CD), a digital versatile disk (DVD), an SD memory card, and a universal serial bus (USB) memory.

The ROM 105 is a nonvolatile semiconductor memory (storage device) capable of retaining internal data even after power is turned off. The ROM 105 contains programs and data of a network configuration, etc. The RAM 104 is a volatile semiconductor memory (storage device) that temporarily retains programs and data. The CPU 106 is a processor that controls the entire apparatus and implements functions provided in the apparatus by reading programs and data into the RAM 104 from the above-described storage device (for example, the "HDD 108" or the "ROM 105") and executing processes.

With the above-described hardware configuration, it is possible for the apparatus management server 50 according to this embodiment to manage the apparatus 10. For example, the CPU 106 executes a manager information registration process, a user information registration or change process, and an unlocking process (online or offline) using data and a program stored in the ROM 105 or the HDD 108. As a result, according to this embodiment, it is possible to provide a user who possesses the information terminal 20 such as a smartphone with an apparatus management system that controls authentication and unlocking of the apparatus 10. Information of the key management DB 60, the apparatus operation information DB 70, the provided information DB 80, and the apparatus operation information correspondence table DB 90 may be stored in, for example, the RAM 104, the ROM 105, the HDD 108, or a cloud server connected to the apparatus management server 50 via a network.

Second Embodiment

Figure 19:
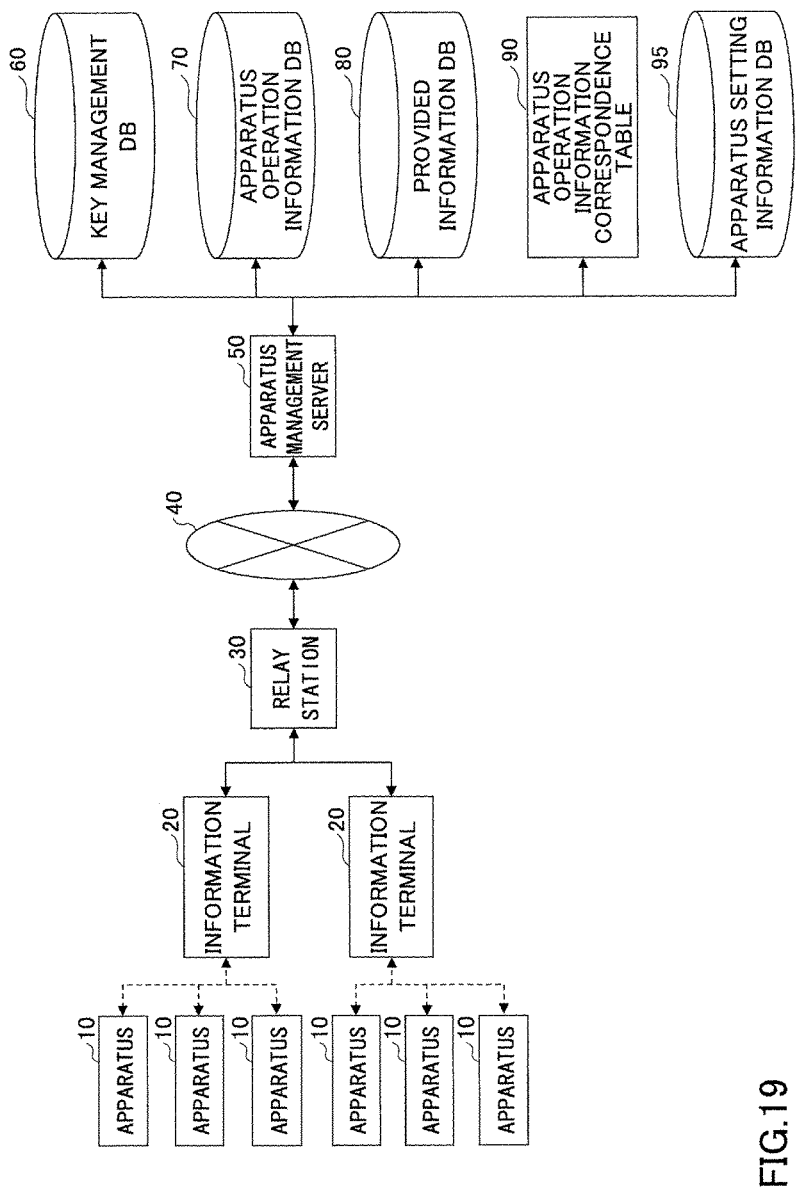
FIG. 19 is a diagram illustrating a configuration of an apparatus management system according to a second embodiment.

Next, a description is given, with reference to FIG. 19, of a configuration of an apparatus management system according to a second embodiment of the present invention. FIG. 19 illustrates a configuration of an apparatus management system according to the second embodiment. The configuration of the apparatus management system according to the second embodiment is substantially the same as the configuration of the apparatus management system according to the first embodiment, but additionally includes an apparatus setting information DB 95. As illustrated in FIG. 26C, the apparatus setting information DB 95 contains an apparatus code 951, a set firmware information 952, a firmware size 953, and a registration date 954.

The apparatus management system according to the second embodiment has the function of updating firmware information stored in the apparatus setting information DB 95. Firmware is software incorporated into the apparatus 10 in order to perform basic control of hardware.

For example, with respect to the apparatus 10 such as a projector, it is necessary to update firmware in order to improve the performance of the apparatus 10 or eliminate defects of the apparatus 10. Therefore, according to the second embodiment, by using the communication functions of the information terminal 20 such as a smartphone and the apparatus 10, new firmware is transmitted to the apparatus 10 so as to update the firmware of the apparatus 10 as required.

It is preferable to transmit firmware to the apparatus 10 before the apparatus 10 is unlocked after the apparatus 10 and the information terminal 20 are authenticated. This is partly because when authentication is not completed, whether a user has usage authority is unknown, so that updating of firmware by an unauthorized user should be avoided. Furthermore, a trouble is less likely to occur in the apparatus 10 if firmware is updated when the apparatus 10 is stopped before being unlocked.

For example, if firmware is transmitted while the apparatus 10 is activated and a trouble occurs in the apparatus 10, the updating of the firmware is suspended with the stoppage of the apparatus 10. Furthermore, because the apparatus 10 is activated when the apparatus 10 is unlocked, a user may understand that the updating of the firmware is completed and move the information terminal 20 such as a smartphone away from the apparatus 10, although the firmware is being updated. As a result, the updating of the firmware may end without being completed. Therefore, according to the apparatus management system of this embodiment, firmware is updated before the apparatus 10 is unlocked after the apparatus 10 and the information terminal 20 are authenticated.

Next, a description is given, with reference to FIGS. 20A, 20B, 20C and 20D, of a connection of the apparatus 10 and the information terminal 20. Some information terminals 20 are not NFC-enabled. Therefore, according to this embodiment, an apparatus management system using the information terminal 20 capable of performing communications with multiple communication devices is constructed. According to this embodiment, a description is given of an operational procedure in the case of using two communication devices of NFC and Bluetooth Low Energy (BTLE).

Bluetooth Low Energy (BTLE) is simply referred to as Bluetooth. Furthermore, short-range radio communications may employ short-range radio communication standards other than Bluetooth and NFC (such as Wi-Fi (registered trademark)).

The information terminal 20 and the apparatus 10 according to the first embodiment are enabled to perform NFC radio communications as illustrated in FIG. 2. Meanwhile, the information terminal 20 and the apparatus 10 according to the second embodiment are enabled to perform not only NFC radio communication of a distance of some dozen centimeters but also Bluetooth radio communications of a distance of a few meters to tens of meters.

In FIG. 20A, information terminals 20c, 20d and 20e and apparatuses 10c, 10d and 10e are enabled to perform radio communications by NFC and Bluetooth. The information terminal 20d, the accessory B of the apparatus 10c, and the apparatus 10e are electronic apparatuses to which an NFC tag and Bluetooth module 20d1, an NFC tag and Bluetooth module 10c1, and an NFC tag and Bluetooth module 10e1 are attached, respectively. In FIG. 20B, information terminals 20f, 20g and 20e and apparatuses 10f, 10g and 10h are enabled to perform radio communications by Bluetooth. The information terminal 20g, the accessory B of the apparatus 10f, and the apparatus 10h are electronic apparatuses to which a Bluetooth tag 20g1, a Bluetooth tag 10f1, and a Bluetooth tag 10h1 are attached, respectively.

In FIG. 20C, the information terminals 20c, 20d and 20e are enabled to perform radio communications by NFC and Bluetooth. The apparatuses 10f, 10g and 10h are enabled to perform radio communications by Bluetooth. In FIG. 20D, the information terminals 20c, 20d and 20e are enabled to perform radio communications by NFC and Bluetooth. Apparatuses 10i, 10j and 10k are enabled to perform radio communications by NFC. The accessory B of the apparatus 10i and the apparatus 10k are electronic apparatuses to which an NFC tag 10i1 and an NFC tag 10k1 are attached, respectively.

The apparatus 10 and the information terminal 20 are not limited to electronic apparatuses incorporating a radio chip for performing short-range radio communications by at least one of NFC and Bluetooth from the time of manufacture, and include electronic apparatuses into which a memory card or a dongle incorporating a radio chip is inserted at a later stage.

Figure 21A:
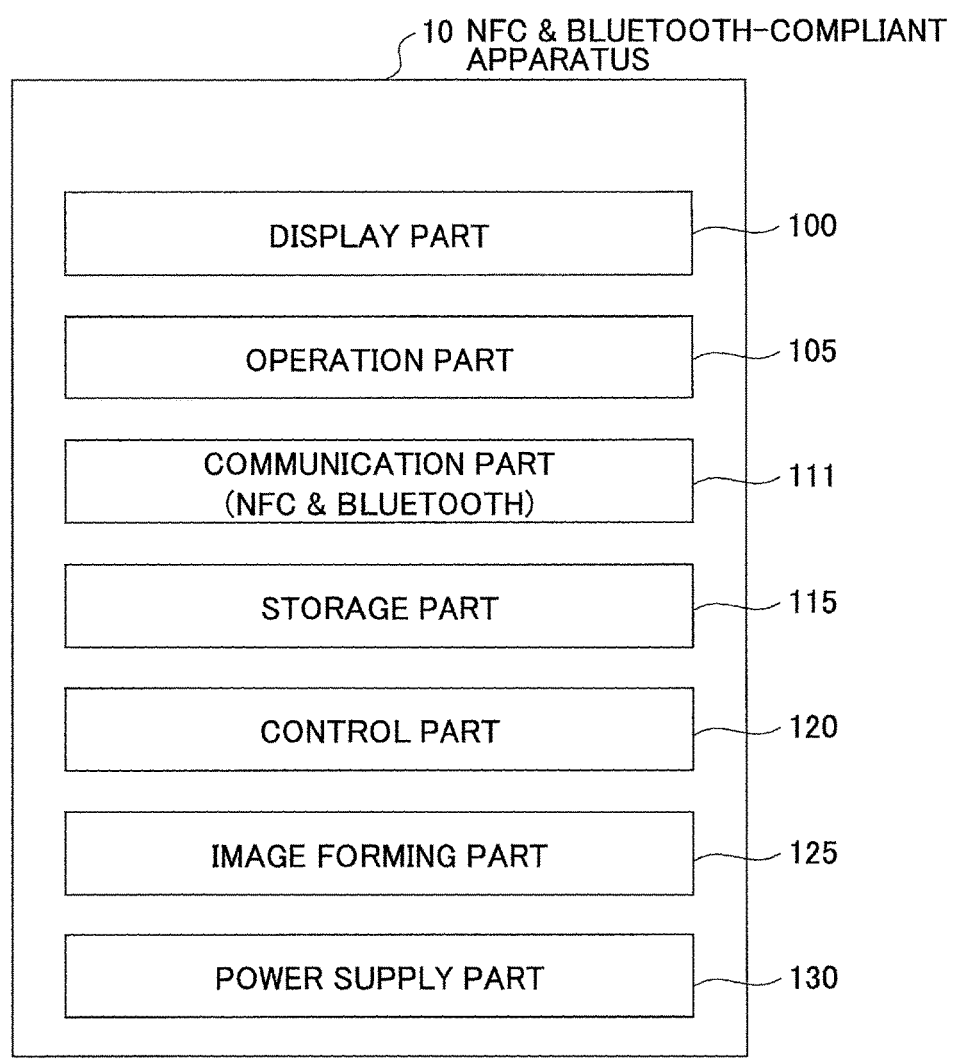
FIG. 21A is a diagram illustrating a configuration of the apparatus according to the second embodiment.
Figure 21B:
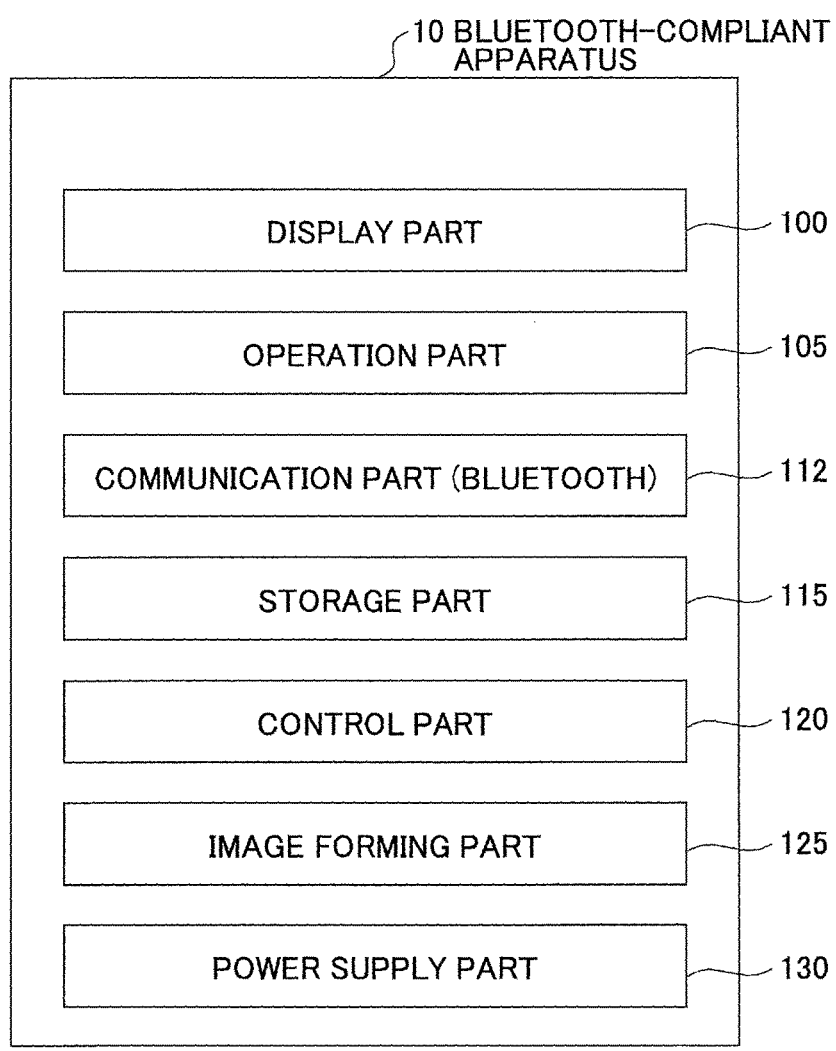
FIG. 21B is a diagram illustrating another configuration of the apparatus according to the second embodiment.
Figure 22A:
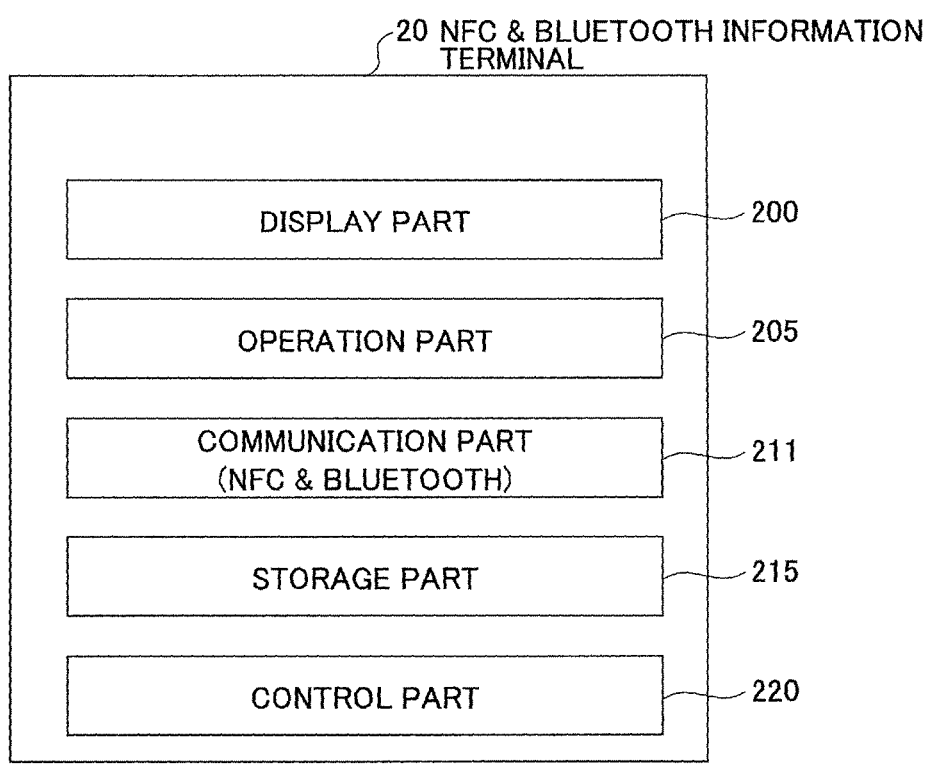
FIG. 22A is a diagram illustrating a configuration of the information terminal according to the second embodiment.

Next, a description is given, with reference to FIGS. 21A, 21B, 22A, 22B and 23, of functional configurations of apparatuses of the apparatus management system according to the second embodiment. FIGS. 21A and 22A are diagrams illustrating functional configurations of the apparatus 10 according to the second embodiment. The apparatus 10 illustrated in FIG. 21A includes the display part 100, the operation part 105, a communication part 111, the storage part 115, the control part 120, the image forming part 125, and the power supply part 130. The apparatus 10 of FIG. 21A is different from the apparatus 10 of the first embodiment in that the communication part 111 has an NFC and Bluetooth radio communication function. The apparatus 10 may include a communication part 112 having a Bluetooth radio communication function illustrated in FIG. 21B in place of the communication part 111.

Figure 22B:
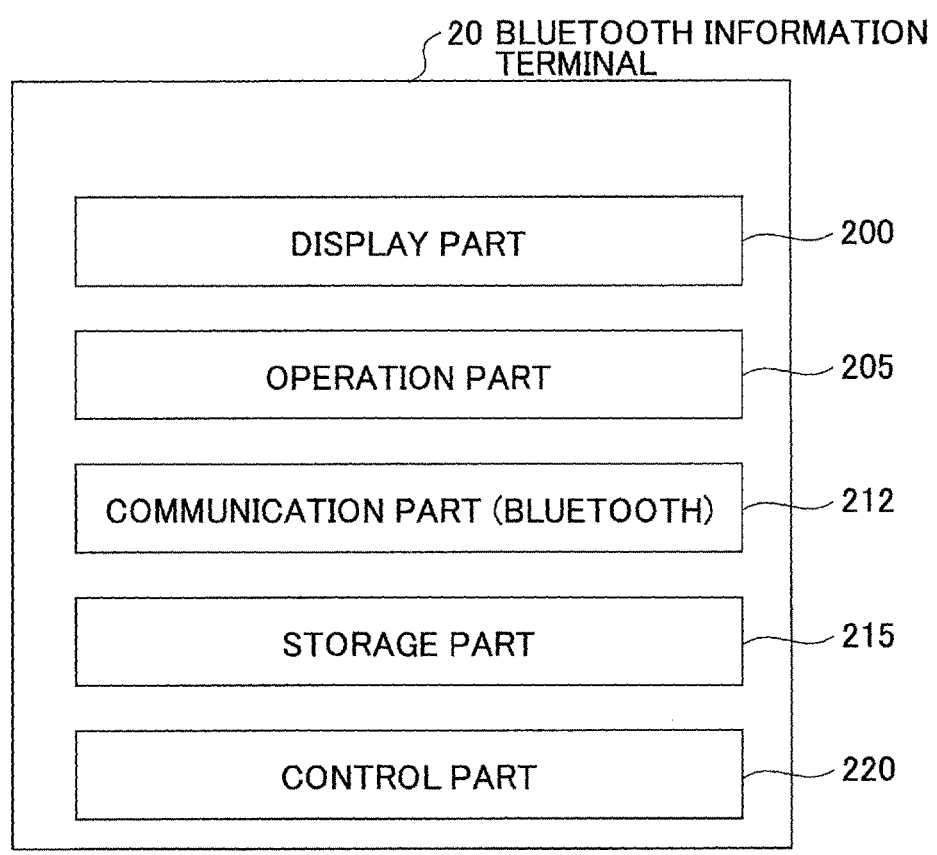
FIG. 22B is a diagram illustrating another configuration of the information terminal according to the second embodiment.
Figure 23:
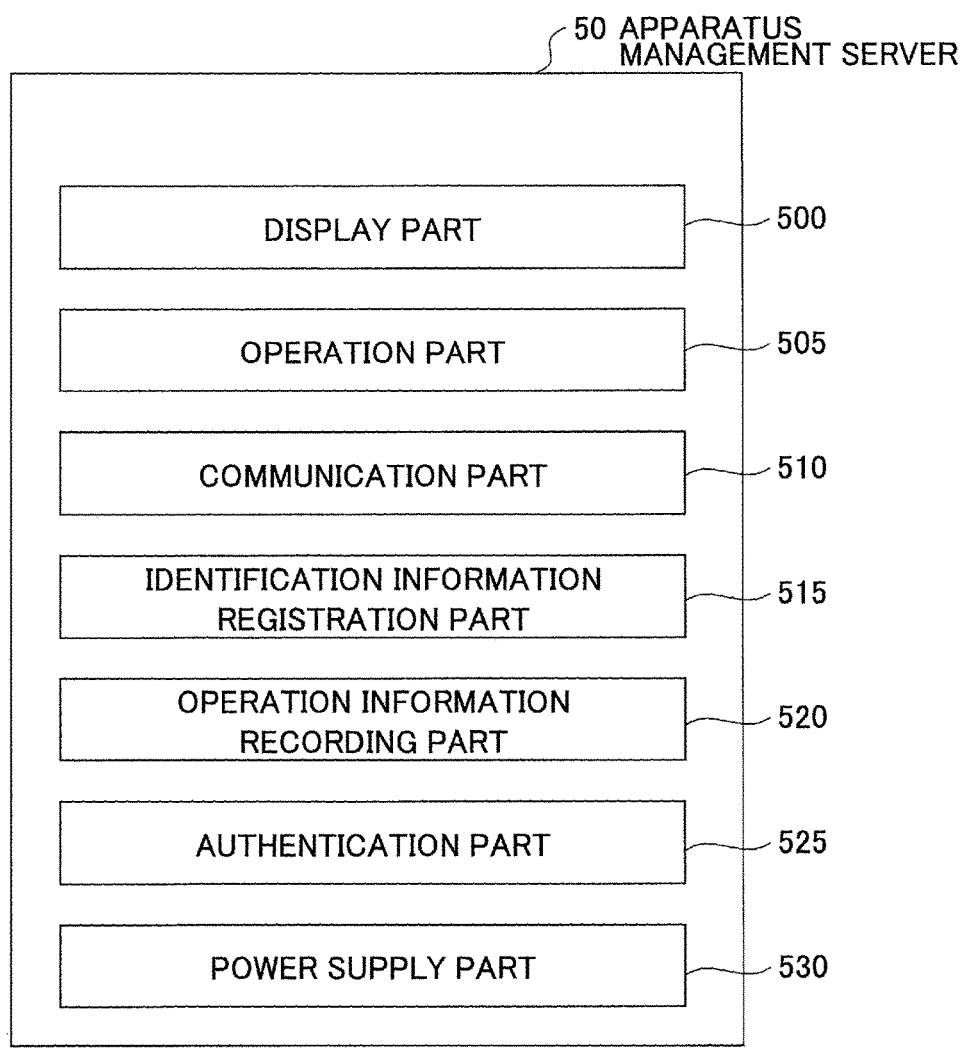
FIG. 23 is a diagram illustrating a configuration of the apparatus management server according to the second embodiment.

FIGS. 22A and 22B are diagrams illustrating functional configurations of the information terminal 20 according to the second embodiment. The information terminal 20 illustrated in FIG. 22A includes the display part 200, the operation part 205, a communication part 211, the storage part 215, and the control part 220. The information terminal 20 of FIG. 22A is different from the information terminal 20 of the first embodiment in that the communication part 211 has an NFC and Bluetooth radio communication function. The information terminal 20 may include a communication part 212 having a Bluetooth radio communication function illustrated in FIG. 22B in place of the communication part 211. The functional configuration of the apparatus management server 50 illustrated in FIG. 23 is the same as in the first embodiment, and accordingly, its description is omitted.

Figure 24A:
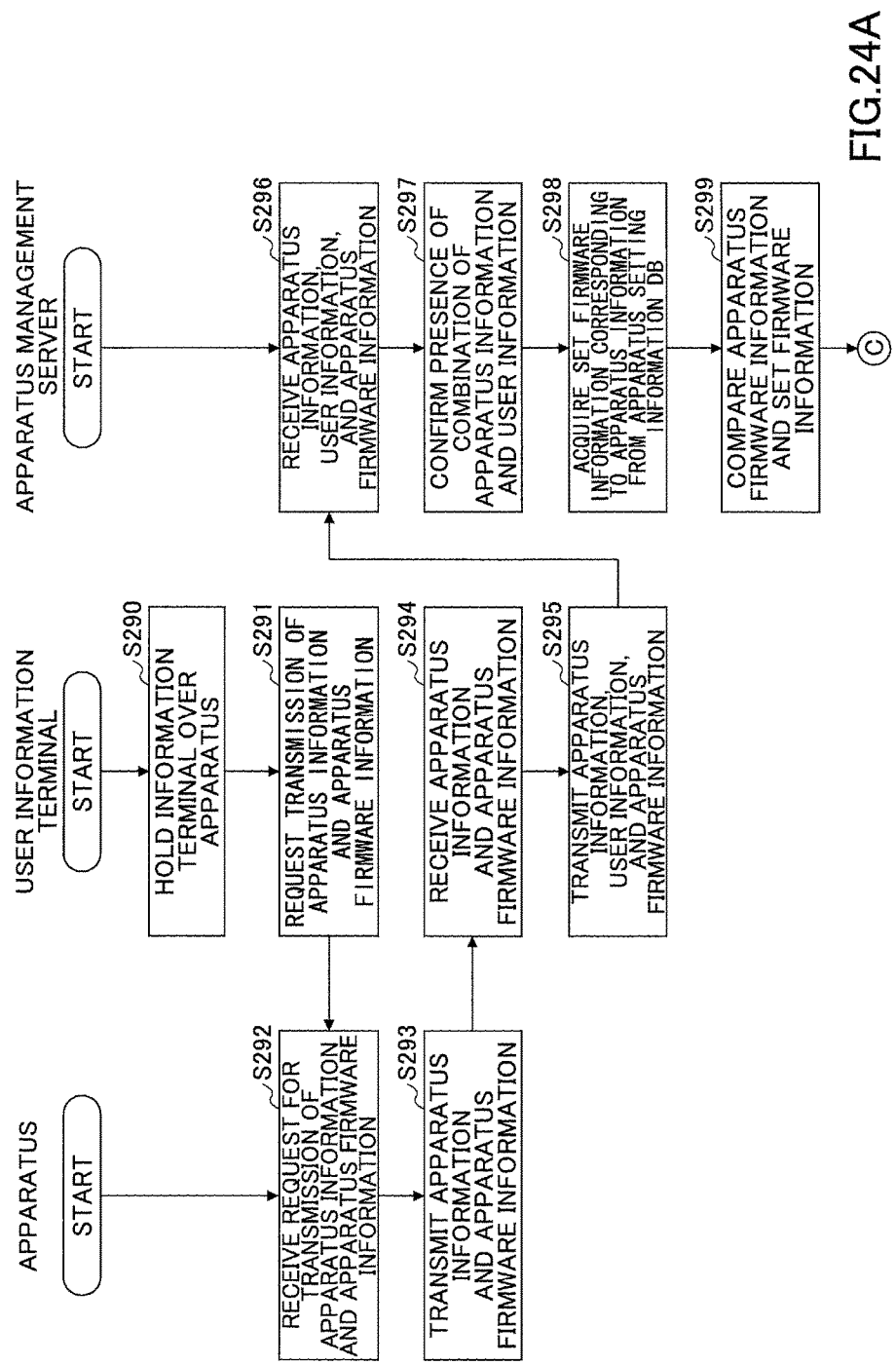
FIGS. 24A and 24B are flowcharts illustrating a key unlocking process according to the second embodiment.
Figure 24B:
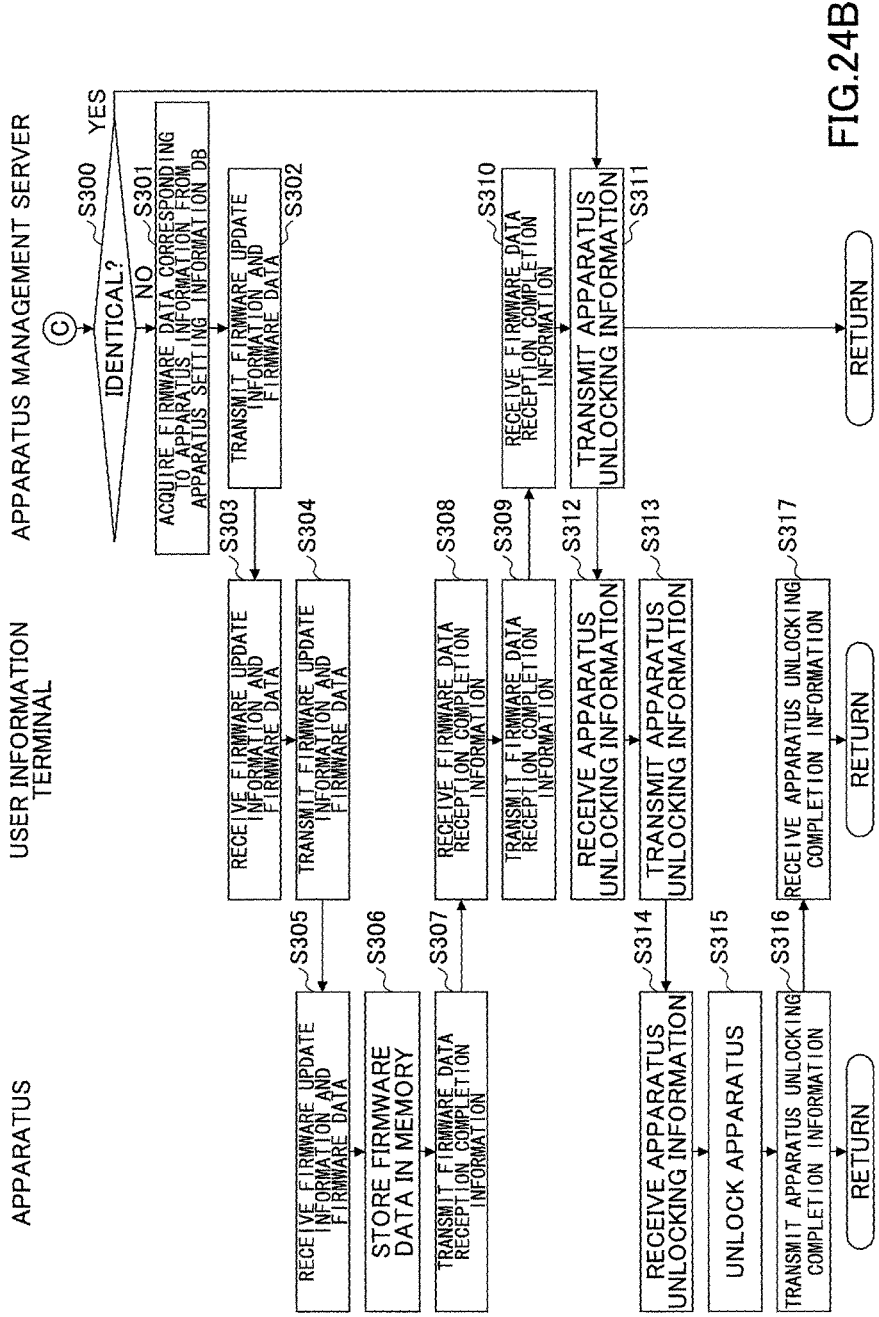

Next, a description is given, with reference to FIGS. 24A and 24B, of a key unlocking process including a firmware data updating check process according to the second embodiment. FIGS. 24A and 24B are flowcharts illustrating a key unlocking process according to the second embodiment. In FIGS. 24A and 24B, a flow on the left side illustrates an operation of the apparatus 10, a flow at the center illustrates an operation of the information terminal 20 of a user (user information terminal), and a flow on the right side illustrates an operation of the apparatus management server 50. According to the key unlocking process of the second embodiment, a firmware transfer process is performed before unlocking the apparatus 10. In the following description, the user may be a manager, and in this case, user information becomes manager information.

A description is given, with reference to FIGS. 24A and 24B, of the key unlocking process. At this point, the process of FIG. 10A (up to step S98) is completed, and an image of a "lock" is displayed on the screen of the user information terminal. According to the key unlocking process, first, at step S290 of FIG. 24A, the user holds the user information terminal over the apparatus 10. At step S291, the user information terminal requests the apparatus 10, using NFC or Bluetooth radio communications, to transmit apparatus information and apparatus firmware information.

At step S292, the apparatus 10 receives the request for transmission of apparatus information and apparatus firmware information, and at step S293, the apparatus 10 transmits apparatus information and apparatus firmware information. At step S294, the user information terminal receives the apparatus information and the apparatus firmware information, and at step S295, the user information terminal transmits the apparatus information, user information, and the apparatus firmware information to the apparatus management server 50.

At step S296, the apparatus management server 50 receives the apparatus information, the user information, and the apparatus firmware information. At step S297, the apparatus management server 50 searches the key management DB 60 so as to confirm that a pair of the received apparatus information and user information is registered with the key management DB 60. The user information is an example of terminal information for identifying the information terminal 20.

If the above-described pair is registered with the key management database DB 60, at step S298, the apparatus management server 50 acquires apparatus firmware information set in correspondence to the apparatus information from the apparatus setting information DB 95. At step S299, the apparatus management server 50 compares the received apparatus firmware information and the set apparatus firmware information. At step S300 of FIG. 24B, the apparatus management server 500 determines whether the received apparatus firmware information and the set apparatus firmware information are identical. If the apparatus management server 50 determines that the received apparatus firmware information and the set apparatus firmware information are identical (YES at step S300), at steps S311 through S317, the same process of unlocking the apparatus 10 as at steps S198 through S203 of FIG. 11 described in the first embodiment is executed. As a result, the apparatus 10 is available for use.

On the other hand, in response to determining that the received apparatus firmware information and the set apparatus firmware information are not identical as a result of their comparison (NO at step S300), at step S301, the apparatus management server 50 acquires firmware data corresponding to the apparatus information set in the apparatus setting information DB 95.

For example, FIG. 25A illustrates an apparatus code, an apparatus number (an example of apparatus information), and apparatus firmware information as information transmitted from the apparatus 10 to the user information terminal at step S293. FIG. 25B illustrates the information of FIG. 25A to which a user information terminal number (an example of user information) is further added, as information transmitted from the user information terminal to the apparatus management server 50 at step S295.

FIG. 26A illustrates an example of apparatus information (an apparatus code and an apparatus number) before a change of firmware and firmware information (apparatus firmware information and a registration date). FIG. 26B illustrates an example of apparatus information and firmware information after a change of firmware. These information items are stored in a memory of the apparatus management server 50 or other apparatuses (such as a cloud memory) and are managed by the apparatus manufacturer P3 (FIG. 6) or a system manager. The apparatus manufacturer P3 or the system manager updates a predetermined memory when updating firmware, and the updated firmware information is stored in the apparatus setting information DB 95.

Apparatus firmware information "PJ051" corresponding to an apparatus code "PJ001" after change at a second line 26b2 of the table of FIG. 26B is different from apparatus firmware information "PJ050" corresponding to the apparatus code "PJ001" before change at a second line 26a2 of the table of FIG. 26A. Accordingly, the received apparatus firmware information "PJ050" corresponding to the apparatus code "PJ001" of FIG. 25B is different from the apparatus firmware information "PJ051" after change.

In this case, at step S301, the apparatus management server 50 acquires firmware data corresponding to the received apparatus code "PJ001" from the apparatus setting information DB 95. For example, firmware data stored in correspondence to the apparatus code 951 "PJ001" in the apparatus setting information DB 95 (firmware setting information) illustrated in FIG. 26C is acquired. Examples of the firmware data acquired here include the apparatus code 951 "PJ001," the set firmware information 952 "PJ051," the firmware size 953 "1200," and the registration date 954 "20130425." The firmware size 953 "1200" and the registration date 954 "20130425" are preferably, but do not have to be, included in the firmware data.

At step S302, the apparatus management server 50 transmits the acquired firmware data and firmware update information to the user information terminal. The firmware update information is a command or flag corresponding to the updating of firmware. The firmware update information is an example of apparatus management information for managing the apparatus 10. FIG. 25C illustrates an example of transmission of the apparatus code "PJ001" and the set firmware information "PJ051" to the apparatus 10. The apparatus management information may be either received from the apparatus management server 50 or generated in the user information terminal.

At step S303, the user information terminal receives the firmware update information and the firmware data, and at step S304, the user information terminal transmits the received information to the apparatus 10. At step S305, the apparatus 10 receives the firmware update information and the firmware data, and at step S306, the apparatus 10 stores the firmware data in a memory of the apparatus 10. FIG. 25D illustrates the set firmware information after change and the apparatus firmware information before change as an example of information stored in a memory by the apparatus 10. As a result, when the apparatus 10 is activated next time, the apparatus 10 determines, based on the firmware update information, that an update of the firmware has been acquired, and changes the firmware from the apparatus firmware information before change to the set firmware information after change based on the information in the memory. As a result, the firmware of the apparatus 10 is updated. The apparatus 10 may stop operating after updating firmware.

Next, at step S307, the apparatus 10 transmits information indicating completion of reception of firmware data. At step S308, the user information terminal receives the information indicating completion of reception of firmware data, and at step S309, the user information terminal transmits the information indicating completion of reception of firmware data to the apparatus management server 50. At step S310, the apparatus management server 50 receives the information indicating completion of reception of firmware data. As a result, the apparatus management server 50 determines that the updating of the firmware of the apparatus 10 is completed, and at steps S311 through S317, a process of unlocking the apparatus 10 is performed. As a result, the apparatus 10 is available for use.

Figure 27C:
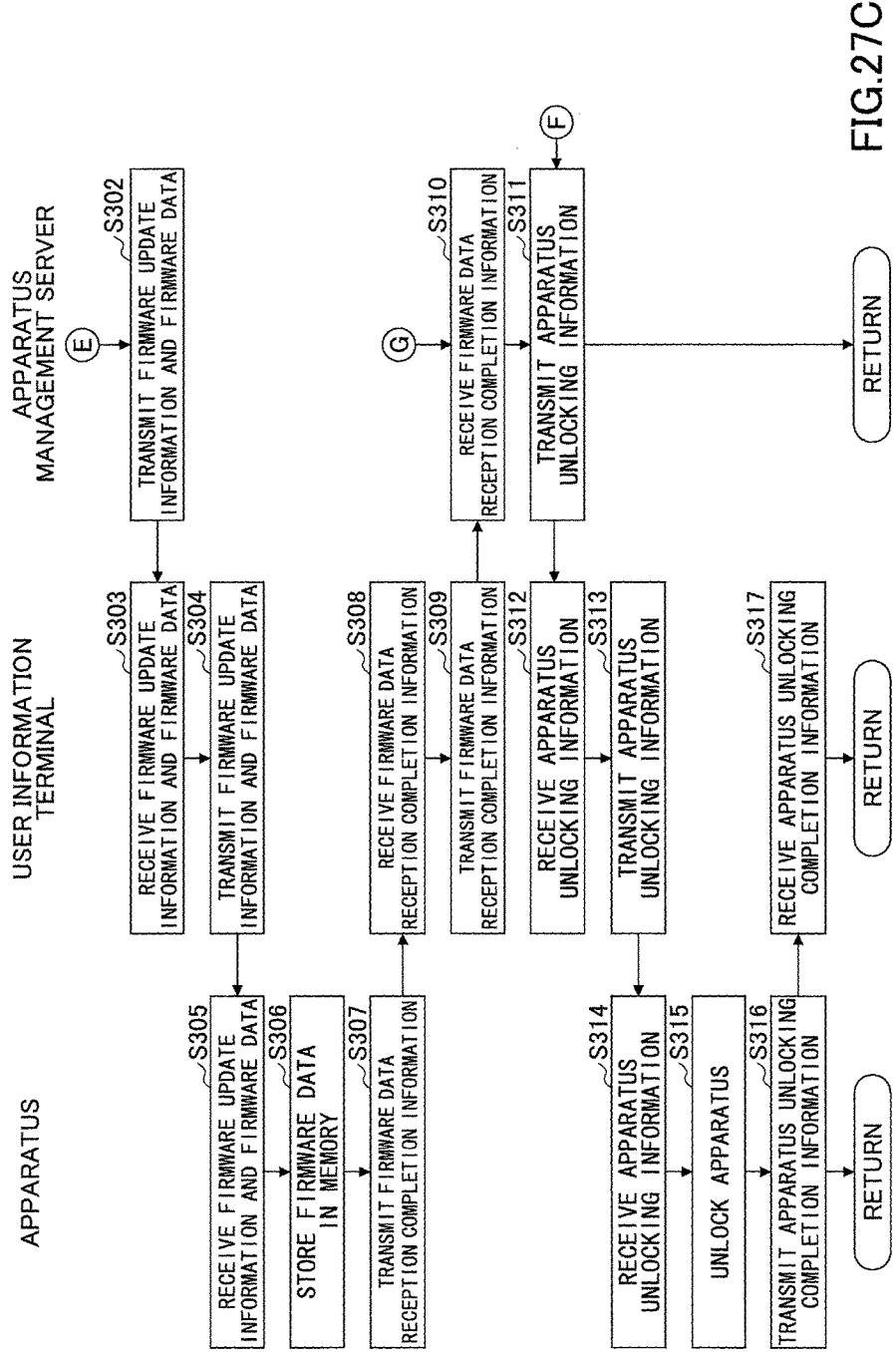

Next, a description is given, with reference to FIGS. 27A, 27B and 27C, of a key unlocking process according to a variation of the second embodiment. FIGS. 27A through 27C are flowcharts illustrating a key unlocking process according to a variation of the second embodiment. In the following description, a user may be a manager, and in this case, user information becomes manager information.

At the start of a key unlocking process according to a variation of the second embodiment, the process of FIG. 10A (up to step S98) is completed, and an image of a "lock" is displayed on the screen of the information terminal 20 of a user (user information terminal). According to the key unlocking process, first, at step S290 of FIG. 27A, the user holds the user information terminal over the apparatus 10. At steps S291 through S294, the user information terminal requests the apparatus 10, using NFC or Bluetooth radio communications, to transmit apparatus information and apparatus firmware information, and acquire these information items from the apparatus 10. At step S295, the user information terminal transmits the apparatus information, user information, and the apparatus firmware information to the apparatus management server 50, and at step S296, the apparatus management server 50 receives these information items.

Next, at step S297, the apparatus management server 50 searches the key management DB 60 so as to confirm that a pair of the received apparatus information and user information is registered with the key management DB 60.

If the above-described pair is registered with the key management database DB 60, at step S320, the apparatus management server 50 acquires apparatus firmware information, a firmware size, and high-speed interface (IF) information set in correspondence to the apparatus information from the apparatus setting information DB 95. FIG. 28C illustrates an example of an apparatus code, set apparatus firmware information (set firmware information), a firmware size, and high-speed IF information that are set in the apparatus setting information DB 95 in correspondence to the apparatus code and apparatus firmware information received at steps S294 and S296 illustrated in FIGS. 28A and 28B, respectively.

At step S299, the apparatus management server 50 compares the received apparatus firmware information and the set firmware information. At step S300 of FIG. 27B, the apparatus management server 50 determines whether the received apparatus firmware information and the set apparatus firmware information are identical. If the apparatus management server 50 determines that the received apparatus firmware information and the set apparatus firmware information are identical (YES at step S300), at steps S311 through S317 of FIG. 27C, the process of unlocking the apparatus 10 described in the second embodiment is executed. As a result, the apparatus 10 is available for use.

On the other hand, in response to determining that the received apparatus firmware information and the set apparatus firmware information are not identical (NO at step S300), at step S301, the apparatus management server 50 acquires firmware data corresponding to the apparatus information set in the apparatus setting information DB 95.

Next, at step S321, the apparatus management server 50 determines whether the firmware size (bytes) is equal to or less than a predetermined value. For example, letting the predetermined value be "1500," the firmware size "1200" is equal to or less than a predetermined value, so that the process proceeds to step S302 of FIG. 27C. At and after step S302, first, the firmware data updating process described in the second embodiment is executed at steps S302 through S310, and then, the process of unlocking the apparatus 10 described in the second embodiment is executed at steps S311 through S317. As a result, the apparatus 10 is available for use after the update of the firmware data.

On the other hand, letting the predetermined value be "1000," the firmware size "1200" is greater than the predetermined value "1000," so that the apparatus management server 50 proceeds to step S322. At step S322, the apparatus management server 50 determines whether radio communications to be used are high-speed IF communications. If the acquired high-speed IF information is "NO," at step S322, the apparatus management server 50 determines that the radio communications are not high-speed IF communications. In this case, the firmware updating process is executed at steps S302 through S310 of FIG. 27C, and the process of unlocking the apparatus 10 is executed at steps S311 through S317 of FIG. 27C. The apparatus management server 50 may possess, with respect to each apparatus 10 (apparatus code), the apparatus radio specification information of, for example, the number of radio IFs, the availability of a high-speed IF, and communications standards such as NFC and Bluetooth as illustrated in FIG. 28E. Thus, the apparatus management server 50 may determine the availability of a high-speed IF of the apparatus 10 corresponding to the apparatus information based on the radio specification information. The high-speed IF information is an example of the transmission rate information of communications with the apparatus 10.

If the acquired high-speed IF information is "YES," at step S322, the apparatus management server 50 determines that the radio communications are high-speed IF communications. In this case, at step S323, the apparatus management server 50 transmits firmware update information, firmware data, and IF change information. The IF change information is a command or flag that indicates an instruction to change the communication IF to a high-speed IF. The IF change information is an example of apparatus management information for managing the apparatus 10. The apparatus management information may be either received from the apparatus management server 50 or generated in the user information terminal.

At step S324, the user information terminal receives the firmware update information, the firmware data, and the IF change information. At step S325, the user information terminal determines whether it is possible to change the IF and increase speed. If the user information terminal determines, based on the IF change information, that it is not possible to change the IF or determines, based on the high-speed IF information, that it is not possible to increase speed (NO at step S325), the firmware updating process is executed at steps S302 through S310 of FIG. 27C and the process of unlocking the apparatus 10 is executed at steps S311 through S317 of FIG. 27C.

On the other hand, if the user information terminal determines, based on the IF change information, that it is possible to change the communication IF and determines, based on the high-speed IF information, that it is possible to increase speed (YES at step S325), at step S326, the user information terminal changes the communication IF. Next, at steps S327 through S333, a process of writing firmware information to the apparatus 10 is executed.

Specifically, at step S327, the user information terminal transmits the firmware update information and the firmware data to the apparatus 10 using the communication IF after change. At step S328, the apparatus 10 receives the firmware update information and the firmware data, and at step S329, the apparatus 10 stores the firmware data in a memory of the apparatus 10. When the firmware size is greater than a predetermined value and the radio communications are high-speed communications, the user information terminal writes firmware data to the apparatus 10 in this manner.

FIG. 28D illustrates the set firmware information after change and the apparatus firmware information before change as an example of information stored in a memory by the apparatus 10. As a result, when the apparatus 10 is activated next time, the apparatus 10 determines, based on the firmware update information, that an update of the firmware has been acquired, and changes the firmware from the apparatus firmware information before change to the set firmware information after change based on the information in the memory. As a result, the firmware of the apparatus 10 is updated. The apparatus 10 may stop operating after updating firmware.

Next, at step S330, the apparatus 10 transmits information indicating completion of reception of firmware data. At step S331, the user information terminal receives the information indicating completion of reception of firmware data, and at step S333, the user information terminal transmits the received information to the apparatus management server 50. At step S310 of FIG. 27C, the apparatus management server 50 receives the information indicating completion of reception of firmware data. The user information terminal may return the communication IF to the communication IF before change at step S332 after reception of the information indicating completion of reception of firmware data at step S331.

As a result, the apparatus management server 50 determines that the writing of firmware to the apparatus 10 is completed, and at steps S311 through S317, the process of unlocking the apparatus 10 is performed. As a result, the apparatus 10 is available for use.

The apparatus management server 50 may perform the determination at step S325 in place of the information terminal 20 by acquiring the IF change information and the high-speed IF information.

A description is given above of the writing of firmware data to the apparatus 10, while the reading of firmware data from the apparatus 10 may be performed in the same manner. That is, when the user information terminal determines, based on the IF change information, that it is possible to change the communication IF and determines, based on the high-speed IF information, that it is possible to increase speed, the user information terminal may change the communication IF and read firmware data from the apparatus 10. Specifically, the user information terminal receives firmware data from the apparatus 10 using the communication IF after change. The reading of firmware data is preferably performed before, but may also be performed after, unlocking the apparatus 10. According to the above-described second embodiment and its variation, it is possible to perform at least one of updating, writing, and reading of the firmware data of the apparatus 10.

According to the above-described variation of the second embodiment, it is determined, based on a firmware size and the transmission rate information of communications with the apparatus 10, whether or not to write firmware data to or read firmware data from the apparatus 10. It is also possible, however, to determine whether or not to write firmware data to or read firmware data from the apparatus 10 based on at least one of a firmware size and the transmission rate information of communications with the apparatus 10.

The updating of firmware can only be performed in an online state. Therefore, for example, when it is assumed that the number of users of this embodiment is one and the location of use is an area where it is difficult to perform communications, the information terminal 20 of the user acquires firmware data from the apparatus management server 50 when the user has moved into a location where it is possible to perform communications. In this case, it is possible for the user of the information terminal 20 to have downloaded the firmware data by determining the necessity or unnecessity of updating the firmware data beforehand, and to update the firmware data when performing apparatus authentication to operate the apparatus 10.

Third Embodiment

In a third embodiment, a description is given of switching of communication devices of a user information terminal. FIG. 29 is a flowchart illustrating a communication device switching process according to the third embodiment. According to this switching process, as examples of communication devices of a user information terminal, an NFC device and a Bluetooth device are switched.

Attention is focused on the transmission rates of communication devices. According to NFC, the data transfer rate is 106-848 kbit/s, so that it takes at least 10 seconds to transfer 1 MB firmware data. Meanwhile, by adopting the Bluetooth v3.0+HS standard, the data transfer rate can be 24 Mbit/s, so that it is possible to reduce the transfer time of 1 MB firmware data to 0.3 seconds compared with communications using NFC. Accordingly, when the size of firmware data to be transferred is a predetermined value or more, it is preferable to switch to a faster communication method. Therefore, according to the third embodiment, the user information terminal is enabled to switch communication devices.

When the communication device switching process of FIG. 29 is started, first, at step S400, the information terminal 20 of a user (user information terminal) enables a Bluetooth function. Next, at step S401, the user information terminal launches the application. The operation of enabling the Bluetooth function may be performed by either the user or the application. It is preferable, however, to launch the application with the Bluetooth function being started by the user because there is basically no means for starting the Bluetooth function from the application side. In the case where the application is launched with the Bluetooth function not being started, a transition may be made to a Bluetooth setting screen after the application detects that the Bluetooth function is not started and displays a message, and the Bluetooth setting screen may return to the initial screen after the Bluetooth function is enabled.

At step S402, the user information terminal scans the surrounding area, and determines whether a signal has been detected. In response to determining at step S402 that a beacon signal has been received, at step S403, the user information terminal sets the communication device to a Bluetooth device, and ends this process. In response to determining at step S402 that an NFC signal has been received, at step S404, the user information terminal sets the communication device to an NFC device, and ends this process. In response to determining at step S402 that no signal has been received, the user information terminal repeats scanning the surrounding area.

A description is given above of the communication device switching process according to the third embodiment. The above-described switching process is applicable to the case where the detected signal is an NFC signal or a Bluetooth signal (a beacon signal). Next, a description is given of a communication device switching process in the case where multiple signals have been detected by a user information terminal.

A description is given of a communication device switching process according to a first variation of the third embodiment. According to the first variation, a description is given of the case where there are multiple apparatuses 10 having a Bluetooth communication function and beacon signals from the apparatuses 10 are detected when the information terminal 20 such as a smartphone is brought close to the apparatus 10. FIGS. 30A and 30B are flowcharts illustrating a communication device switching process according to the first variation of the third embodiment. When the communication device switching process of FIGS. 30A and 30B is started, first, at step S400 of FIG. 30A, the information terminal 20 of a user (user information terminal) turns on the Bluetooth function. Then, at step S401, the user information terminal launches the application, and at step S402, the user information terminal determines whether a signal has been received. In response to determining that a beacon signal has been received, at step S403, the user information terminal sets the communication device to a Bluetooth device. In response to determining that an NFC signal has been received, at step S404, the user information terminal sets the communication device to an NFC device.

When the communication device is set to an NFC device at step S404, for example, the process of unlocking the apparatus 10 described above in the second embodiment (steps S311 through S317 of FIG. 30B) is performed. As a result, the apparatus 10 is available for use.

When the communication device is set to a Bluetooth device at step S403, at step S500, the user information terminal determines the number of apparatuses 10 (apparatus number n) based on the received signals. If it is determined that the apparatus number n is one (n=1 at step S500), for example, the process of unlocking the apparatus 10 described above in the second embodiment (steps S311 through S317 of FIG. 30B) is performed. As a result, the apparatus 10 is available for use.

On the other hand, in response to determining at step S500 that the apparatus number n is greater than one (n>1 at step S500), at step S501, the user information terminal transmits a request for transmission of apparatus information. For example, FIG. 31A illustrates an example of detected signals in the case where the user information terminal has detected three beacon signals, that is, in the case where the apparatus number n is three. In this case, at step S502, the three apparatuses 10 receive the apparatus information transmission request, and at step S503, each of the three apparatuses 10 transmits its apparatus information to the user information terminal.

At step S504, the user information terminal receives the apparatus information from the three apparatuses 10. FIG. 31B illustrates three apparatus codes and three apparatus numbers as an example of the apparatus information received by the user information terminal. At step S505, the user information terminal transmits the apparatus information and user information to the apparatus management server 50. At step S506, the apparatus management server 50 receives the apparatus information and the user information. FIG. 31C illustrates three apparatus codes, three apparatus numbers, and a user information terminal number as an example of the apparatus information and the user information received by the apparatus management server 50.

At step S507 of FIG. 30B, the apparatus management server 50 confirms that at least one of the pairs of the received apparatus information and user information is registered with the key management DB 60. Next, at step S508, the apparatus management server 50 the number of pairs (combinations) m of apparatus information and user information registered with the key management DB 60. If the number of pairs m of apparatus information and user information is one (m=1 at step S508), for example, the process of unlocking the apparatus 10 described above in the second embodiment (steps S311 through S317 of FIG. 30B) is performed. As a result, the apparatus 10 is available for use.

If the number of pairs m of apparatus information and user information is greater than one (m>1 at step S508), at step S509, the apparatus management server 50 transmits the apparatus information and the apparatus unlocking information of the authenticated apparatuses 10. FIG. 31C illustrates apparatus codes and apparatus numbers as an example of the apparatus information of the apparatuses 10 before authentication and user information terminal numbers as an example of the apparatus unlocking information.

At step S510, the user information terminal receives the apparatus information and the apparatus unlocking information of the authenticated apparatuses 10, and displays the received apparatus information and apparatus unlocking information on the screen. FIG. 31D illustrates an example of the apparatus information and the apparatus unlocking information of the authenticated apparatuses 10 displayed on the screen of the user information terminal. At step S511, the user information terminal selects one of the apparatuses 10 in accordance with the user's operation on the screen. FIG. 31E illustrates the apparatus information and the apparatus unlocking information of the selected apparatus 10.

Next, at step S512, the user information terminal transmits the apparatus unlocking information to the selected apparatus 10. At step S314, the apparatus 10 receives the apparatus unlocking information, and at step S315, the apparatus 10 is unlocked. At step S316, the apparatus 10 transmits apparatus unlocking completion information, and at step S317, the user information terminal receives the apparatus unlocking completion information. As a result, even when multiple beacon signals are acquired, one of the authenticated apparatuses 10 is available for use.

As described above, according to the first variation of the third embodiment, when a user information terminal detects multiple beacon signals, the apparatus management server 50 performs authentication in which apparatus information and user information are paired, with respect to each of the apparatuses 10. If only one pair has been successfully authenticated as a result of this authentication, the apparatus unlocking information is transmitted to the particular apparatus 10 that has been successfully authenticated. If multiple pairs have been successfully authenticated, for example, an apparatus list is displayed in a menu on the screen of the user information terminal, and the user is caused to make a selection. The apparatus unlocking information is transmitted to the apparatus 10 that has been thus selected among the successfully authenticated apparatuses 10. As a result, it is possible to unlock and use the apparatus 10.

Next, a description is given of a communication device switching process according to a second variation of the third embodiment. In the second variation of the third embodiment, a description is given of another example of the switching of communication devices in the case where there are multiple Bluetooth-enabled apparatuses 10 and beacon signals from the apparatuses 10 are detected when the information terminal 20 such as a smartphone is brought close to the apparatus 10. According to the second variation of the third embodiment, if multiple apparatuses 10 are available for use as a result of authentication, the apparatus 10 of the highest signal strength is selected and unlocked.

FIGS. 32A and 32B are flowcharts illustrating a communication device switching process according to the second variation of the third embodiment. The process of steps S400 through S404 of FIG. 32A is the same as that of the first variation of the third embodiment, and accordingly, its description is omitted.

According to the second variation of the third embodiment, when it is determined at step S500 that the apparatus number n is greater than one, at step S501, the user information terminal transmits a request for transmission of apparatus information. For example, FIG. 33A illustrates an example of detected signals in the case where the user information terminal has acquired three beacon signals, that is, in the case where the apparatus number n is three. In this case, at step S502, the three apparatuses 10 receive the apparatus information transmission request, and at step S503, each of the three apparatuses 10 transmits its apparatus information to the user information terminal.

At step S504, the user information terminal receives the apparatus information from the three apparatuses 10. FIG. 33B illustrates the apparatus codes and the apparatus numbers of the three apparatuses 10 as an example of the apparatus information received by the user information terminal. At step S600, the user information terminal transmits the apparatus information, user information, and signal strengths to the apparatus management server 50. At step S601, the apparatus management server 50 receives the apparatus information, the user information, and the signal strengths. FIG. 33C illustrates an example of the apparatus information of the three apparatuses 10, the user information, and the signal strengths received by the apparatus management server 50.

At step S602 of FIG. 32B, the apparatus management server 50 confirms that at least one of the pairs of the received apparatus information and user information are registered with the key management DB 60. FIG. 33D illustrates an example of pairs of apparatus information and user information registered with the key management DB 60. Next, at step S603, the apparatus management server 50 transmits the apparatus information and the apparatus unlocking information of the pair corresponding to the highest signal strength among the pairs of the apparatus information and the user information that are registered with the key management DB 60, that is, successfully authenticated. At step S604, the user information terminal receives these information items. FIG. 33E illustrates an example of the apparatus information and the apparatus unlocking information corresponding to the highest signal strength.

At step S605, the user information terminal transmits the apparatus unlocking information to the apparatus 10 of the highest signal strength. At step S314, the apparatus 10 receives the apparatus unlocking information, and at step S315, the apparatus 10 is unlocked. At step S316, the apparatus 10 transmits apparatus unlocking completion information, and at step S317, the user information terminal receives the apparatus unlocking completion information. As a result, even when multiple beacon signals are acquired, one of the authenticated apparatuses 10 is available for use.

According to the above-described switching process, the apparatus 10 of the highest signal strength among the successfully authenticated apparatuses 10 is automatically selected, and is available for use. According to this variation, the nearest apparatus 10 is selected because generally, the signal strength increases as the distance between the apparatus 10 and the user information terminal decreases. The above-described apparatus selection, however, is an example, and other methods are possible. For example, it is possible to select the apparatus 10 marking the largest increase among the variations in the received signal strength of beacon signals. An increase in the received signal strength indicates a decrease in the distance to the apparatus 10. Therefore, selecting the apparatus 10 marking the largest increase among the variations in the received signal strength means selecting the apparatus 10 that the user is approaching.

As described above, according to the second variation of the third embodiment, when a user information terminal detects multiple beacon signals, the apparatus management server 50 performs authentication in which apparatus information and user information are paired, with respect to each of the apparatuses 10 that have transmitted beacon signals. If only one pair has been successfully authenticated as a result of this authentication, the apparatus unlocking information is transmitted to the apparatus 10 of the apparatus information included in the pair. If multiple pairs have been successfully authenticated, for example, it is possible to unlock and use the apparatus 10 of the pair of the highest signal strength among the successfully authenticated pairs of the apparatus information and the user information.

All examples and conditional language provided herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority or inferiority of the invention. Apparatus management systems, apparatus management apparatuses, and apparatus management methods have been described based on embodiments of the present invention. It should be understood, however, that the various changes, substitutions, and alterations could be made hereto without departing from the spirit and scope of the present invention.

For example, the apparatus management system configurations according to the above-described embodiments are examples, and do not limit the scope of the present invention. Various system configurations are possible depending on use or purposes.

For example, the system configuration where the apparatus 10 and the information terminal 20 are connected to the apparatus management server 50 via the network 40 is one configuration of an apparatus management system according to an embodiment of the present invention, and embodiments of the present invention are not limited to this configuration. For example, the number of apparatus management servers 50 included in an apparatus management system according to an embodiment of the present invention may be one or more. In the case where multiple apparatus management servers 50 are installed, the processing of registration of manager information, registration and changing of user information, unlocking (online or offline), and updating, writing, and reading of firmware data may be distributed across the multiple apparatus management servers 50. Depending on use or purposes, the processing functions may be collectively installed in a selected one of the multiple apparatus management servers 50.

Furthermore, the apparatus 10 is not limited in number or type as long as the apparatus 10 is an electronic apparatus having a communication function. Examples of the apparatus 10 include projectors, office machines, home appliances, electric bicycles, automobiles, power tools, and image forming apparatuses. Furthermore, the information terminal 20 is not limited to a smartphone as long as the information terminal 20 is a portable terminal apparatus. Examples of the information terminal 20 include cellular phones, personal digital assistant (PDA)s, tablet apparatuses, portable-music players, and game machines.

Various aspects of the subject-matter described herein may be set out non-exhaustively in the following numbered clauses:

1. An apparatus management system managing an apparatus through an information terminal, including:
a transmission part configured to transmit terminal information identifying the information terminal and apparatus information identifying the apparatus;
a reception part configured to receive the terminal information and the apparatus information;
a first authentication part configured to perform first authentication that determines whether the received terminal information and apparatus information match one of a plurality of registered combinations of terminal information and apparatus information; and
a notification part configured to transmit apparatus management information to the information terminal when the first authentication determines that the received terminal information and apparatus information match the one of the plurality of registered combinations of terminal information and apparatus information.

2. The apparatus management system of clause 1, further including:
a storage part configured to store the apparatus information used for the first authentication and transmitted by the notification part; and
a second authentication part configured to perform second authentication that determines whether the apparatus information received from the apparatus matches the apparatus information stored in the information terminal,
wherein the notification part is configured to transmit the apparatus management information to the information terminal when the second authentication determines that the apparatus information received from the apparatus matches the apparatus information stored in the information terminal.

3. The apparatus management system of clause 2, wherein the second authentication part is configured to perform the second authentication if a predetermined time has not passed since storage of the apparatus information in the information terminal.

4. The apparatus management system of clause 2, wherein the second authentication part is configured to perform the second authentication when the second authentication part is disconnected from an apparatus management apparatus including the first authentication part.

5. The apparatus management system of clause 4, wherein the transmission part is configured to store apparatus operation information received from the apparatus and transmit the stored apparatus operation information to the apparatus management apparatus at a predetermined time.

6. The apparatus management system of clause 4, wherein the information terminal has authority to register manager information and user information with the apparatus management apparatus, authority to delete or change the manager information and the user information registered with the apparatus management apparatus, and authority to authorize a user information terminal to use the apparatus, when operating as a manager information terminal.

7. The apparatus management system of clause 4, further including:
a suspension part configured to suspend use of the apparatus when a difference between a time kept by the information terminal and a time kept by the apparatus management apparatus is more than or equal to a predetermined time.

8. The apparatus management system of clause 1, further including:
a selection part configured to select, from an apparatus list showing apparatuses transmitted by the notification part, one of the available apparatuses that is requested to be used.

9. The apparatus management system of clause 1, further including:
a display part configured to display guidance information on a screen of the information terminal.

10. The apparatus management system of clause 9, wherein
the notification part is configured to transmit the guidance information to the information terminal.

11. The apparatus management system of clause 9, further including:
a selection part configured to select, from a plurality of items of the guidance information, one of the plurality of items of the guidance information in accordance with an order of priority,
wherein the display part is configured to display the selected one of the plurality of items of the guidance information on the screen of the information terminal.

12. The apparatus management system of clause 1, further including:
an information control part configured to update firmware information of, write firmware information to, or read firmware information from the apparatus based on the apparatus management information.

13. The apparatus management system of clause 12, wherein
the information control part is configured to determine whether or not to write the firmware information to or read the firmware information from the apparatus based on at least one of a size of the firmware information and information on a transmission rate of communications with the apparatus.

14. The apparatus management system of clause 1, further including:
a selection part configured to select one of a plurality of communication devices of the information terminal as a communication device used for communications with the apparatus, based on a signal around the information terminal detected by the information terminal.

15. The apparatus management system of clause 9, wherein
the display part is configured to, when the information terminal detects a plurality of signals, display apparatus information of a plurality of apparatuses corresponding to the plurality of signals on the screen of the information terminal, and
the notification part is configured to transmit the apparatus management information through the information terminal to one of the plurality of apparatuses specified from apparatus information selected from the apparatus information displayed on the screen of the information terminal.

16. The apparatus management system of clause 1, wherein
the notification part is configured to, when the information terminal detects a plurality of signals, transmit the apparatus management information through the information terminal to an apparatus specified based on strengths of the plurality of signals.

17. An information terminal connectable to an apparatus and an apparatus management apparatus managing the apparatus, the information terminal including:
a transmission part configured to transmit terminal information identifying the information terminal and apparatus information identifying the apparatus; and
a reception part configured to receive, from the apparatus management apparatus, a notification of first authentication that the transmitted terminal information and apparatus information match one of a plurality of registered combinations of terminal information and apparatus information.

18. The information terminal of clause 17, wherein
the transmission part is configured to transmit the terminal information, the apparatus information, and a usage time limit of the apparatus, and
the reception part is configured to receive the notification of the first authentication from the apparatus management apparatus when the first authentication determines that the transmitted terminal information and apparatus information match the one of the plurality of registered combinations of terminal information and apparatus information and that the usage time limit of the apparatus is within a predetermined usage time limit of the apparatus.

19. The information terminal of clause 17, further including:
a storage part configured to store the apparatus information used for the first authentication and received by the reception part; and
an authentication part configured to perform second authentication that determines whether the apparatus information received from the apparatus matches the apparatus information stored in the information terminal,
wherein the reception part is configured to transmit apparatus management information when the second authentication determines that the apparatus information received from the apparatus matches the apparatus information stored in the information terminal.

20. The information terminal of clause 19, wherein
the second authentication part is configured to perform the second authentication if a predetermined time has not passed since storage of the apparatus information in the information terminal.

21. The information terminal of clause 19, further including:
a management part configured to manage the apparatus based on the apparatus management information.

22. The information terminal of clause 19, further including:
an information control part configured to update firmware information of, write firmware information to, or read firmware information from the apparatus based on the apparatus management information.

23. The information terminal of clause 22, wherein
the information control part is configured to determine whether or not to write the firmware information to or read the firmware information from the apparatus based on at least one of a size of the firmware information and information on a transmission rate of communications with the apparatus.

24. The information terminal of clause 19, further including:
a display part configured to, when the information terminal detects a plurality of signals, display apparatus information of a plurality of apparatuses corresponding to the plurality of signals on a screen of the information terminal, and
a notification part configured to transmit the apparatus management information to one of the plurality of apparatuses specified from apparatus information selected from the apparatus information displayed on the screen of the information terminal.

25. The information terminal of clause 19, further including:
a notification part configured to, when the information terminal detects a plurality of signals, transmit the apparatus management information to one of apparatuses corresponding to the plurality of signals, the one being specified based on strengths of the plurality of signals.

26. An information terminal connectable to an apparatus and an apparatus management apparatus managing the apparatus, the information terminal including:
a transmission part configured to transmit terminal information identifying the information terminal and apparatus information identifying the apparatus; and
a reception part configured to receive, from the apparatus management apparatus, a notification of first authentication that the transmitted terminal information and apparatus information match one of a plurality of registered combinations of terminal information and apparatus information.

27. The information terminal of clause 26, further including:
a storage part configured to store the apparatus information used for the first authentication and received by the reception part; and
an authentication part configured to perform second authentication that determines whether the apparatus information received from the apparatus matches the apparatus information stored in the information terminal,
wherein the reception part is configured to transmit apparatus management information when the second authentication determines that the apparatus information received from the apparatus matches the apparatus information stored in the information terminal.

28. The information terminal of clause 26, further including:
a plurality of communication devices;
a detection part configured to detect a signal around the information terminal; and
a selection part configured to select one of the plurality of communication devices as a communication device used for communications with the apparatus, based on the signal detected by the detection part.

29. An apparatus management method by which a computer executes a process of managing an apparatus through an information terminal, the process including:
receiving terminal information identifying the information terminal and apparatus information identifying the apparatus;
determining whether the received terminal information and apparatus information match one of a plurality of registered combinations of terminal information and apparatus information; and
transmitting apparatus management information to the information terminal in response to determining that the received terminal information and apparatus information match the one of the plurality of registered combinations of terminal information and apparatus information.

What is claimed is:
1. A management system managing a plurality of apparatuses, the management system comprising:

a plurality of information terminals through which the plurality of apparatuses are managed; and a management apparatus, wherein an information terminal among the plurality of information terminals includes a first memory; and a first processor coupled to the first memory, and configured to transmit terminal information identifying the information terminal and apparatus information identifying an apparatus among the plurality of apparatuses, wherein the management apparatus includes a second memory; and a second processor coupled to the second memory, and configured to receive the terminal information and the apparatus information transmitted from the information terminal;

determine whether the received terminal information and apparatus information match one of a plurality of registered combinations of terminal information of the plurality of information terminals and apparatus information of the plurality of apparatuses;

determine whether a usage time limit of the apparatus is passed, the usage time limit indicating a point of time up to which the apparatus is usable; and transmit apparatus management information to the information terminal in response to determining that the received terminal information and apparatus information match the one of the plurality of registered combinations of terminal information and apparatus information and that the usage time limit of the apparatus is not passed, wherein the first processor is further configured to transmit time information of the information terminal to the management apparatus after receiving the apparatus management information from the management apparatus, and wherein the second processor is further configured to receive the time information of the information terminal;

compare the received time information with time information of the management apparatus;

determine whether a difference between the received time information and the time information of the management apparatus is a predetermined period of time or more; and change the usage time limit in response to determining that the difference is the predetermined period of time or more.

2. The management system as claimed in claim 1, wherein the first processor is configured to cause the information terminal to operate as a manager information terminal having manager authority in a manager mode, and to operate as a user information terminal having user authority in a user mode, the user authority being different in a scope of authority from the manager authority.

3. The management system as claimed in claim 1, wherein the first processor is configured to activate an application for connecting to a network.

4. The management system as claimed in claim 1, wherein the apparatus is managed based on the apparatus management information.

5. The management system as claimed in claim 1, wherein the first processor is further configured to receive operation information of the apparatus from the apparatus and transmit the received operation information together with the time information of the information terminal to the management apparatus, after receiving the apparatus management information from the management apparatus, and the second processor is further configured to receive the operation information of the apparatus transmitted from the information terminal together with the time information of the information terminal.

6. The management system as claimed in claim 1, wherein the first processor is further configured to, after receiving the apparatus management information, store the apparatus management information received from the management apparatus in association with the terminal information and the apparatus information;

determine whether the information terminal is connectable to the management apparatus;

transmit a request for the apparatus information to the apparatus, in response to determining that the information terminal is not connectable to the management apparatus;

receive the apparatus information transmitted from the apparatus in response to the request;

determine whether the apparatus information transmitted from the apparatus in response to the request is stored in association with the apparatus management information; and transmit the apparatus management information to the apparatus, in response to determining that the apparatus information transmitted from the apparatus in response to the request is stored in association with the apparatus management information.

7. The management system as claimed in claim 1, wherein the second processor is configured to change the usage time limit so that the time information of the information terminal to be received by the second processor next time goes beyond the usage time limit.

8. A management apparatus managing a plurality of apparatuses through a plurality of information terminals, the management apparatus comprising:

a memory; and a processor coupled to the memory, and configured to receive terminal information identifying an information terminal among the plurality of information terminals and apparatus information identifying an apparatus among the plurality of apparatuses from the information terminal;

determine whether the received terminal information and apparatus information match one of a plurality of registered combinations of terminal information of the plurality of information terminals and apparatus information of the plurality of apparatuses;

determine whether a usage time limit of the apparatus is passed, the usage time limit indicating a point of time up to which the apparatus is usable;

transmit apparatus management information to the information terminal in response to determining that the received terminal information and apparatus information match the one of the plurality of registered combinations of terminal information and apparatus information and that the usage time limit of the apparatus is not passed;

receive time information of the information terminal from the information terminal after transmitting the apparatus management information;

compare the received time information with time information of the management apparatus;

determine whether a difference between the received time information and the time information of the management apparatus is a predetermined period of time or more; and change the usage time limit in response to determining that the difference is the predetermined period of time or more.

9. The management apparatus as claimed in claim 8, wherein the processor is further configured to transmit an apparatus list showing available apparatuses among the plurality of apparatuses.

10. The management apparatus as claimed in claim 8, wherein the processor is further configured to suspend use of the apparatus when the difference is more than or equal to the predetermined period of time.

11. The management apparatus as claimed in claim 8, wherein the processor is further configured to transmit guidance information to the information terminal and cause the guidance information to be displayed on a screen of the information terminal.

12. The management apparatus as claimed in claim 8, wherein the processor is configured to receive operation information of the apparatus from the information terminal together with the time information of the information terminal after transmitting the apparatus management information to the information terminal, the operation information being transmitted from the apparatus to the information terminal in response to a request for the operation information.

13. The management apparatus as claimed in claim 8, wherein the processor is configured to change the usage time limit so that the time information of the information terminal to be received by the processor next time goes beyond the usage time limit.

14. A method for managing a plurality of apparatuses through a plurality of information terminals, the method comprising:

transmitting, by an information terminal among the plurality of information terminals, terminal information identifying the information terminal and apparatus information identifying an apparatus among the plurality of apparatuses;

receiving, by a management apparatus, the terminal information and the apparatus information transmitted from the information terminal;

determining, by the management apparatus, whether the received terminal information and apparatus information match one of a plurality of registered combinations of terminal information of the plurality of information terminals and apparatus information of the plurality of apparatuses;

determining, by the management apparatus, whether a usage time limit of the apparatus is passed, the usage time limit indicating a point of time up to which the apparatus is usable;

transmitting, by the management apparatus, apparatus management information to the information terminal in response to determining that the received terminal information and apparatus information match the one of the plurality of registered combinations of terminal information and apparatus information and that the usage time limit of the apparatus is not passed;

transmitting, by the information terminal, time information of the information terminal to the management apparatus after the information terminal receives the apparatus management information from the management apparatus;

receiving, by the management apparatus, the time information of the information terminal;

comparing, by the management apparatus, the received time information with time information of the management apparatus;

determining, by the management apparatus, whether a difference between the received time information and the time information of the management apparatus is a predetermined period of time or more; and changing, by the management apparatus, the usage time limit in response to determining that the difference is the predetermined period of time or more.

15. The method as claimed in claim 14, wherein the information terminal is configured to operate as a manager information terminal having manager authority in a manager mode, and to operate as a user information terminal having user authority in a user mode, the user authority being different in a scope of authority from the manager authority.

16. The method as claimed in claim 14, further comprising:

receiving, by the information terminal, operation information of the apparatus from the apparatus;

transmitting, by the information terminal, the received operation information to the management apparatus together with the time information of the information terminal, after receiving the apparatus management information from the management apparatus; and receiving, by the management apparatus, the operation information of the apparatus transmitted from the information terminal together with the time information of the information terminal.

17. The method as claimed in claim 14, further comprising:

after the information terminal receives the apparatus management information, storing, by the information terminal, the apparatus management information received from the management apparatus in association with the terminal information and the apparatus information;

determining, by the information terminal, whether the information terminal is connectable to the management apparatus;

transmitting, by the information terminal, a request for the apparatus information to the apparatus, in response to determining that the information terminal is not connectable to the management apparatus;

receiving, by the information terminal, the apparatus information transmitted from the apparatus in response to the request;

determining, by the information terminal, whether the apparatus information transmitted from the apparatus in response to the request is stored in association with the apparatus management information; and transmitting, by the information terminal, the apparatus management information to the apparatus, in response to determining that the apparatus information transmitted from the apparatus in response to the request is stored in association with the apparatus management information.

18. The method as claimed in claim 14, wherein the management apparatus changes the usage time limit so that the time information of the information terminal to be received by the management apparatus next time goes beyond the usage time limit.

\* \* \* \* \*